(12) United States Patent
Howard

(10) Patent No.: US 9,229,688 B2
(45) Date of Patent: *Jan. 5, 2016

(54) AUTOMATED LATENCY MANAGEMENT AND CROSS-COMMUNICATION EXCHANGE CONVERSION

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/211,649

(22) Filed: Mar. 14, 2014

(65) Prior Publication Data

US 2014/0282368 A1    Sep. 18, 2014

Related U.S. Application Data

(60) Provisional application No. 61/785,936, filed on Mar. 14, 2013.

(51) Int. Cl.
  *G06F 9/44*     (2006.01)
  *G06F 9/45*     (2006.01)
  *G06F 17/20*    (2006.01)
  *G06F 11/00*    (2006.01)
(52) U.S. Cl.
  CPC .. *G06F 8/20* (2013.01); *G06F 8/53* (2013.01); *G06F 8/51* (2013.01)
(58) Field of Classification Search
  None
  See application file for complete search history.

(56) References Cited

U.S. PATENT DOCUMENTS

| 4,686,623 | A | * | 8/1987 | Wallace | G06F 8/436 717/117 |
|---|---|---|---|---|---|
| 5,353,371 | A | | 10/1994 | Honiden et al. | |
| 5,430,873 | A | | 7/1995 | Abe et al. | |
| 7,162,710 | B1 | | 1/2007 | Edwards et al. | |
| 7,213,232 | B1 | | 5/2007 | Knowles | |

(Continued)

FOREIGN PATENT DOCUMENTS

| JP | 2010097426 A | 4/2010 |
|---|---|---|
| WO | 2007104158 A1 | 9/2007 |

OTHER PUBLICATIONS

PCT Application PCT/US2013/033125 International Search Report and Written Opinion, dated Jun. 27, 2013, 8 pages.

(Continued)

*Primary Examiner* — Isaac T Tecklu
*Assistant Examiner* — Mohammad Kabir
(74) *Attorney, Agent, or Firm* — Lathrop & Gage LLP

(57) ABSTRACT

A system and method for performing functional decomposition of a software design to generate a computer-executable FSM and a graphical representation of the design in a decomposition diagram stored in a program database with source code, test code, and other program data. The method includes searching for pre-existing software modules that meet program design requirements. Modules needing work are displayed on Gantt or PERT charts as tasks, and may be annotated with start dates, and completion dates. Percent complete of the design is automatically generated and updated, and may be displayed on the charts. The decomposition is automatically used to introduce error detection states into the FSM for recognizing invalid states and saving checkpoints, and for recognizing and repairing both race conditions and deadlock conditions in the design.

7 Claims, 43 Drawing Sheets

(56) References Cited

U.S. PATENT DOCUMENTS

| | | | |
|---|---|---|---|
| 8,209,657 B1 | 6/2012 | Sawyer et al. | |
| 2002/0104072 A1* | 8/2002 | Ecker | G06F 8/70 717/110 |
| 2003/0079188 A1* | 4/2003 | McConaghy | G06F 17/5063 716/119 |
| 2003/0140332 A1 | 7/2003 | Norton et al. | |
| 2003/0149968 A1* | 8/2003 | Imai | G06F 8/73 717/156 |
| 2004/0015775 A1* | 1/2004 | Simske | G06F 17/30017 715/255 |
| 2004/0243387 A1* | 12/2004 | De Brabander | G06F 8/34 704/1 |
| 2006/0020949 A1* | 1/2006 | Hoshino | G06F 8/34 719/318 |
| 2006/0136850 A1 | 6/2006 | Corbeil, Jr. et al. | |
| 2007/0061354 A1* | 3/2007 | Sarkar | G06Q 10/06 1/1 |
| 2007/0294578 A1 | 12/2007 | Qiao et al. | |
| 2008/0263506 A1* | 10/2008 | Broadfoot | G06F 8/10 717/104 |
| 2008/0307267 A1* | 12/2008 | Chandrasekaran | G06F 11/3688 714/38.11 |
| 2008/0312890 A1* | 12/2008 | Zhu | G06F 8/10 703/6 |
| 2009/0119484 A1* | 5/2009 | Mohl | G06F 17/5054 712/201 |
| 2009/0241106 A1 | 9/2009 | Andersen | |
| 2009/0265696 A1 | 10/2009 | Grice | |
| 2010/0153908 A1 | 6/2010 | Sarkar et al. | |
| 2010/0199257 A1* | 8/2010 | Biggerstaff | G06F 8/76 717/104 |
| 2011/0283095 A1 | 11/2011 | Hall et al. | |
| 2012/0066664 A1 | 3/2012 | Howard | |
| 2012/0101929 A1 | 4/2012 | Howard | |
| 2013/0145346 A1* | 6/2013 | Liu | G06F 8/51 717/113 |

OTHER PUBLICATIONS

PCT Application PCT/US2013/044573 International Search Report and Written Opinion dated Jul. 22, 2013, 8 pages.
Ward, et al., "Structured Development for Real Time Systems," vol. 1: Introduction & Tools, Published by Prentice-Hall, Inc., 1985.
U.S. Appl. No. 13/490,345 select file history dated Aug. 30, 2013 through Feb. 3, 2014, 43 pages.
U.S. Appl. No. 13/425,136 select file history dated Feb. 21, 2014 through Oct. 8, 2014, 66 pages.
PCT Application PCT/US2014/027785 International Search Report and Written Opinion dated Aug. 29, 2014, 10 pages.
PCT Application PCT/US2013/044818 International Search Report and Written Opinion dated Sep. 13, 2013, 9 pages.
Yourdon, "Modern Structured Analysis," Published by PTR Prentice Hall 1989, pp. Intro to 189.
Yourdon, "Modern Structured Analysis," Published by PTR Prentice Hall 1989, pp. 190-400.
Yourdon, "Modern Structured Analysis," Published by PTR Prentice Hall 1989, pp. 401-667.

\* cited by examiner

AUTOMATED LATENCY MANAGEMENT AND CROSS-COMMUNICATION EXCHANGE CONVERSION

RELATED APPLICATIONS

This application claims priority to U.S. Patent Application Ser. No. 61/785,936, filed Mar. 14, 2013, the disclosure of which is incorporated herein by reference.

BACKGROUND

Traditional models for functional decomposition of algorithms are vague in their definition of lower decomposition levels. In the Yourdon structured model, control transformations decompose into state transition diagrams which represent the real-time aspects of the system. Although control transformations were used by Yourdon, Ward and Millor, and Batley and Pirbhai to define real-time control transformation events, their definition of control transformation does not include any of the following types of software statements: goto, if-then-else, switch loops, and subroutine calls.

If the transformations decompose from the highest to the lower levels, but the complexity is not constrained by the developer as the functionality decomposes, as in the McCabe model, the amount of control is unconstrained, and it is not clear when the decomposition should end. Furthermore, since the unconstrained decomposition does not inherently simplify the design, it does not actually meet the criteria of mathematical functional decomposition.

To eliminate the above-noted shortcomings of previous decomposition methods, a simple graph, created in accordance with the multiprocessor functional decomposition (MPfd) model described herein, is constrained to a single control structure per decomposition level and exposes all transitions, preparing the graph for translation into a finite state machine (FSM).

Traditionally, FSMs have been used to create compilers and have also been used in sequential circuit design. Being able to use FSMs in general software design and thus in general programming offers huge benefits for general programming including increased software clarity and the ability better combine computer software with computer hardware.

Management of projects, as done in most software development companies today, is divorced from the software design process. The most common project management tools are the Gantt and PERT (Program Evaluation and Review Technique) charts. Microsoft Corporation has shown that a Gantt chart can be converted into a PERT chart and vice versa. These charts typically show tasks, time durations for each task, task dependencies, and starting dates for each task. The various tasks and their associated attributes are currently manually entered and manually maintained because current project management tools are general tools which are separate from software design.

Solution

Disclosed herein are a system and method for performing functional decomposition of a software design to generate a computer-executable finite state machine. Initially, the software design is received in a form wherein functions in the software design are repetitively decomposed into (1) data and control transformations. Included between the functions are control flow indicators which have transformation-selection conditions associated therewith. The data transformations and the control transformations are translated into states in the finite state machine. The transformation-selection conditions associated with the control transformations are translated into state transitions in the finite state machine.

A system and method for performing functional decomposition of a software design to generate a computer-executable FSM and a graphical representation of the design in a decomposition diagram stored in a program database with source code, test code, and other program data. The method includes searching for pre-existing software modules that meet program design requirements. Modules needing work are displayed on Gantt or PERT charts as tasks, and may be annotated with start dates, and completion dates. Percent complete of the design is automatically generated and updated, and may be displayed on the charts. The decomposition is automatically used to introduce error detection states into the FSM for recognizing invalid states and saving checkpoints, and for recognizing and repairing both race conditions and deadlock conditions in the design.

The functional decomposition is used to generate a GANTT chart (or in an alternative embodiment a PERT chart) for project management. The functional decomposition may, in some embodiments, be annotated with information specifically appropriate to the GANTT chart, including designations of particular individuals or programmers who are expected to write modules, an estimated time for writing modules, other information.

In a particular embodiment, the functional decomposition is associated with a program source and object code database, where each module corresponds to a task on the GANTT chart, and to associate functional decomposition. In this embodiment, assigning edit access to a programmer automatically assigns that programmer to prepare that module.

In an embodiment, the functional decomposition has error-detection states automatically inserted into the FSM, with code for saving process state information when the error detection state is executed.

DETAILED DESCRIPTION

Figure 1:
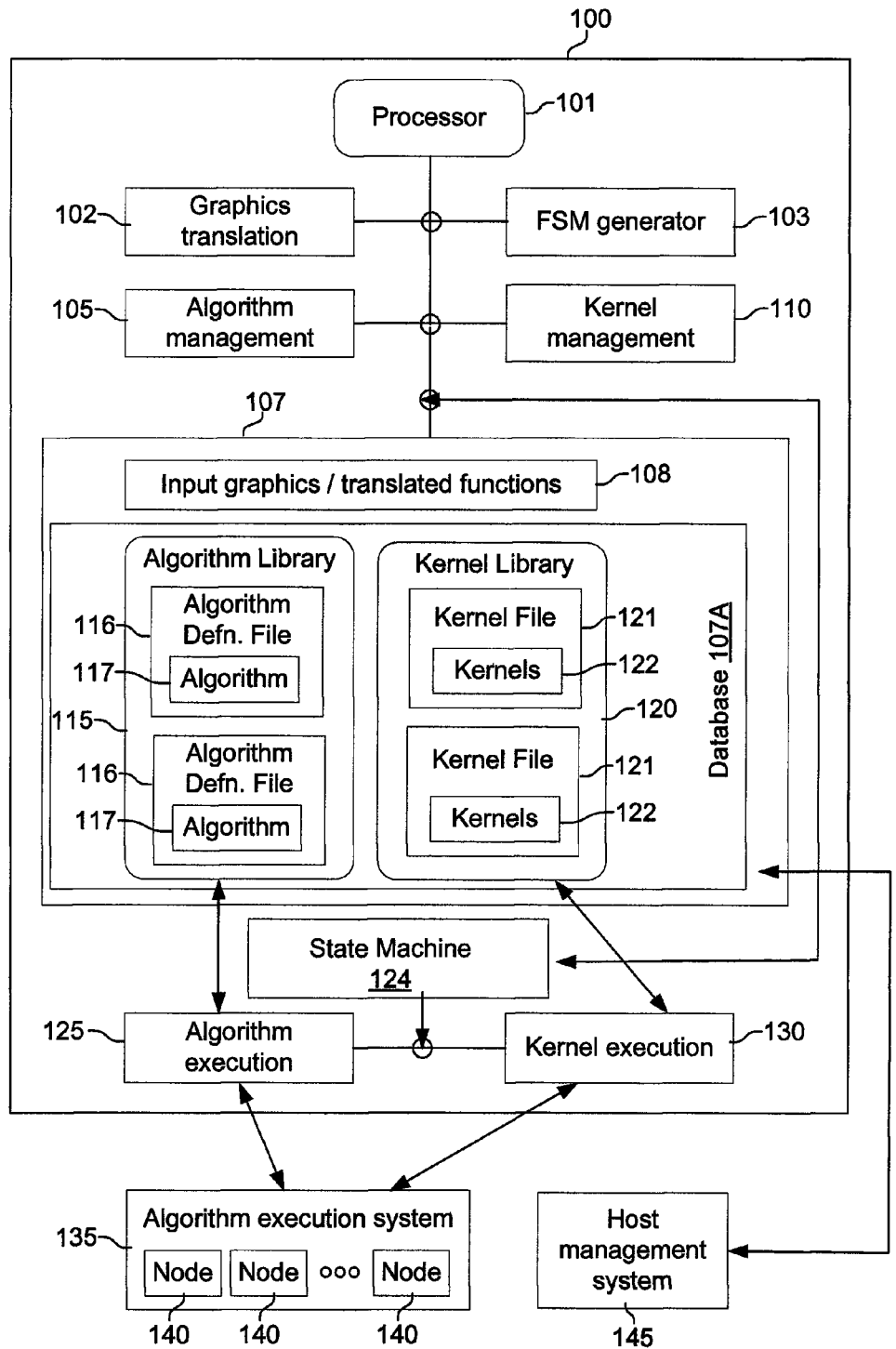
FIG. 1 is a system diagram showing an exemplary computing environment in which the present system functions.

Although functional decomposition has long been used to design software, the multiprocessor functional decomposition (MPfd) techniques and methods described herein extend beyond mere design. First, any design created using the presently described MPfd methods can, by definition, be translated directly into a finite state machine (FSM). Since field programmable gate arrays (FPGAs) and graphical processing units (GPUs) use FSMs in their programming, the MPfd is useful in creating not only CPU but GPU and FPGA codes as well. Second, incorrect MPfd structures can be automatically detected and corrected. Third, MPfd techniques incorporate the automatic selection of the pass-by-value or the pass-by-reference data movement model for moving data between functional elements. This allows the presently-described system to combine computer languages like "C" and "C++" with other computer languages like Fortran or Java. Fourth, MPfd elements are annotated with information concerning the use of any data, not just the data type. Using the MPfd model to automatically find task-level and non-task-level parallelism from design, instead of the user finding it within the code, allows separate compute threads to simultaneously process data.

Since a task in the present system is equivalent to one or more data transformations (or simply "transformations") and since a transformation is a state in the present finite state machine (FSM), showing which states can be executed in parallel is equivalent to indicating the task parallelism.

DEFINITIONS

For the purpose of this document, the following definitions are supplied to provide guidelines for interpretation of the terms below as used herein:

Function—a software routine, or more simply an algorithm that performs one or more transformations.

Control Kernel—A control kernel is a software routine or function that contains only the following types of computer-language constructs: subroutine calls, looping statements (for, while, do, etc.), decision statements (if-then-else, etc.), and branching statements (goto, jump, continue, exit, etc.).

Process Kernel—A process kernel is a software routine or function that does not contain the following types of computer-language constructs: subroutine calls, looping statements, decision statements, or branching statements. Information is passed to and from a process kernel via RAM.

State Machine—The state machine employed herein is a two-dimensional network which links together all associated control kernels into a single non-language construct that provides for the activation of process kernels in the correct order. The process kernels form the "states" of the state-machine while the activation of those states form the state transition. This eliminates the need for software linker-loaders.

State Machine Interpreter—for the purpose of the present document, a State Machine Interpreter is a method whereby the states and state transitions of a state machine are used as active software, rather than as documentation.

Node—A node is a processing element comprised of a processing core, or processor, memory and communication capability.

Data transformation—A data transformation is a task that accepts data as input and transforms the data to generate output data.

Control transformation—A control transformation evaluates conditions and sends and receives control to/from other control transformations and/or data transformations.

Control bubble—A control bubble is a graphical indicator of a control transformation. A control bubble symbol indicates a structure that performs only transitions and does not perform processing.

Process bubble—A process bubble is a graphical indicator of a data transformation.

Finite state machine—A finite state machine is an executable program constructed from the linear code blocks resulting from transformations, where the transformation-selection conditions are state transitions constructed from the control flow.

Computing Environment

FIG. 1 is an exemplary diagram of the computing environment in which the present system and method operates. As shown in FIG. 1, a programming and management support computer system 100 includes a processor 101 which executes tasks and programs including a kernel management module 110, an algorithm management module 105, state machine 124, a kernel execution module 130, and an algorithm execution module 125. System 100 further includes storage 107, in which is stored data including libraries 115/120 which respectively store algorithms 117 and kernels 122, as well as a graphical design and program database 107A. Storage 107 may be RAM, or a combination of RAM and other storage such as a disk drive. Graphical design database 107A stores a graphical functional decomposition diagram in machine readable form, together with executable modules associated with the decomposition. Module 102 performs a translation of a graphical input functional decomposition diagram 700 (see, e.g., FIG. 7) to corresponding MPfd functions (ultimately, states in a state machine), and stores the translated functions in appropriate libraries in storage area 108 and database 107A. Module 103 generates appropriate FSMs from the translated functions.

System 100 is coupled to a host management system 145, which provides management of system functions, and issues system requests. Algorithm execution module 125 initiates execution of kernels invoked by algorithms that are executed. Algorithm execution system 135, a parallel processing system, may be any computing system with multiple computing nodes 140 which can execute kernels stored in system 100. Management system 145 can be any external client computer system which requests services from the present system 100. These services include requesting that kernels or algorithms be added/changed/deleted from a respective library within the current system. In addition, the external client system can request that a kernel/algorithm be executed. It should be noted that the present system is not limited to the specific file names, formats and instructions presented herein.

A kernel is an executable computer program or program segment that contains data transformation/data code, and no program execution control code, where execution control code is any code that can change which code is to be executed next. In the exemplary embodiment described herein, kernels 122 are stored in a kernel library file 121 in kernel library 120.

An algorithm is a state machine that comprises states (kernel invocations) and state transitions (the conditions needed to go from one state to another). References to the "system" in this section refer in general to system 100, and in applicable embodiments, to algorithm management module 105. Each algorithm 117 is kept in an algorithm definition file 116 in algorithm library 115 with a name (Algorithm_Title) that is the concatenation of the organization name, the category name, algorithm name, and user name with a '_' character between each of the names.

Algorithm Definition File with Task Parallelism Example:
StateNumber[(state1, . . . state n), state x, state y, state z)], KernelID(nodeInfo)(InputDatasets)(OutputDatasets)(Transitions)(Loops)

In the above example, the parallel tasks are executed at the same time as "StateNumber".

Functional Decomposition

A control transformation evaluates conditions and sends and receives control. One primary difference between the Yourdon model and the present MPfd model is in how control transformations are handled. MPfd allows a control transformation to contain non-event control items. Non-event control items are conditions that change the sequence of execution of a program (if-then-else, go to, function calls, function returns), and a condition is a regular conditional expression.

Variables used by a control transformation can only be used in a condition; they cannot be transformed into any other value. An Invoke instruction initiates system operation; variables and constants are used in conditions to transition to a control transformation; and a Return instruction gives control back to the control transformation with the name of the returning routine. A control transformation can have only one selection condition per transformation, and there can be, at most, one control transformation per decomposition level.

The MPfd model creates hierarchical finite state machines (HFSM) whose state transitions have conditions and whose states are data transformations and control transformations. Data transformations can always, eventually, be associated with linear code blocks, while control transformations contain only transitions with no associated code blocks.

Data transformations represent the parallelizable portion of the software design. In MPfd designs, there are three data transformation types: associated, unassociated, and ambiguous. These types are concerned with the relationship between an upper-level transformation and its immediate next-level decomposition.

Associated transformations are grouped together and share data and/or control. Unassociated transformations are grouped together but share no data or control. Unassociated transformations can be executed in parallel. This is called task-level parallelization. Ambiguous transformations can always be converted to either associated or unassociated forms.

A data transformation can contain three types of looping structures: pre-work, post-work and recursion. Pre-work means that the loop-ending condition is checked prior to performing the work and is denoted by a downward-pointing solid-loop symbol on a transformation. Post-work means that the loop-ending condition is checked after performing the work and is denoted by an upward-pointing solid-loop symbol on a transformation. Recursion means that the transformation calls itself and is denoted by a downward-pointing dashed-loop symbol on a transformation.

In the Yourdon model, only the control transformation decomposes into a finite state machine (FSM). In an MPfd design, the entire diagram of the current decomposition level is converted into an FSM.

The lowest level of transformation decomposition represents a linear code block. Decomposition ends when a data transformation cannot decompose into a set of data transformations grouped together with a control transformation or when the decomposition results in the same graph as the decomposed transformation.

Mathematics of Functional Decomposition $$y=f(a,b,c,\ldots)=g(h_1(h_2(a,b),c),h_3(d,h_4(e),f),\ldots,h_n(a,b,c,\ldots))\quad \text{Equation 1}$$

In the example of Equation 1 above, the "hx( )" functions can also be decomposed, and this decomposition can continue. In standard decomposition, there is no specified last decomposition. In an MPfd, the decomposition continues until only a series of function calls depicting the structure of the function remains. A final decomposition then occurs when there are no function calls, and only a single data transformation remains. At that point, the decomposition has progressed to the kernel level, with the non-transformation functions equivalent to control kernels and the transformation-only functions equivalent to process kernels. By its nature, an MPfd forms a disjoint, fully reduced set of functions.

Function Dependencies

Transforming a function into its decomposed equivalent set of functions means hierarchically identifying functions within functions such that the equivalent functionality of the original function is maintained while the complexity of the component functions simplifies. This can be illustrated using the "g( )" function from Equation 1. The function g(h1(h2(a, b), c), h3(d, h4(e)), ... hn(a, b, c, d, e, f)) uses the various "hx( )" functions as its parameters. The "hx( )" functions can, thus, be ordered by the "g( )" function in the same way as variables are ordered within a function. If some or all of the "hx( )" functions were also decomposed, they would have the decomposed functions as additional parameters. Unfortunately, the standard decomposition diagram notation does not make this functional ordering fully visible; that is, usually, the ordering is bound in the mathematics of "g( )".

Figure 2:
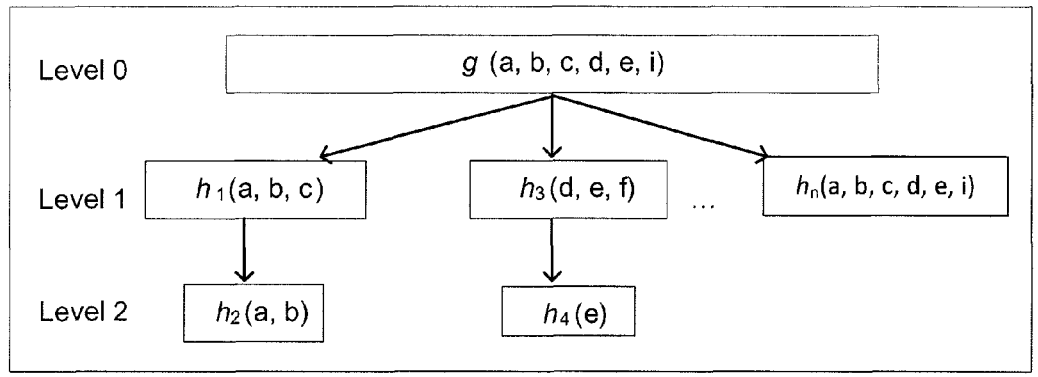
FIG. 2 is a prior art standard functional decomposition diagram.

The standard view of the functional ordering of decomposed functions "g( )" might give is shown in FIG. 2, which is a diagram showing a standard, prior art, functional decomposition. The function-order arrows (control flow indicators) on the standard functional decomposition diagram of FIG. 2 indicate the calling order of the functions. This calling order comes from a combination of the decomposition level (indicated by the level number shown on the diagram) and the parameter order of the functions as shown in FIG. 2. If the parameters used by some functions are different from those used by some other functions, those disjoint functions can be executed in parallel. The functions that share the same parameters are said to be joint and are executed serially.

In order to create different joint execution streams, in accordance with the present MPfd model, each function in a particular algorithm receives an execution-stream identifier. In the present exemplary embodiment, this execution-stream identifier is represented as a program thread. Graphically illustrated, this MPfd-type decomposition takes the form shown in the diagram of FIG. 3, which shows multiple threads from decomposition of a function with dissimilar parameters. By examining FIG. 3, it can be seen that thread 1 is used to coordinate the parallel execution of threads 2 and 3. In threads 2 and 3, the thread-sharing functions share variables and are linear to each other, but it is clear that threads 2 and 3 do not share data. Since there are no linear dependencies between thread 2 and thread 3 and no shared data, the two threads can be executed simultaneously.

Conditions for Transition

In a standard functional decomposition diagram, the function-order arrows contain no information other than indicating a general relationship. In the present system, a condition is added to the function-order arrows and this additional information can be used to identify additional parallelism. The MPfd control flow indicators each comprise a function-order arrow plus an associated condition. Adding function-calling or transition information to a function-order arrow is a way to graphically depict the circumstances under which a function is called; that is, it shows the underlying logical/mathematical rationale for transitioning to another function. For example, separate threads containing functions with the same parameters can be identified if their transition conditions are different, as shown on FIG. 4, which shows an example of functional decomposition with transition conditions and threads.

Figure 4:
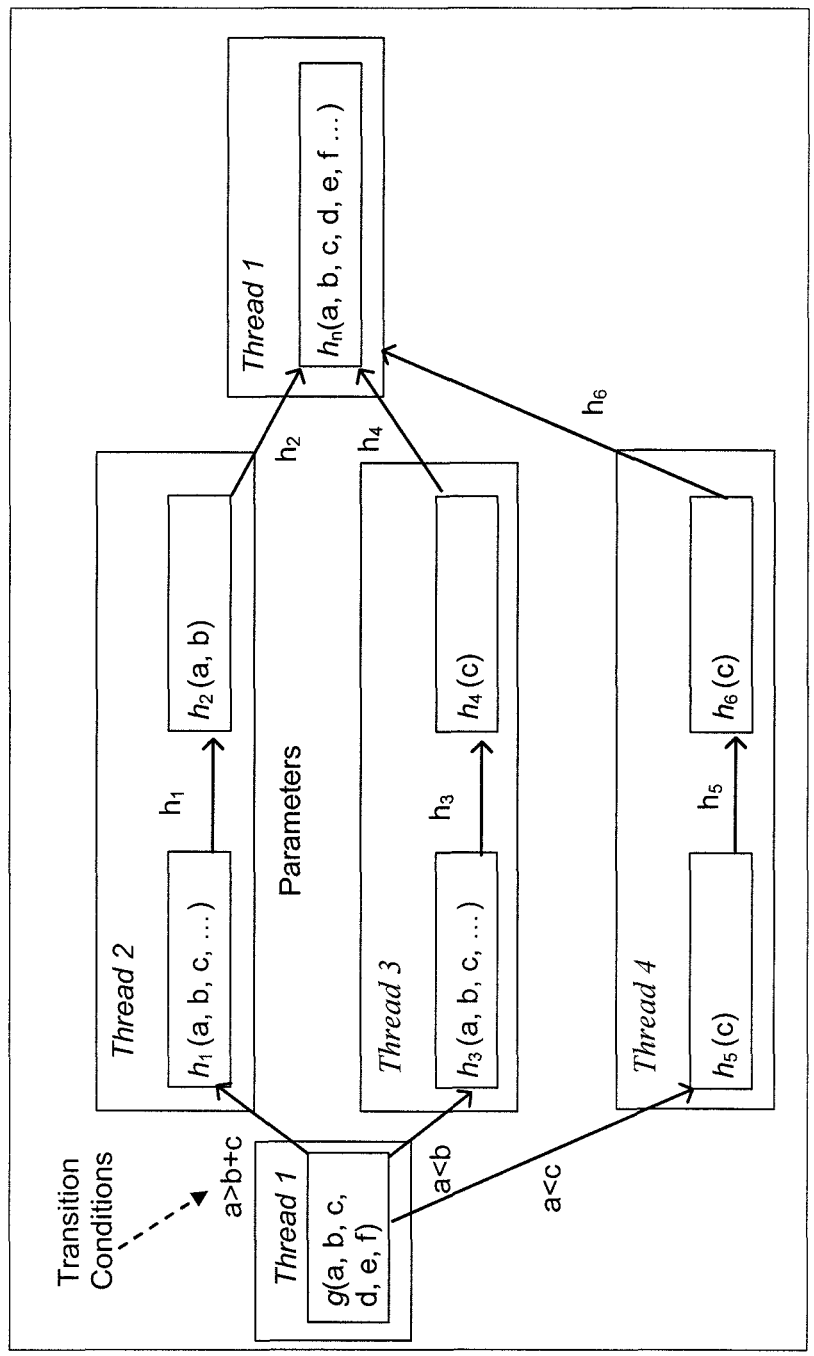
FIG. 4 shows an example of functional decomposition with transition conditions and threads.

When the various function-order arrows indicate the transition conditions, they can be thought of as state-transition vectors. If one ignores the variables, the called functions can be thought of as states. Note that the transitions shown in FIG. 4 are of two types: conditional from calculation, and conditional because a particular function has completed. Both types are necessary.

Multiple Threads as Nested Finite State Machines

Since parameters are a part of the function, they can be considered part of the state. Thus, the present functional decomposition with conditions and threads is functionally equivalent to a finite state machine. Furthermore, since each thread is separate from all other threads and each thread consists only of states and transitions, the threads act as their own state machines. Finally, since the threads are hierarchically formed, they depict nested finite-state machines.

Loops

As previously indicated, function transitions containing one of two types of transition conditions are required to externalize the control elements of functions, allowing them to be gathered together as threads. It is also clear that the transition is a separate entity type from the functions themselves. Loops or looping structures can be thought of as special, more generalized cases of function transition. Whereas a function transition contains only a condition, a looping structure contains a loop order, an initial loop-index value, a loop-index change calculation, and a loop-ending calculation.

Figure 5:
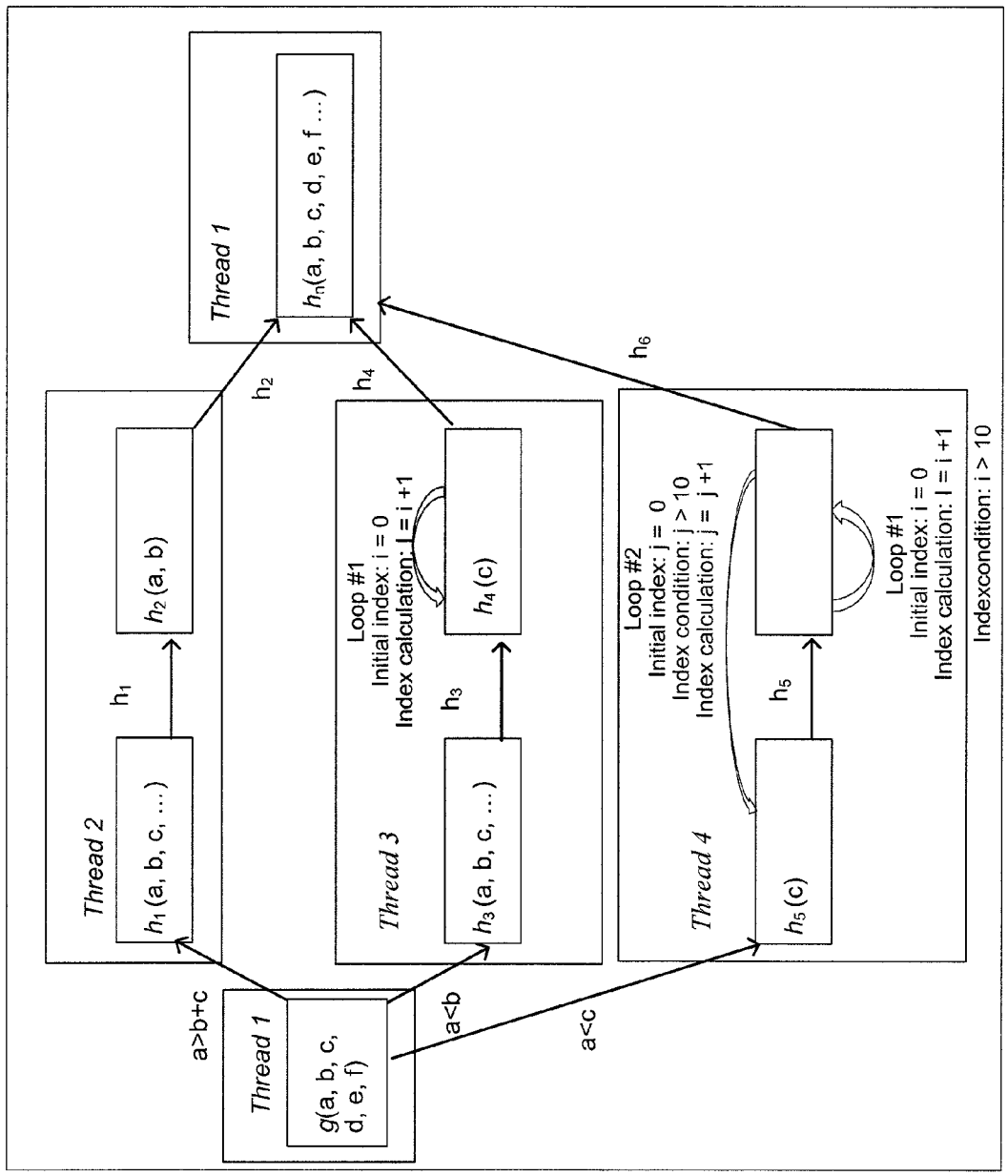
FIG. 5 shows an example of functional decomposition with conditions, threads and added loops.

FIG. 5 shows an exemplary functional decomposition with conditions, threads and added loops. The example in FIG. 5 shows three loops: a single loop for a specific function, an outer loop across functions, and an inner loop. The loop across functions can be used to loop at the thread level. An inner loop, indicated by having the lowest number in a multiple-loop system, is incremented first with subsequent numbers then incremented in successive order. It should be noted that it is not possible to loop between threads.

Functional Decomposition Graphical Model

At this point, the ideas of the prior sections are manually incorporated into a simple graphical model (e.g., a functional decomposition diagram 700, described below with respect to FIG. 7, et. seq.) that insures that all of the transitions are exposed. The functional decomposition diagram 700 is then input into graphics storage 108, and translated via graphics translation module 102 into corresponding functions in accordance with the MPfd decomposition methods described herein. The translated functions may be stored in memory area 108.

It should be noted that a looping structure can be attached to any decomposition element. This looping structure initializes some data element (variable, array element, or matrix element), performs a calculation on the data element, tests the changed element value for the ending condition, and then transitions to the next functional decomposition element required if the condition is met. The data element used as the loop index is one of the function parameters, allowing the looping structure to interact with the functional element.

Highest Level of Decomposition

Figure 6:
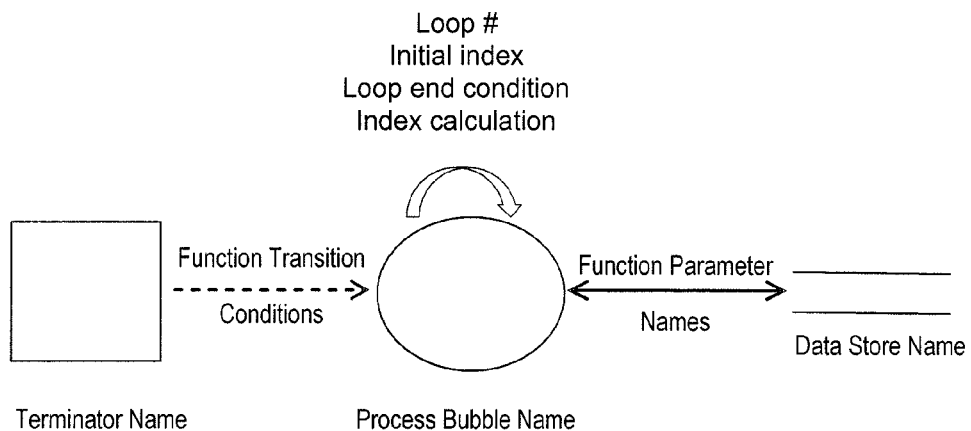
FIG. 6 is an example illustrating the highest level decomposition (level 0).

Level 0 of the MPfd consists of only three types of objects: (1) terminators, (2) a single-process bubble (or other indicator) corresponding to the un-decomposed function, and (3) data stores, along with function transitions, loops, and function parameters. The purpose of the highest level of decomposition is to place a function into a larger context. This is accomplished by allowing systems that are external to the function to transmit data and control to/from the function. A terminator represents a complete external system. FIG. 6 shows an example of the highest level (level-0) decomposition. The "Function Transition Conditions" of FIG. 6 correspond to the "Transition Conditions" shown in FIG. 4. The "Process Bubble Name" of FIG. 6 corresponds to function "go" of Equation 1 and FIGS. 2-5. The "Function Parameter Names" of FIG. 6 correspond to the parameters shown in Equation 1 and FIGS. 2-5.

Terminators

A terminator may be represented as a labeled square. The purpose of terminators is to be able to identify interfaces to outside systems. These interfaces do not correspond to any mathematical functions but instead represent access to data outside of the un-decomposed function. A terminator can be used to represent anything from another computer system to a display screen. Functionally, a terminator behaves similarly to a data store in that data can be sent from/to the terminator from/to the un-decomposed function. The difference between a terminator and a data store is that a terminator can transition from/to the un-decomposed function.

Process Bubble

A process bubble, adds data, changes data, deletes data, or moves data. Since a process-bubble manipulates data, all activities associated with sending and receiving data to various stores is allowed. Furthermore, since a data element can also serve as a signal, activities associated with various signals are also allowed. A process bubble, as employed in the MPfd model, is a graphical indicator of a data transformation, which is a task that accepts input data and transforms it to generate output data.

Exemplary Allowed Process Bubble Activities 1) send data to a data store using output dataflow
 2) receive data from a data store using input dataflow
 3) Send standard signals to control-bubbles
 4) Receive standard signals from control-bubbles
 5) Send standard signals to terminators
 6) Receive standard signals from terminators
 7) Send data to terminators
 8) Receive data from terminators Single-Process Bubble The single-process bubble of the highest level of decomposition represents the un-decomposed function. Since the function is not decomposed, there can be only one level-0 process bubble. It is assumed that the level-0 process bubble will be decomposed into other functions.

Data Stores

A function typically transforms data. One way to graphically depict the transmission of data from/to the single-process bubble is via a terminator. Another way is with a data store. The displayed data stores can send/receive parameter data to/from the single-process bubble.

Control Bubble

A control bubble is a graphical indicator of a control transformation, which evaluates conditions and sends and receives control to/from other control transformations and/or data transformations. A control bubble symbol indicates a structure that performs only transitions that control the processing flow of a system, and which does not perform processing.

Conversion of MPFD to Finite State Machine

A primary goal of functional decomposition is the conversion of an MPfd into a finite state machine. This conversion is enabled by adhering to the following rules:

1) There can be only one control bubble at each decomposition level.
 2) Only a control bubble can invoke a process bubble.
 3) A process bubble can only transmit or receive data from a data store via a data flow.

4) A control bubble can only receive and use data as part of determining which process bubble is to be called.
5) A control bubble can use process bubbles that have completed to sequence to other process bubbles.
6) Data used by a control bubble must be from a process flow.
7) Process bubbles always return control to their calling control bubble.
8) A control bubble or symbol can receive/use/send control signals from/to control flows.
9) Process bubbles can decompose into simpler process bubbles and/or a single control bubble and process bubbles.

Figure 6A:
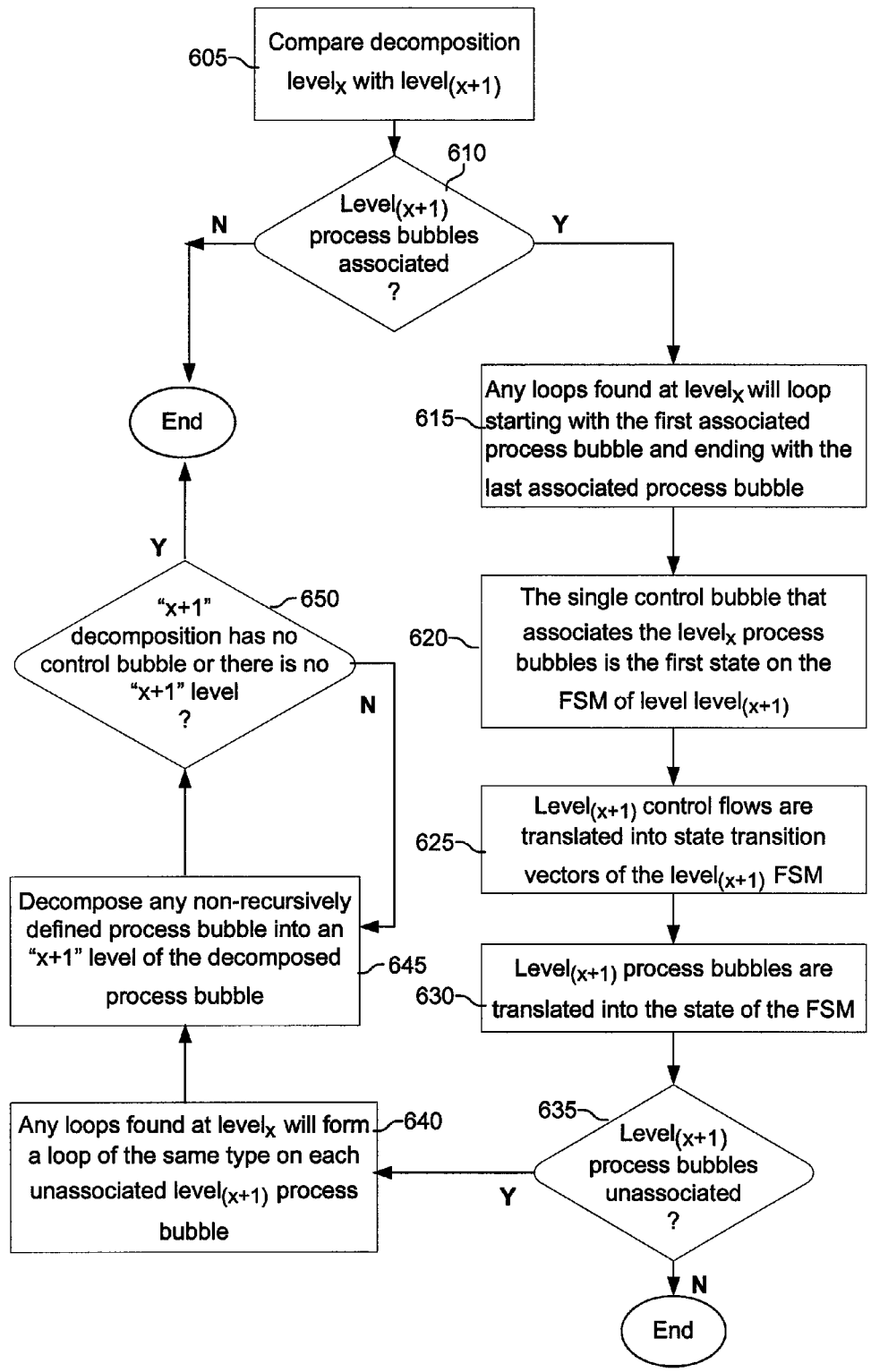
FIG. 6a is a flowchart showing an exemplary algorithm for converting an MPfd to a finite state machine.

An exemplary algorithm for converting an MPfd to a finite state machine is shown in FIG. 6A and described below.

Conversion Algorithm

Step 605: Compare decomposition level$_x$ with level$_{(x+1)}$ and determine if level$_{(x+1)}$ process bubbles are associated or un-associated. A functional decomposition element, herein represented by a bubble symbol, can decompose into two types: associated and unassociated. Association has to do with the next-level decomposition of the bubble. Depending on the association type, loops defined at a higher decomposition level behave differently when they are integrated into a lower decomposition level.

If an un-decomposed bubble labeled "A" is decomposed into bubbles labeled "1", "2", "3", and "C", then the un-decomposed bubble is said to reside at Level 1. Bubbles "1", "2", "3", and "C" are said to reside at Level 2. If a control-flow links together any level 2 bubbles, then those bubbles are said to be associated. If the control-flows do not link together the level 2 bubbles, those bubbles are said to be unassociated.

Step 610: If level$_{(x+1)}$ process bubbles are associated, then perform the following steps 615-630.

Step 615: Any loops found at level$_x$ start with the first associated process bubble and end with the last associated process bubble. That is, multiple states are in the loop. All loops are associated with the set of process bubbles. This step machine-analyzes the design and correctly interprets how the loops work. Using information from one decomposition level to next allows the system to change the algorithm definition file 116 such that the loops are executed correctly.

Step 620: The single control bubble that associates the level$_x$ process bubbles will be the first state on the FSM of level$_{(x+1)}$.

Step 625: Level$_{(x+1)}$ control flows are translated into state transition vectors of the level$_{(x+1)}$ FSM.

Step 630: Level$_{(x+1)}$ process bubbles are translated into the state of the FSM.

Step 635: If level$_{(x+1)}$ process bubbles are un-associated, then perform the following.

Step 640: Any loops found at level$_x$ will form a loop of the same type on each un-associated level$_{(x+1)}$ process bubble.

Step 645: Decompose any non-recursively defined process bubble into an "x+1" level of the decomposed process bubble. Decomposition levels are complete when an "x+1" decomposition has no control bubble (a group of un-associated process bubbles) or when there is no "x+1" level (step 650). All level$_{(x+1)}$ data stores are hidden within the states of the FSM. The various "x+1" levels are represented as nested states, that is, each state is also an FSM.

Figure 7:
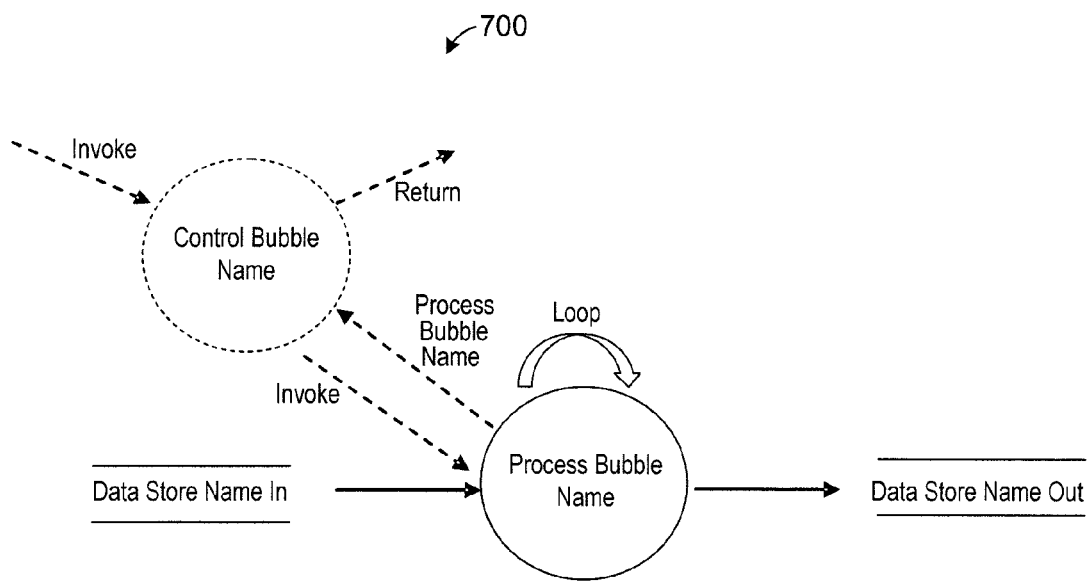
FIG. 7 shows an exemplary functional decomposition diagram.
Figure 8:
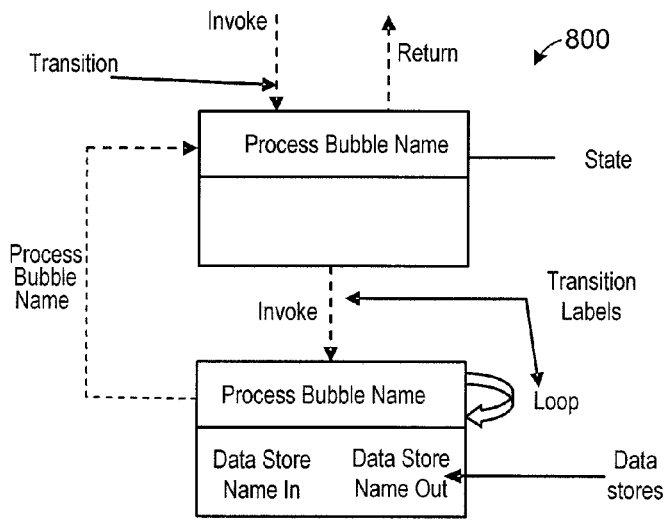
FIG. 8 shows a finite state machine view of the translation of a single-process bubble into its state machine equivalent.

FIG. 7 shows an exemplary functional decomposition diagram 700 and FIG. 8 shows a finite state machine view of the translation of a single-process bubble into its state machine equivalent. As used herein, the term "bubble" refers to a graphical element such as a solid or dashed line having the approximate form of a circle, ellipse, polygon, or the like.

Notice that the control bubble is shown in the finite state machine view as the first state; only the control flows are seen, and these act as state transitions. The looping structure is captured as a looping state transition in the finite state machine 800. The process bubbles are translated into the states of the finite state machine. The data stores are captured as part of the states. Throughout this document, where applicable, both the functional decomposition and finite state machine view are shown in the Drawings.

Lower Level Decomposition

All decomposition levels below level 0 have one additional item: the control bubble. There is only one control bubble per function decomposition. The purpose of the control bubble symbol is to indicate a structure that performs only transitions and does not perform processing. This symbol has the effect of insuring that all non-looping control is fully exposed. Allowing only a single control bubble per function decomposition forces the complexity of the work to be expressed primarily through decomposition, insuring a structured decomposition with the minimum amount of complexity for each of the decompositions. The control bubble retains the name of the higher-level process bubble.

Figure 9:
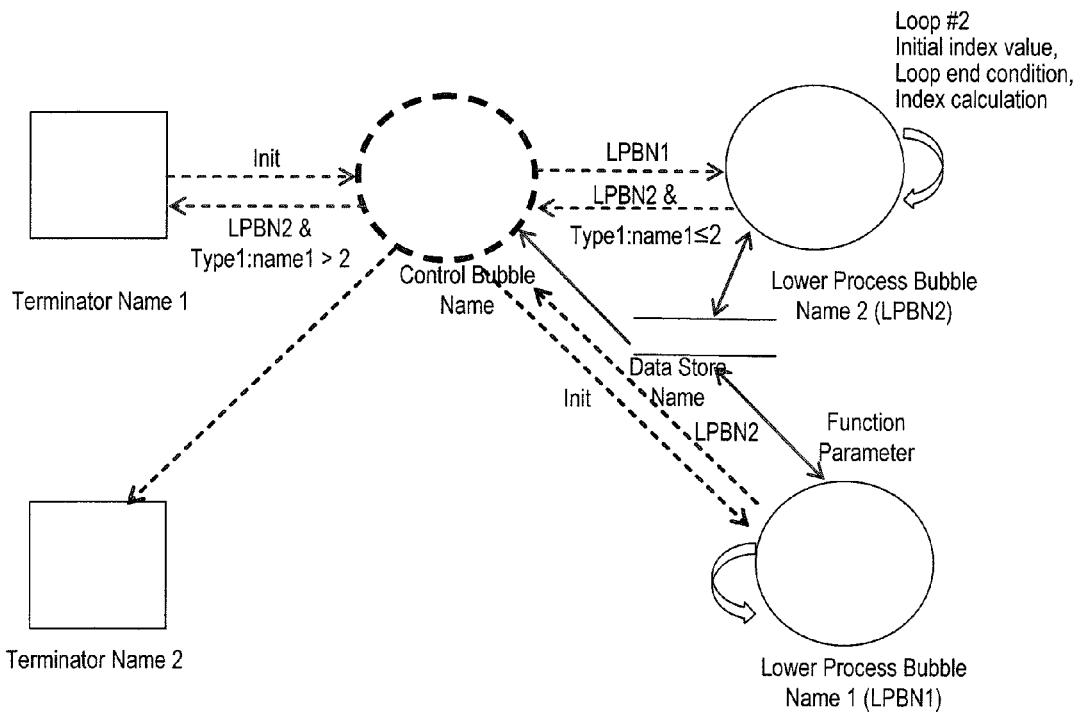
FIG. 9 shows an exemplary lower level decomposition diagram, functional decomposition view.
Figure 10:
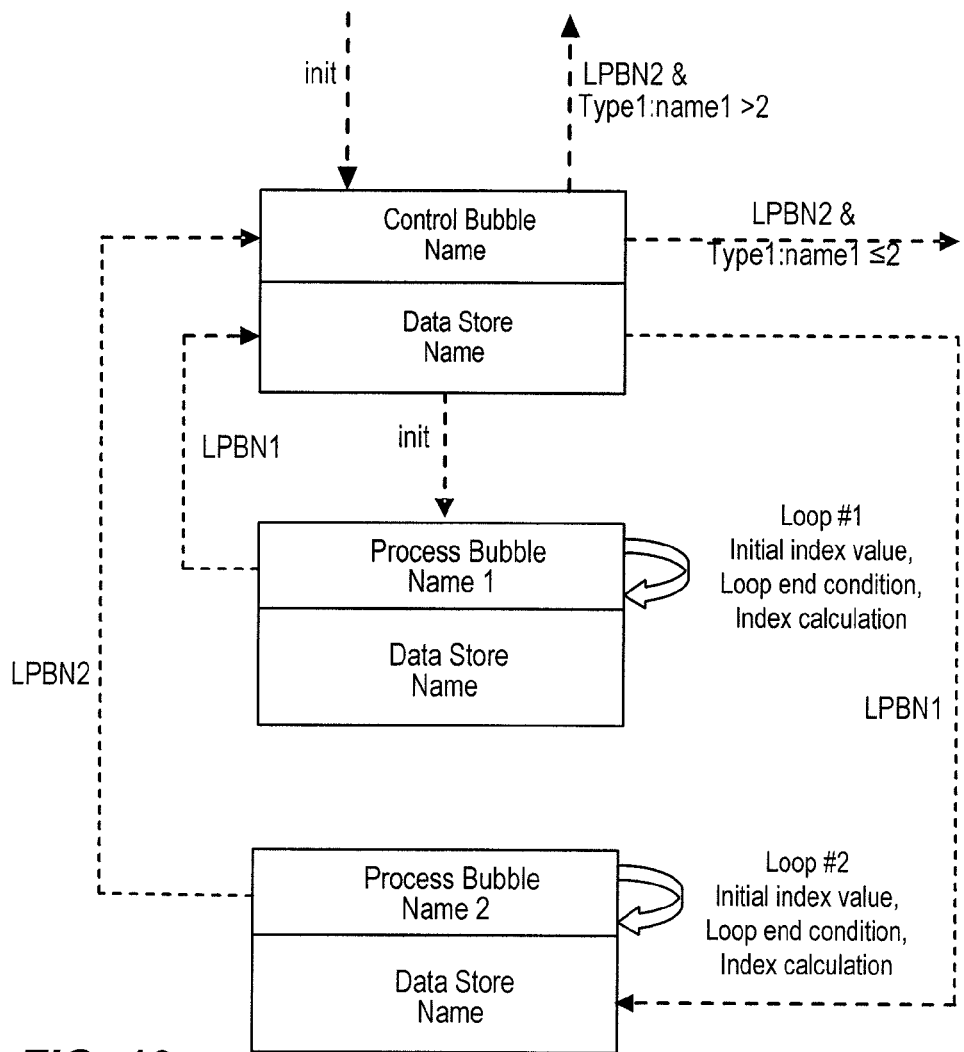
FIG. 10 shows an exemplary lower level decomposition diagram, finite state machine view.

FIGS. 9 and 10 respectively show functional decomposition and finite state machine views of an example of a lower level decomposition. The process bubbles cannot directly send information from one process bubble to another but can do so through a data store. If the data store has the same name, the finite state machine view assumes it will have the same memory addresses. Likewise, a process bubble cannot directly transition to another process bubble but can do so through a control bubble, which is always the initial state.

Multiple Loops

Figure 11:
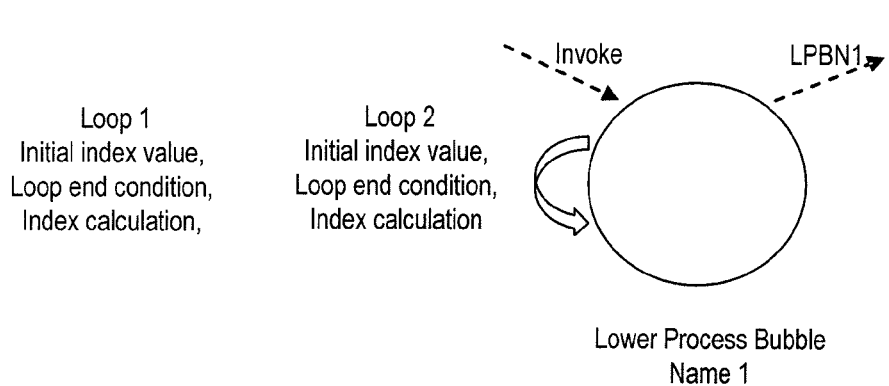
FIG. 11 shows multiple loops, functional decomposition view.
Figure 12:
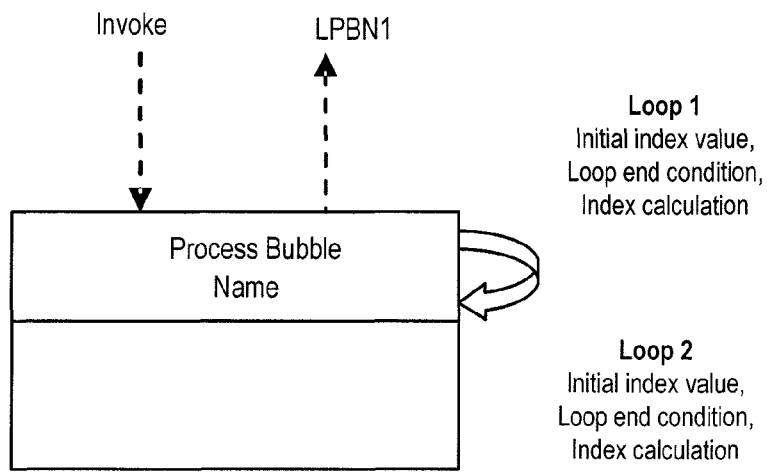
FIG. 12 shows an example of multiple loops, finite state machine view.
Figure 13:
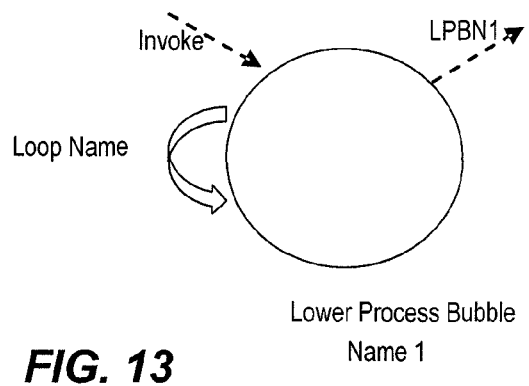
FIG. 13 shows an example of a loop with label, functional decomposition view.
Figure 14:
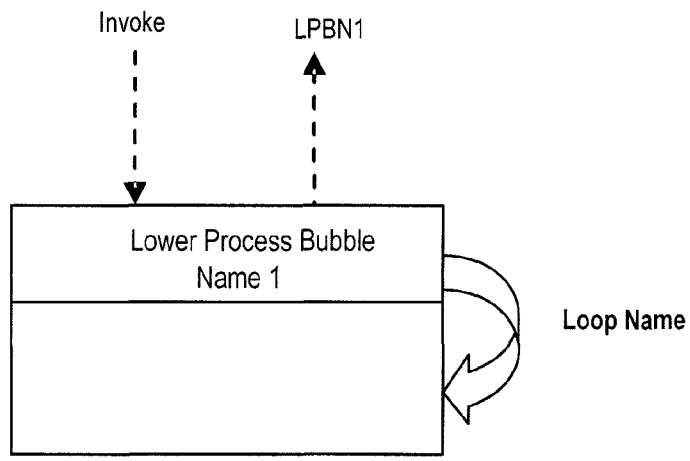
FIG. 14 shows an example of a loop with label, finite state machine view.

In order to denote multiple loops, each loop definition is defined separately. FIGS. 11 and 12 respectively show functional decomposition and finite state machine views of multiple loops. As shown in FIGS. 10 and 11, "LPBN1" represents "Lower Process Bubble Name 1":

Because multiple loop definitions can take up so much space on the diagram, a label representing a loop definition table can be used instead, changing the loop display to that shown in FIGS. 13 and 14, which respectively show functional decomposition and finite state machine views of an exemplary looping operation.

Selecting the loop name can cause the loop definition(s) to be displayed as shown in Table 1, below:

TABLE 1

EXAMPLE LOOP LABEL DEFINITION

Loop Name

| Loop 1 | Initial index value 1 | Index Calculation 1 | Loop End Condition 1 |
| Loop 2 | Initial index value 2 | Index Calculation 2 | Loop End Condition 2 |

All loops associated with a process bubble are considered nested loops: one loop is within another loop. The first loop defined is considered the inner-most loop, with each successive outer loop defined as surrounding the inner loop. Thus, the example given in FIG. 11 and Table 1 means that Loop 2 is inside of Loop 1; that is, Loop 1 is invoked after Loop 2. Parallel loops occur when two or more process bubbles, without any mutual dependency and occurring at the same decomposition level, each have a loop. The loops of these independent, loop-bearing process bubbles can occur in parallel.

Data Elements

Variables, Arrays, and Matrices

Variables, arrays, and matrices represent data elements of various orders. A variable is a single data element of a certain type and can be thought of as a zero-dimensional object. An array consists of multiple data elements arranged linearly and can be thought of as a single-dimensional object. A matrix consists of multiple data elements arranged into greater than one dimension and can be thought of as a higher-dimensional object. Transitions and loops can use these data objects in their conditions and calculations. This means that there must be a precise way to discuss all data objects.

Figure 15:
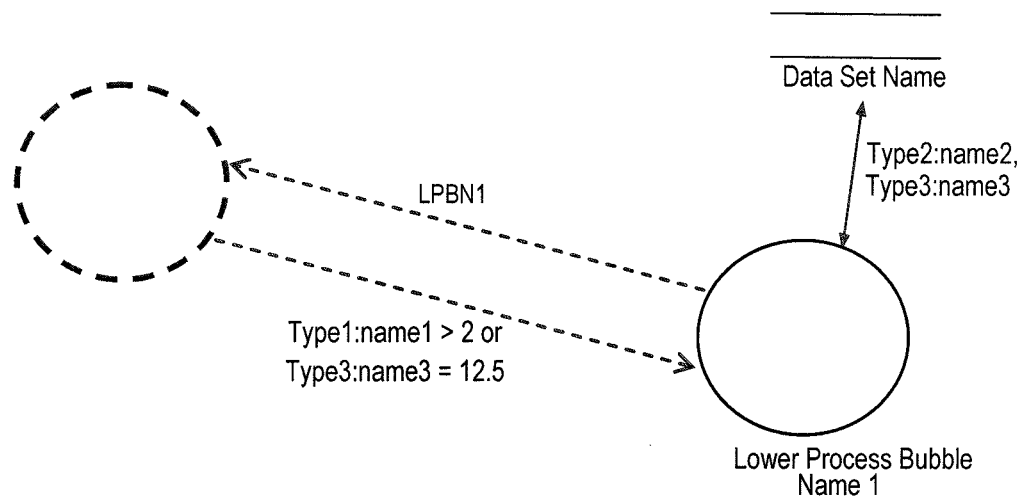
FIG. 15 shows an example of multiple data on lines and multiple conditions on transition.

As with the looping structures, there can be multiple data elements per input/output data line or transition. This means that the line or transition can be identified using a label that points to the appropriate definition, as shown in FIGS. 15 and 16, which respectively show functional decomposition and finite state machine views.

Figure 16:
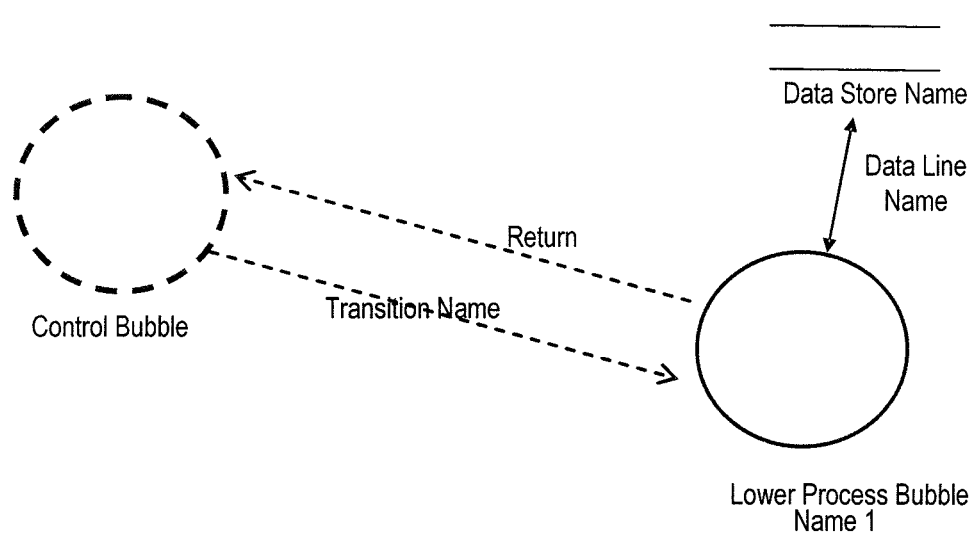
FIG. 16 shows an example of transition and data lines using labels.

Selection of the labeled transition in FIG. 16 would then display:

| TRANSITION NAME | |
| --- | --- |
| Condition 1 | Type1: name2 > 2 |
| Condition 2 | Type3: name3 = 12.5 |

Selection of the labeled data line in FIG. 16 would then display:

| DATA LINE NAME | |
| --- | --- |
| Data Element 1 | Type2: name2 |
| Data Element 2 | Type3: name3 |

Variables

A variable only requires a label and a type in order to identify it. The following composite label will fully identify a variable:

Type:variableName

Figure 17:
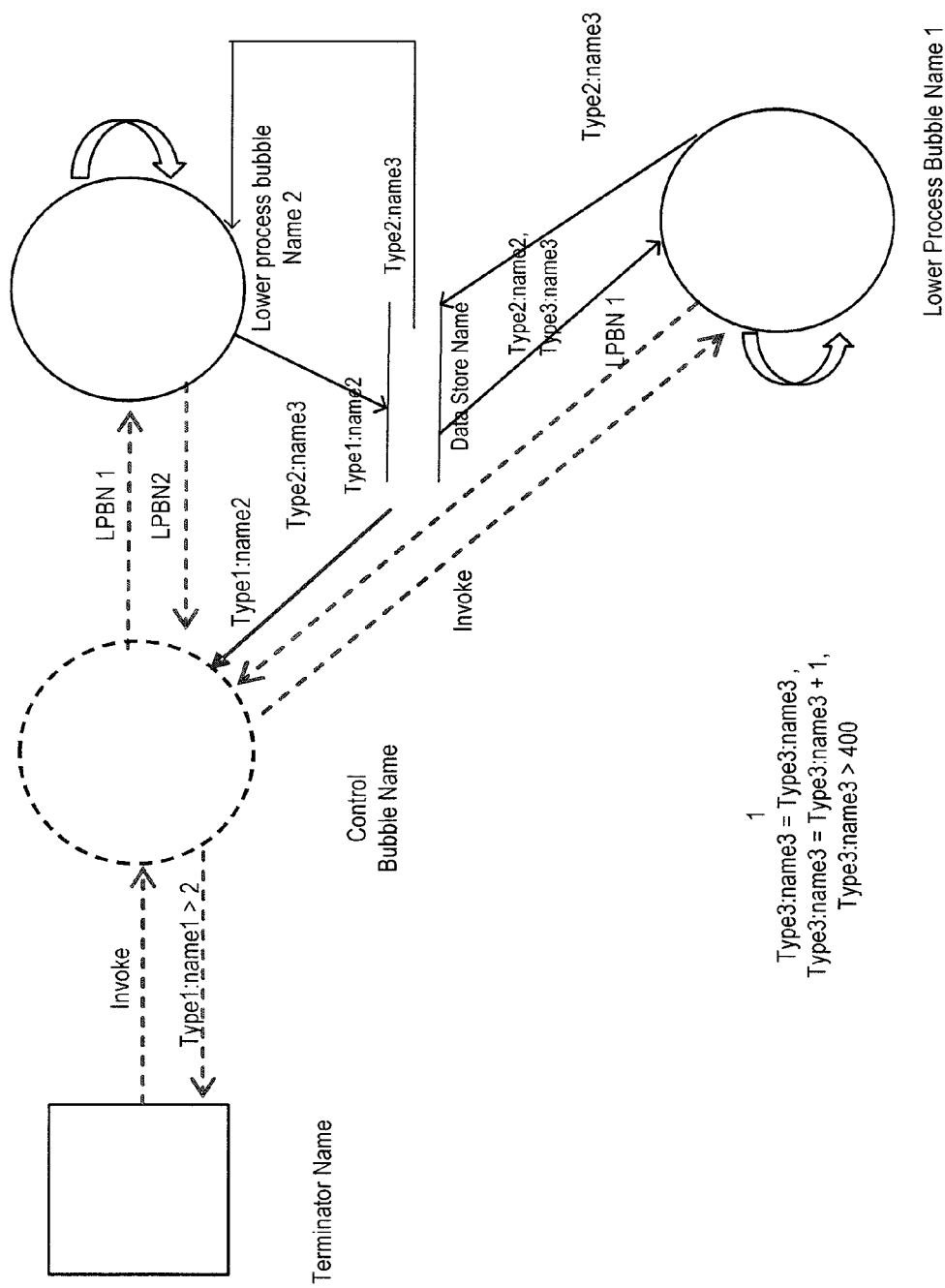
FIG. 17 is an exemplary lower level decomposition diagram with composite variable names, functional decomposition view.

The composite variable name changes the "Function Parameters Names" to a comma-separated list of composite variable names, as shown in FIG. 17, which is a functional decomposition view of an exemplary lower level decomposition with composite variable names.

Arrays

An array requires a composite consisting of a label, a type, and an array index or element number to identify it. The following composite label will fully identify an array:

Type:variableName:"index or element #"

If the symbol after the second colon is a Greek symbol, it represents an index; otherwise, it represents an array element. The first index represents a row in MPfd, the second index a column, and the third index the matrix depth.

Designating multiple array elements does not designate a loop, only the movement of a certain number of variables.

Figure 18:
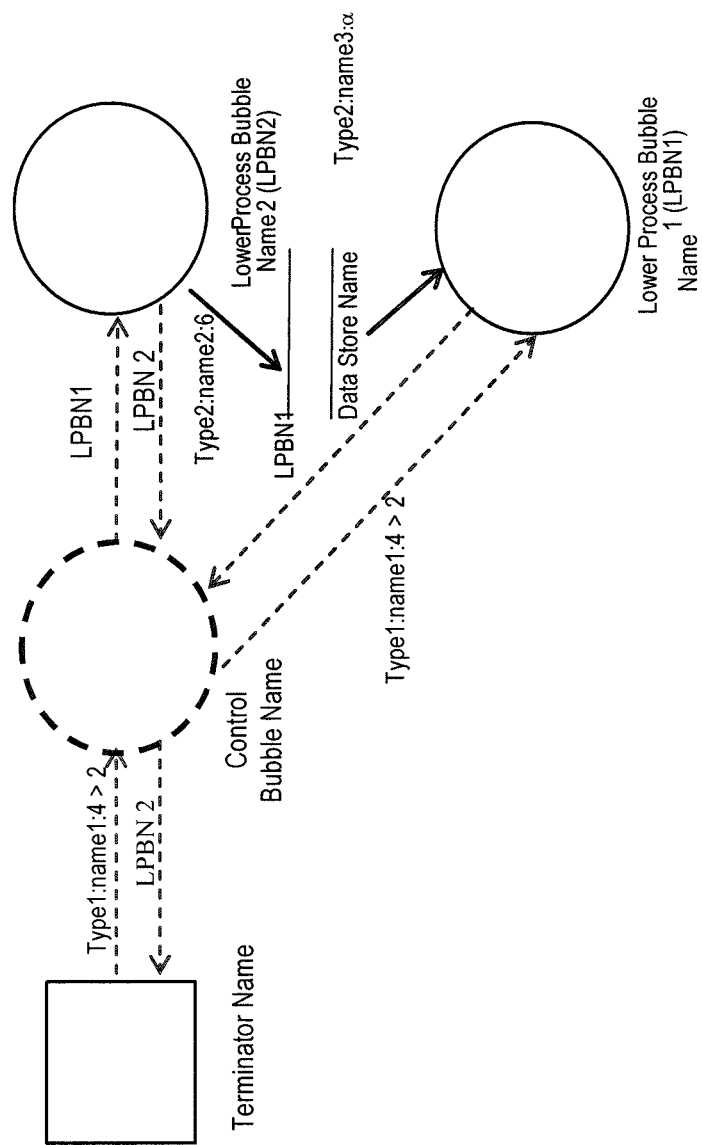
FIG. 18 is an exemplary lower level decomposition diagram without composite array names and dimensionality.
Figure 19:
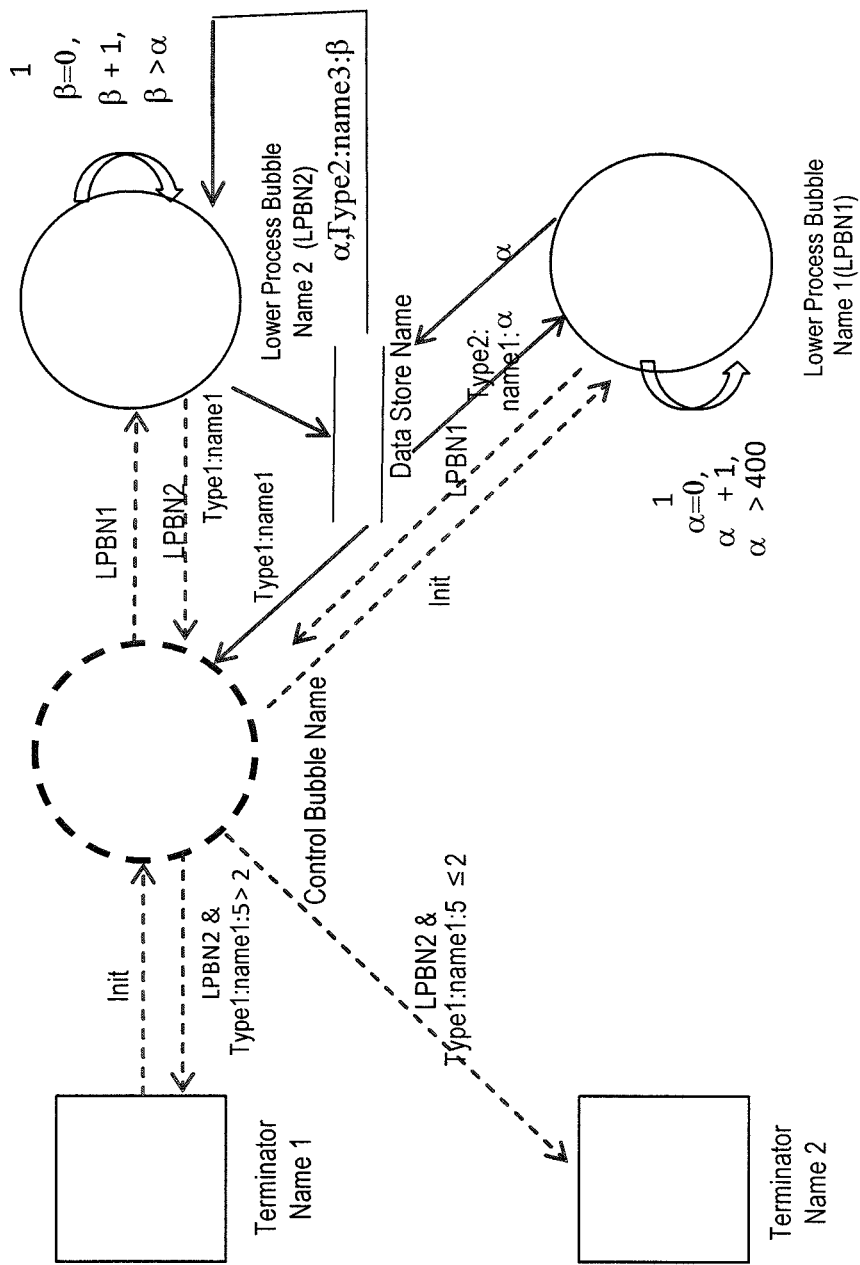
FIG. 19 is an exemplary lower level decomposition diagram with composite array names and dimensionality.

The composite array name changes the "Function Parameters Names" to a comma-separated list of composite array names, as shown in FIG. 18 (lower level decomposition diagram without composite array names and dimensionality) and FIG. 19 (lower level decomposition diagram with composite array names and dimensionality).

Matrices

A matrix requires a composite consisting of a label, a type, and multiple array element designations to identify it. The following composite label will fully identify an array:

Type:variableName a, b, . . . n

Each matrix element represents a matrix dimension. The first element represents the first dimension, the second element the second dimension, etc.

Figure 20:
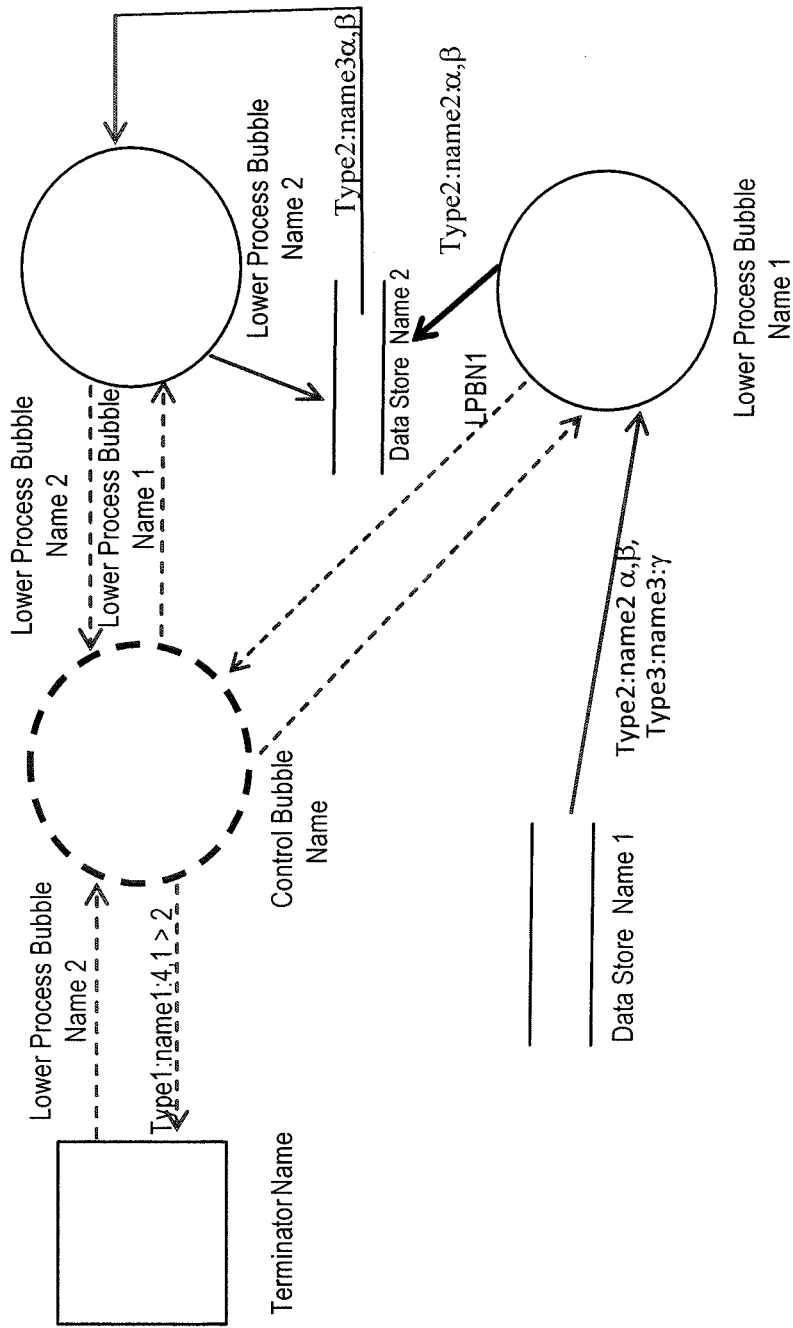
FIG. 20 is an exemplary lower level decomposition diagram with composite matrix names with multiple dimensions.

The composite matrix name changes the "Function Parameters Names" to a comma-separated list of composite matrix names, as shown in FIG. 20, which illustrates a lower level decomposition with composite matrix names with multiple dimensions.

Profiling to Determine Node Count

Determining how well a process bubble will scale requires knowing how much exposed work and how much exposed communication time is present. The work time can be obtained by measuring the execution time of the process bubble's attached code with data of a known size. The data comes from the test plans and procedures that are attached to every process bubble of every project designed using the MPfd model. The communication time comes from the a priori determination of actual communication time and actual latency time. As long as the following criteria is met, computational elements can be added to increase the processing performance of a process bubble, as shown in Equation 2:

Profile Parallel Target $$S_t/(M_t+E_t)>T \qquad \text{Equation 2}$$

Where:
$S_t$=Single-node processing time
$M_t$=Multi-node processing time
$E_t$=Exposed communication time The target value T can be set by the present system. Profiling will continue until the condition is no longer met. The minimum, maximum, and median dataset sizes associated with a design bubble for a particular kernel or algorithm are used to calculate the number of processing elements for any dataset size greater than the minimum and less than the maximum.

Automatic Selection of Data Movement Model

In computer science parlance, there are two ways to transmit data into a function: pass-by-value and pass-by-reference. Pass-by-value simply means that only the contents of some memory location are transmitted to the function. Sending the contents of a memory location is equivalent to having a constant as an input parameter. That is, all changes made to the value are kept internal to the function with none of those changes accessible outside of the function. This provides for the "encapsulation" of data, insuring that unwanted side effects do not occur between functions. Pass-by-reference allows a function to have multiple output parameters.

The following information is associated with a data element on an MPfd: composite name, input designation, and output designation. The input/output designations are a function of the directions of the lines associated with the composite name. The three possibilities are input, output, or both.

Pass by Value

In an MPfd, pass-by-value is another way of saying that a scalar data element (not an array or matrix) is only input into a function, never output from a function. A constant value must also be passed by value as there is no variable, hence no possibility of referencing a memory location. The input-only scalar data element or constant must use pass-by-value, insuring that the data use is encapsulated. Thus, whenever a scalar or constant input is used in an MPfd, it will signify the use of the pass-by-value method.

Pass by Reference

If the composite name in an MPfd refers to vector data (an array or matrix), particular data elements must be accessible. In computer programming, such access occurs as an offset to some base location. Thus, the base memory location must be transmitted to the function. Also, if the contents of a memory location must change (as is the case for output scalars), the memory location of the data element needs to be known. In both cases, a memory location is passed to the function, called referencing, and the contents of the memory location(s) accessed, called dereferencing. This allows the memory locations to be accessed and changed, with the changes visible to other functions simply using the same differencing method.

Functional Decomposition Data Transmission Model

Since it is possible for an MPfd to determine the data transmission model (pass-by-value or pass-by-reference) automatically from information generated as part of an MPfd, one of the most confusing aspects of modern computer programming can now be performed automatically, from design.

Automatic Detection of Parallel Algorithm Decomposition

There are two types of parallel processing indicators that can be included on MPfd design diagrams: structural and non-structural. Structural parallel indicators are determined by the design without any extra information. Task parallelism is an example of structural indication. Other types of parallelism detectable via structural indication include: transpose detection, parallel I/O detection, scatter detection, and gather detection.

Non-structural parallel indicators need more information than is usually given in design in order to determine the type of parallelism. Variable definitions in computer languages only support the following information: variable name, variable type, and number of dimensions. Parallelizing a code requires two other types of information: topology and data intent. Topology defines the computational behavior at the edges of a vector or matrix—examples include: Cartesian, toroidal, and spherical.

Data intent is the intended use of the data; examples include:

(1) particle-like usage—the data represents particles that move throughout a matrix and may interact,
(2) field-like usage—a force that affects to some degree data across a large section of the matrix simultaneously,
(3) search-like intent—data that interacts with a larger set of data, giving some result, and
(4) series expansions/contractions—calculation of the terms of a mathematical series.

The present MPfd method allows a designer to indicate the algorithm processing topology and the data intent, giving the design the information required to complete the parallel processing. The topology can be calculated by the present system 100 based upon the data intent. Alternatively, the topology information can be added to the vector or matrix information of the input data of a transformation by the designer.

Since an algorithm is defined as a functional decomposition element, it can be decomposed into multiple, simpler algorithms and/or kernels. As previously noted, a functional decomposition element, herein represented by a bubble symbol, can decompose into two types: associated and unassociated. Association has to do with the next-level decomposition of the bubble. Depending on the association type, loops defined at a higher decomposition level behave differently when they are integrated into a lower decomposition level.

Figure 21:
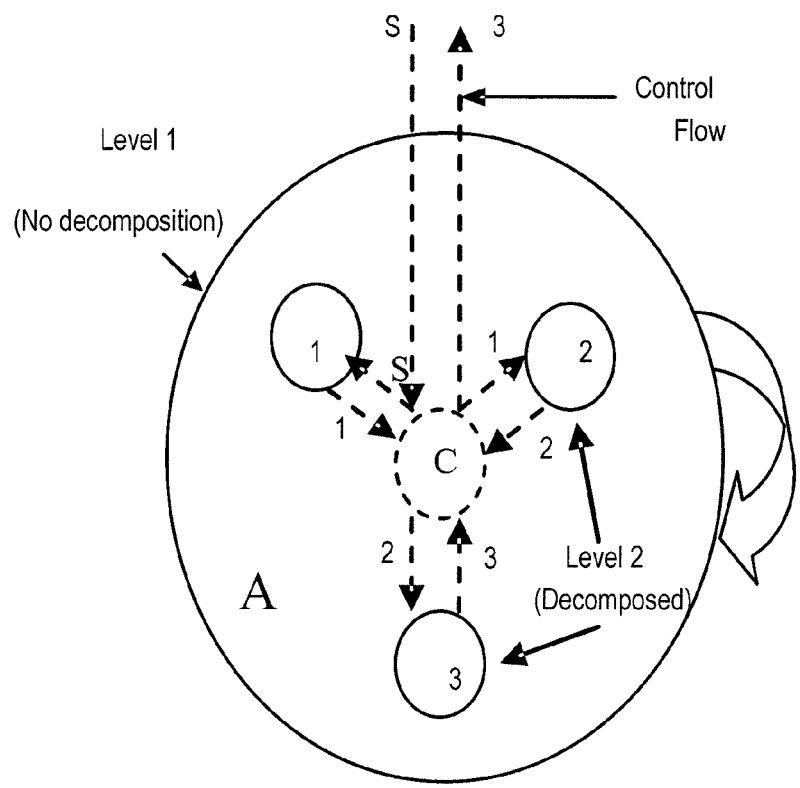
FIG. 21 shows an example of associated bubbles linked via control-flows.

If the un-decomposed bubble labeled "A" is decomposed into bubbles labeled "1", "2", "3", and "C" then the un-decomposed bubble is said to reside at Level 1. Bubbles "1", "2", "3", and "C" are said to reside at Level 2. If the control-flows link together the level 2 bubbles then those bubbles are said to be associated. FIG. 21 shows an example of associated level-2 bubbles linked via control-flows.

If a looping structure is added to Level 1 (Bubble A) then this is interpreted to have the following effect on Level 2:1) the loop will start with the activation of the first process bubble and end with the last process-bubble ending, 2) the loop will continue to restart the first process bubble until the end-of-loop condition occurs, and 3) upon completion of the loop, control will be transferred back to the original level-1-defined control bubble or terminator. This is also shown in FIG. 21.

Figure 22:
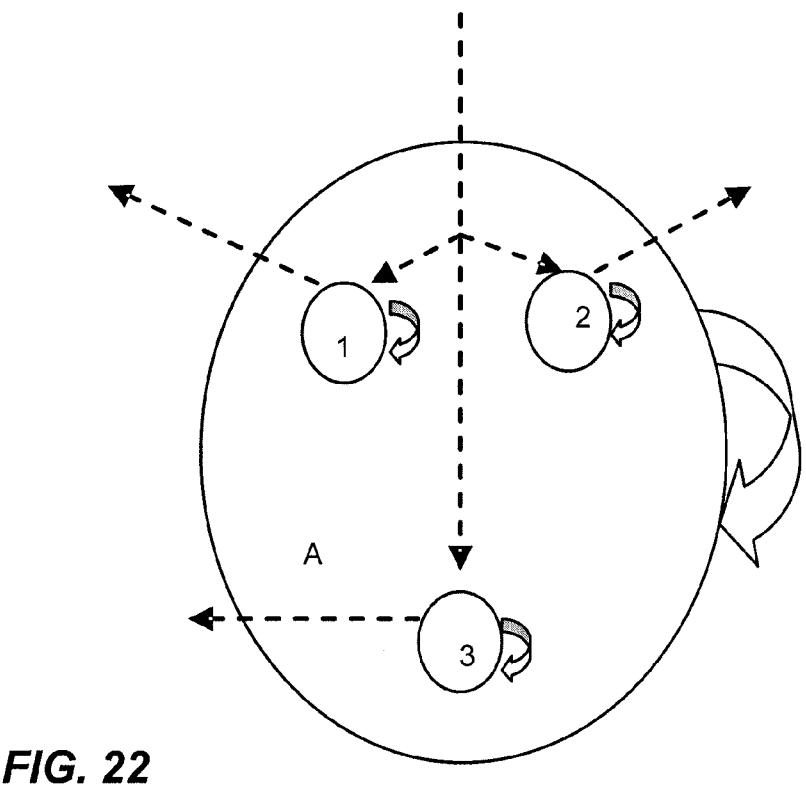
FIG. 22 shows an example of unassociated bubbles.

If the control-flows do not link together the level 2 bubbles, those bubbles are said to be unassociated. FIG. 22 shows an example of unassociated level-2 bubbles.

Figure 23:
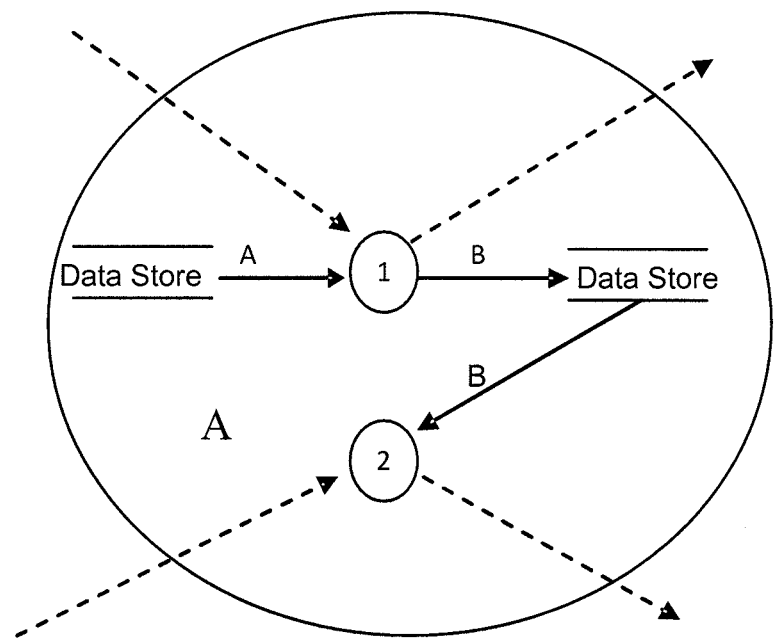
FIG. 23 shows an example of data associated bubble.

If a looping structure is added to Level 1 (Bubble A) then the looping structure is added to each of the unassociated level 2 bubbles. This is shown in FIG. 23. It is possible for level 2 bubbles to appear to be unassociated because no control-flow binds them but be associated instead via data. Data-associated level 2 bubbles are shown in FIG. 23.

Figure 24:
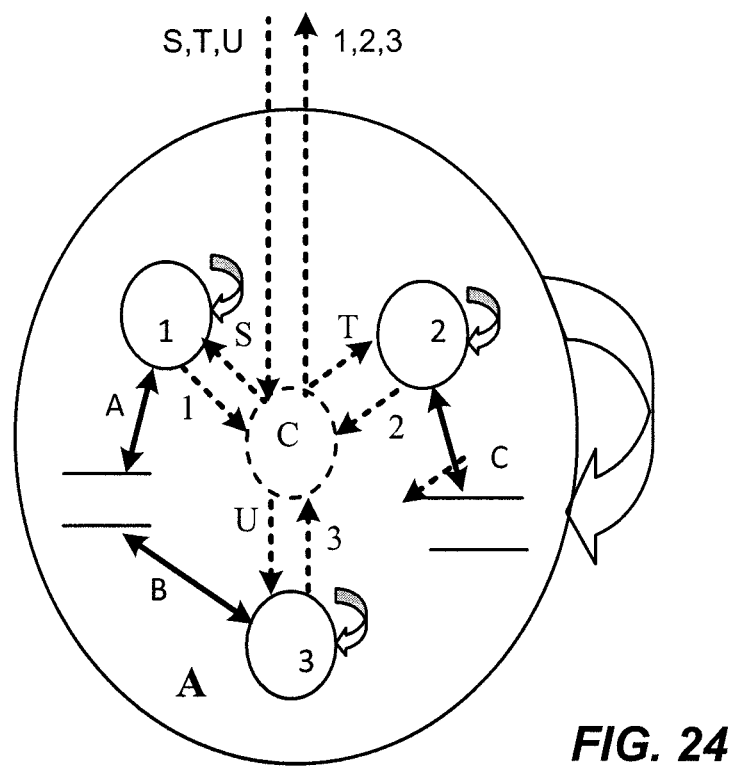
FIG. 24 shows an example of control linked, unassociated level-2 bubbles.

Similarly, it is possible to have level-2 bubbles which use the same control structure actually be unassociated as long as neither the control-flows nor the data associates them. This type of unassociated bubble structure is shown in FIG. 24.

Figure 25:
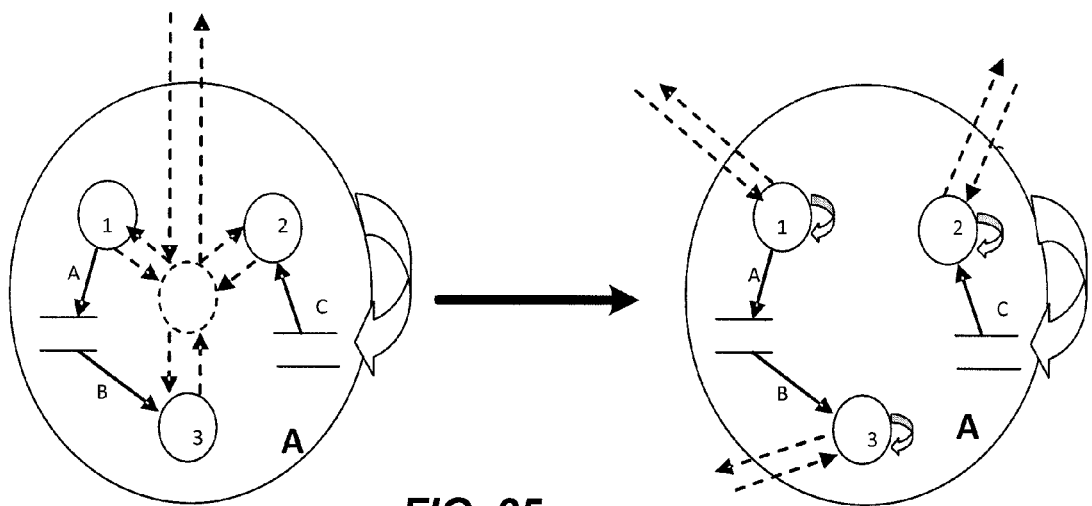
FIG. 25 shows an example of transformation to standard unassociated form.
Figure 26:
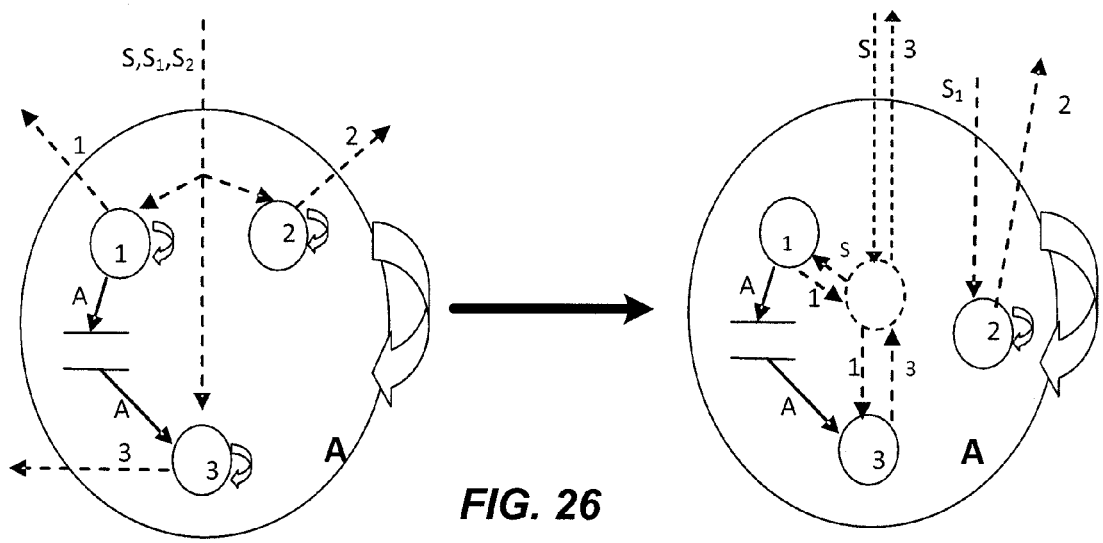
FIG. 26 shows an example of transformation to standard associated form.

If the decomposition is incorrect, it is sometimes possible to rearrange the decomposition based upon association. An example of this transformation to standard unassociated form is shown in FIG. 25. Similarly, it is sometimes possible to rearrange the decomposition based upon un-association, as shown in FIG. 26, which is an example showing transformation to standard associated form.

Unassociated Process Bubbles Indicating Task Parallelization

Figure 27:
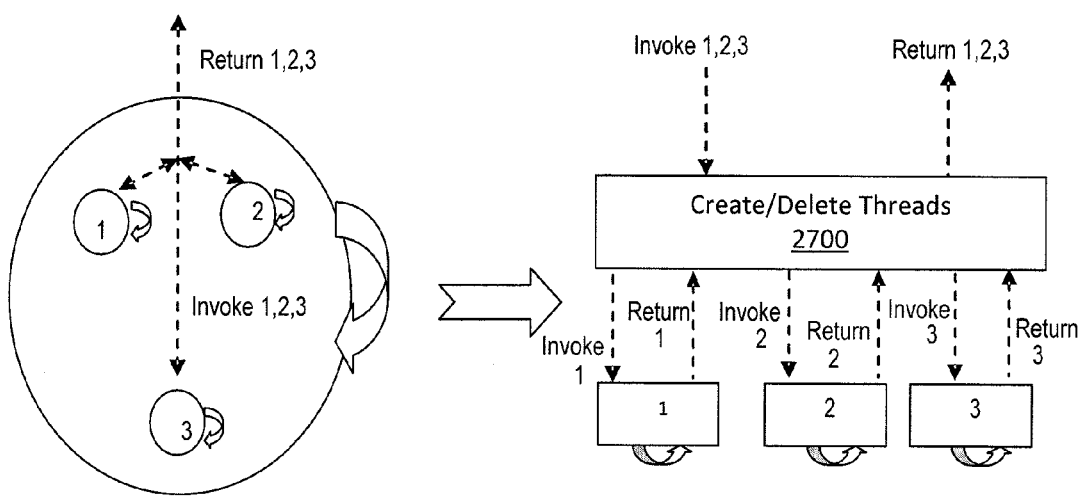
FIG. 27 shows an example of unassociated process bubbles to task parallel indicating finite state machine.

When process bubbles are grouped together but are not associated, this indicates that those processes can occur at the same time if the tasks are executed on parallel hardware. FIG. 27 shows unassociated process bubbles to task parallel indicating finite state machine. Block 2700 indicates a new state made by the system, creating task level parallelism.

Transpose Notation

Figure 28:
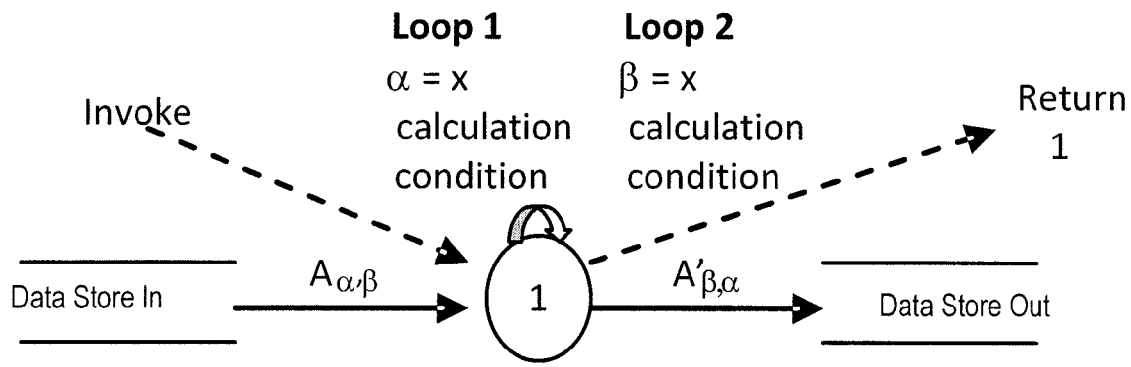
FIG. 28 shows an example of transpose notation, functional decomposition view.
Figure 29:
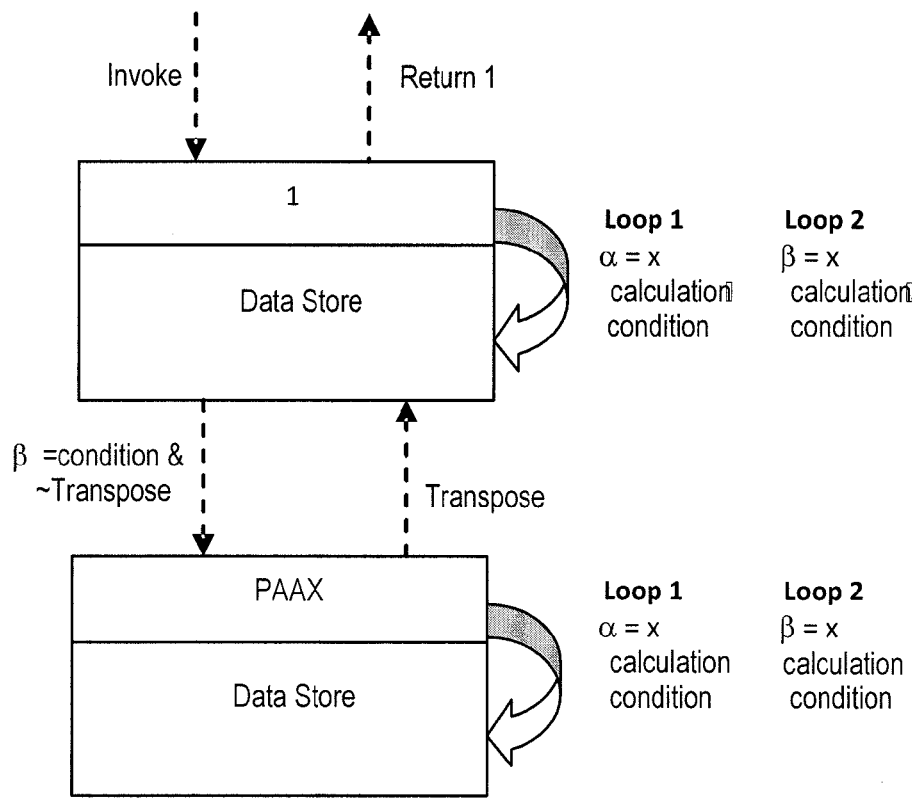
FIG. 29 shows an example of transpose notation, finite state machine view.

By telling the functional decomposition elements that a vector's or an array's data comes in and is processed then leaves, an opportunity to perform a scatter/gather operation (described below) is defined. The indices on an input vector or matrix are reversed on the output version of the same matrix, and the indices are found in the loop, as shown in FIG. 28, which shows a transpose notation in functional decomposition view. Note that the accent mark by the second "A" means that at least one element of array A has been changed. FIG. 29 shows a transpose notation in finite state machine view.

Scatter/Gather Notation

Figure 30:
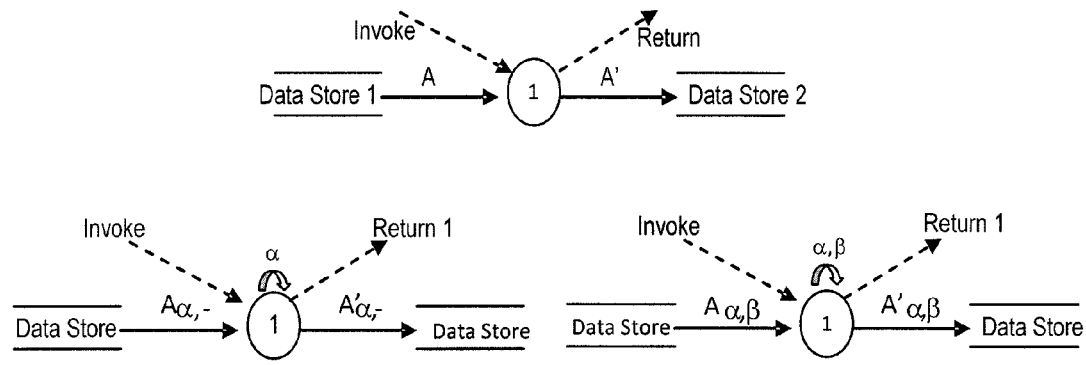
FIG. 30 shows an example of scatter/gather notation, functional decomposition view.
Figure 31:
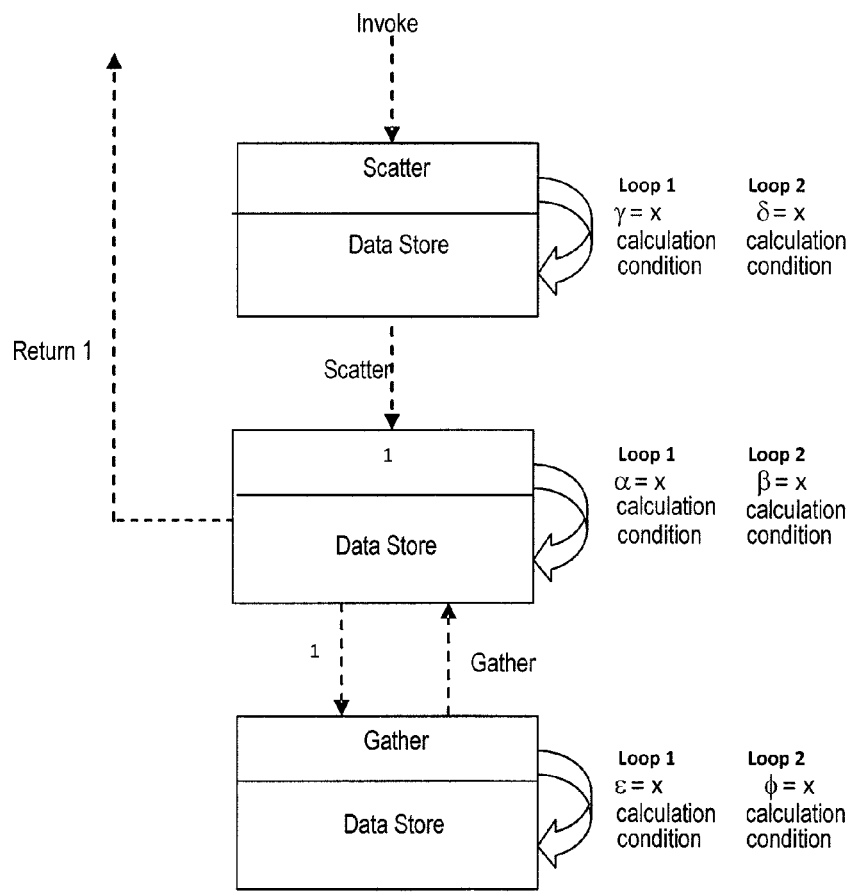
FIG. 31 shows an example of scatter/gather, finite state machine view.

A scatter/gather moves data to multiple nodes or gathers information from multiple nodes. The indices of the loops match the active indices of the data, and the order of the data indices does not change. FIG. 30 shows an example of scatter/gather notation, functional decomposition view, and FIG. 31 shows the corresponding finite state machine view. Note that if bubble 1 is the first activated process bubble then "A'" is an input. if bubble 1 is the last process bubble then "A" is an output matrix.

Parallel Input/Output Indication

Figure 32:
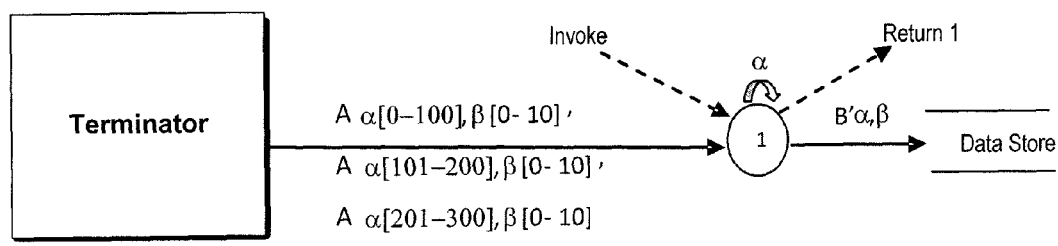
FIG. 32 shows an example of parallel i/o indication.

Parallel input and output is defined as being from/to a terminator block. Since a terminator block represents another system interfacing with the currently under-design system, obtaining data from this external system is considered input and transmitting data to this external system is considered output. Inputs and outputs to/from terminator blocks can designate that data for the same vector or matrix is being received or sent via separate, parallel data lines by adding the "[ ]" designator to the vector or matrix index. For example, the following are parallel input-data streams defined, as shown in FIG. 32:

$A_{\alpha[0-100],\beta[0-10]}$=2-dimensional array "A" with indexes $\alpha$ and $\beta$.

Elements 0 through 100 of index $\alpha$ and elements 0 through 10 of index $\beta$ are input.

$A_{\alpha[101-200],\beta[0-10]}$=2-dimensional array "A" with indexes $\alpha$ and $\beta$.

Elements 101 through 200 of index $\alpha$ and elements 0 through 10 of index $\beta$ are input.

Figure 33:
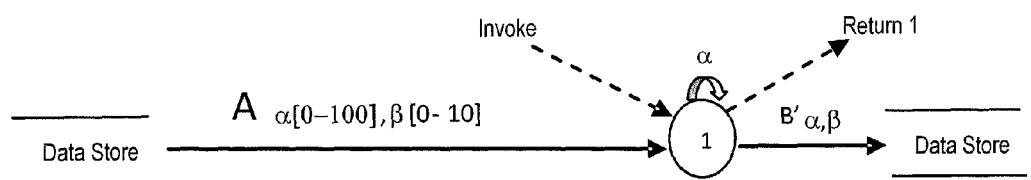
FIG. 33 shows an example of selecting particular matrix elements.

$A_{\alpha[201-300],\beta[0-10]}$=2-dimensional array "A" with indexes $\alpha$ and $\beta$ Output works analogously. If separate vector or matrix elements are input/output to/from a process bubble but not to/from a terminator, then a simple element selection is indicated. An example of selecting particular matrix elements is shown in FIG. 33, wherein process element "1" receives data elements from the "A" matrix rows 0 through 100 and columns 0 through 10.

Decomposition Completeness

Figure 34A:
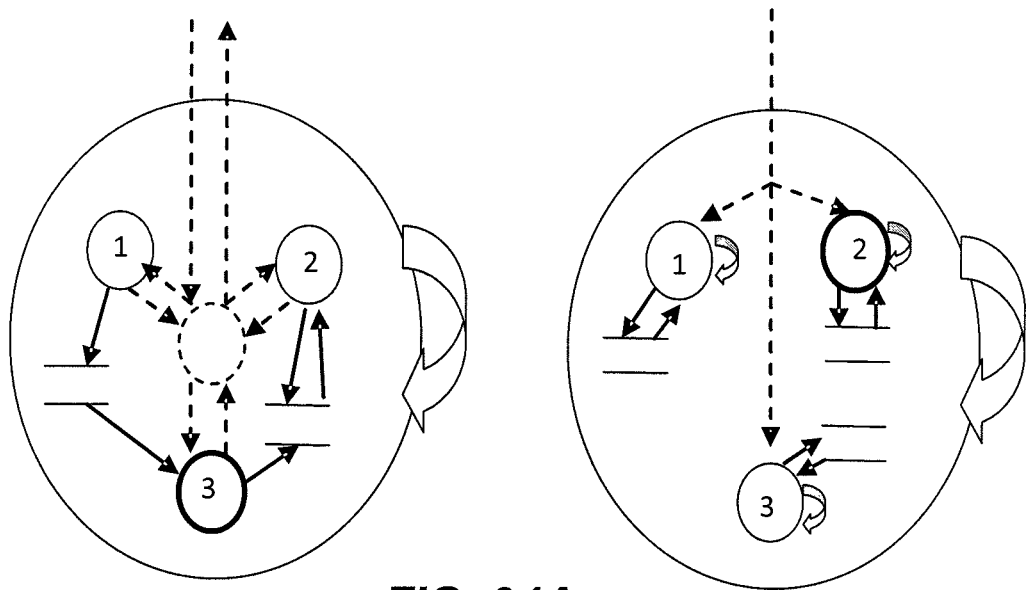
FIGS. 34*a* and 34*b* show examples of incomplete decomposition.
Figure 34B:
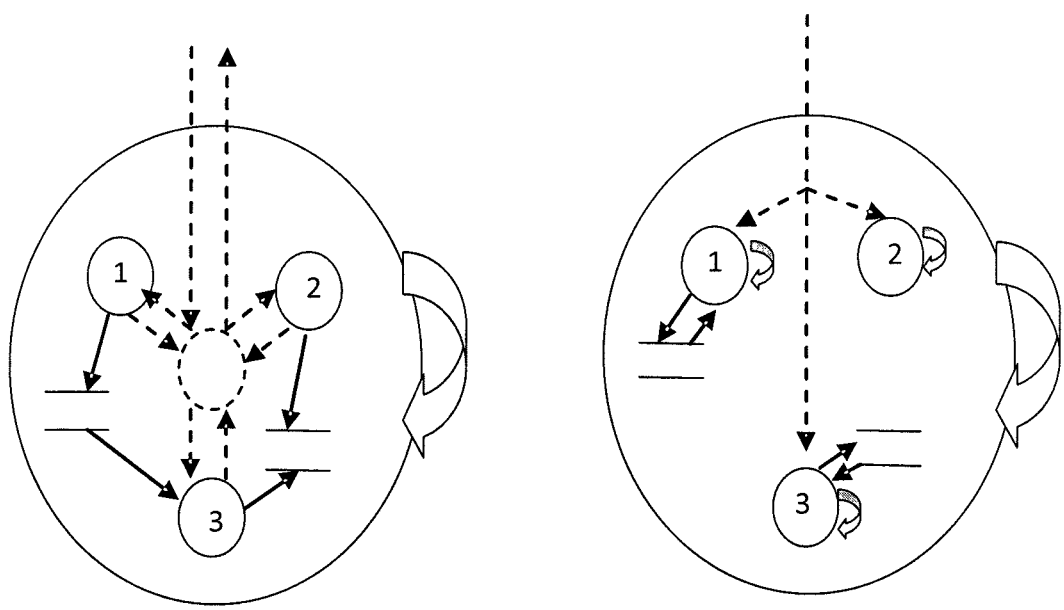

The present system can automatically determine if a functional decomposition is complete, as indicated in FIGS. 34A/34B, which illustrate examples of incomplete decomposition. One example of incomplete decomposition is shown in FIG. 34A. If there is at least one algorithm (bubble 3 in the left-hand diagram, or bubble 2 in the right-hand diagram) which does not decompose into only process and control kernels (the remaining bubbles in FIG. 34A) then the decomposition is incomplete. Another example of incomplete decomposition is shown in FIG. 34B. If there is a bubble that does not have at least one input and one output then the decomposition is considered incomplete.

Cross-Communication Notation

Data-type issues typically revolve around the concept of data primitive types: integer, real, double, complex, float, string, binary, etc. Groups of data entities are discussed via their dimensionality, as structures, or as structures containing data entities with various dimensionalities. Data primitives, data group structure, and dimensionality all represent a static view of the data. In an MPfd, this information is placed in a table that appears on data flows and data stores. Table 2, below, is an example of a table that provides this information.

TABLE 2

VARIABLE DESCRIPTION

| Variable Name | Variable Description | Variable Type | # Dimensions | Dimension Sizes | Topology |
|---|---|---|---|---|---|
| | | | | | |

The variable name gives a name to an object for the Decomposition Analysis graph. The description is a text description of the variable just named. The variable type is the data-primitive type. The number of dimensions describes the dimensionality of the variable: 0-dimension means a standard variable, 1-dimension a vector, and >1-dimension a matrix. The dimension size is required for >1-dimensional objects to indicate the number of variable objects that occur in each dimension. The topology explains how the >0-dimensional object treats its space.

The following are potential topologies: unconnected edges: Cartesian; connected edges: 1-dimension (ring), 2-dimensions (cylindrical, toroid, spherical), and 3-dimensions (hyper-cube). The topology information follows the variable.

In computer systems, data is rarely static; it is moved, transformed, combined, and taken apart: data in computer systems is typically dynamic. The dynamic use of the data is an attribute that is not typically shown in standard representations of data for computer use. With the advent of parallel processing, the dynamic aspects of the data are needed for the selection of the proper parallel processing technique. Examples of the graphical depiction of possible dynamic data usage are shown below.

Monotonic Data Use

Concept:

Linked calculations whose workload grows or shrinks after each calculation.

Use:

Whenever the workload changes monotonically for each component calculation in a series of calculations.

Example Use:

Arbitrary precision series expansion calculation of transcendental numbers.

Parallel Issue:

Load balancing. Since the workload changes monotonically, the last calculation has a workload that is very different from the first calculation. Since the computation time of a group of nodes working on a single problem is equal to computation time of the slowest node and, further, since the effect of naively placing the work in the same order as the calculation order is to concentrate the work onto a single node, this produces a non-optimal parallel solution.

Topology Effects: None

Action: Create a mesh to provide load balancing.

Action Example: The purpose of this mesh type is to provide load balancing when there is a monotonic change to the work load as a function of which data item is used. The profiler shall calculate the time it takes to process each element. Below shows a naive attempt to parallelize such a problem. Sixteen work elements are distributed over four computational nodes. The work increases or decreases monotonically with the work-element number. Below is a 1-dimensional example of a naive work distribution of a monotonic workload-changing problem.

TABLE 3

NAIVE WORK DISTRIBUTION OF A MONOTONIC WORKLOAD CHANGING PROBLEM

| Node # | $Node_1$ | $Node_2$ | $Node_3$ | $Node_4$ |
|---|---|---|---|---|
| Work Elements | 1, 2, 3, 4 | 5, 6, 7, 8, | 9, 10, 11, 12 | 13, 14, 15, 16 |

The mesh shown in Table 3 decomposes the work elements by dividing the number of work elements by the number of nodes and assigning each work element to each node in a linear fashion.

Instead of linearly assigning work elements to nodes, the work elements can be alternated to balance the work. For monotonic workload changes, this means the first and last elements are paired, the second and second-to-last elements are paired, etc., as shown in Table 4:

TABLE 4

NON-NAÏVE WORK 1-DIMENSIONAL DISTRIBUTION OF A MONOTONIC WORKLOAD CHANGING PROBLEM

| Node # | $Node_1$ | $Node_2$ | $Node_3$ | $Node_4$ |
|---|---|---|---|---|
| Work Elements | 1, 16, 2, 15 | 3, 14, 4, 13, | 5, 12, 6, 11 | 7, 10, 8, 9 |

Figure 35:
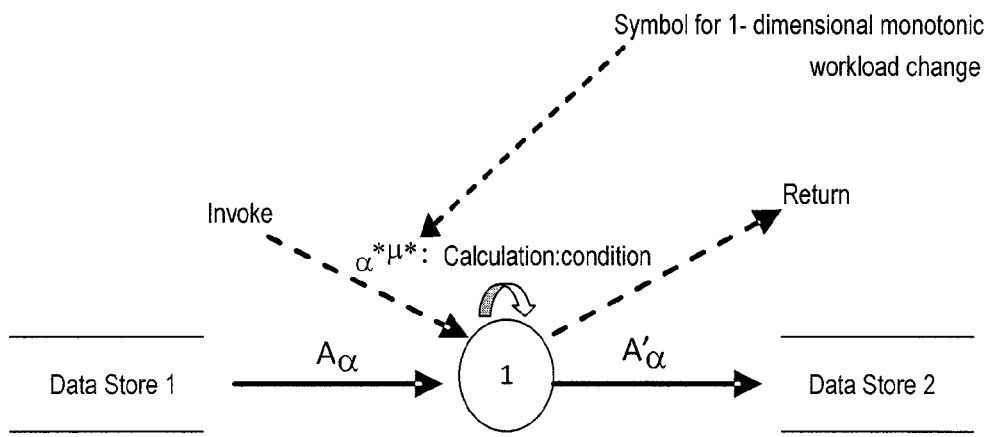
FIG. 35 shows an example of a 1-dimensional monotonic workload symbol, functional decomposition view.

FIG. 35 shows a 1-dimensional monotonic workload symbol in functional decomposition view. If a one-dimensional workload is monotonic, then that information is given to MPfd with the symbols shown in FIG. 35. The symbol $\alpha^{u*}$ means that the work (represented as the work within a loop) changes monotonically and that this workload effect applies to vector "A". That is, $\alpha^{*\square*}$ means that index alpha is intended to access the data monotonically. Thus the alpha is the loop index and the *mu* is the intended use of the data accessed using the alpha index.

Figure 36:
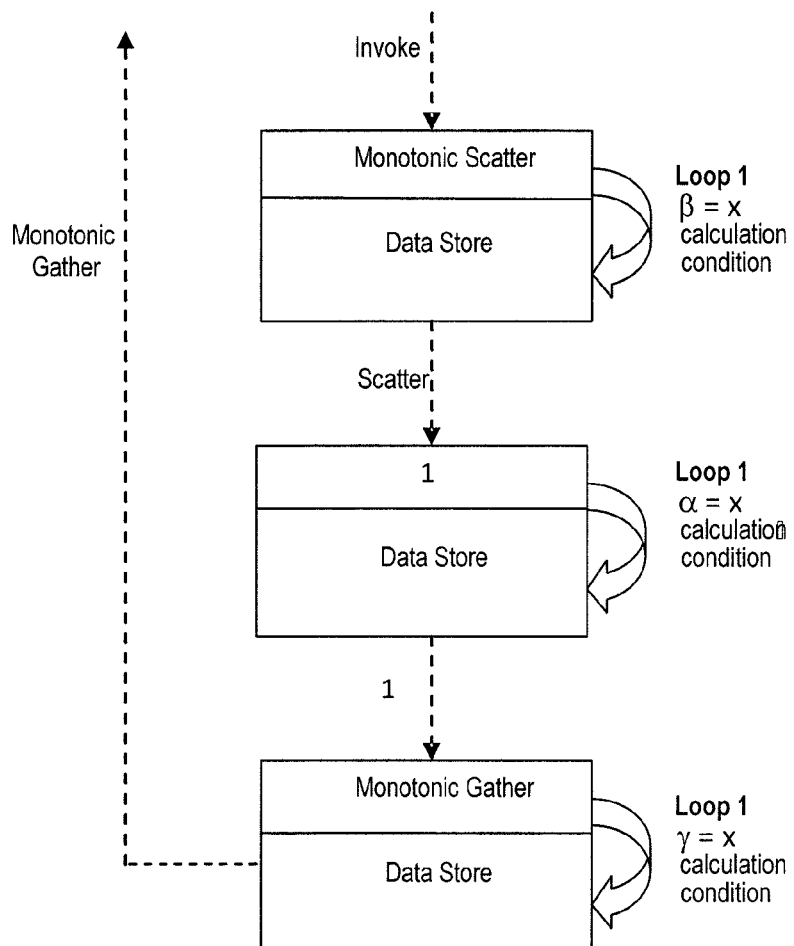
FIG. 36 shows an example of a 1-dimensional monotonic workload symbol, finite state machine view.

Note that, for brevity, the loop is defined by (index:calculation:condition) where the index is the loop index plus any clarifying symbol by the loop index, the calculation is the next index-value calculation, and the condition is the loop-ending condition. FIG. 36 shows a 1-dimensional monotonic workload symbol in finite state machine view. Table 5, below, shows a two-dimensional version of the monotonic workload-changing mesh.

TABLE 5

NON-NAIVE WORK 2-DIMENSIONAL DISTRIBUTION OF A MONOTONIC WORKLOAD CHANGING PROBLEM

|    | X1 | | X2 | |
|----|----|----|----|----|
| Y1 | 1, 64, 2, 63 | 3, 62, 4, 61 | 5, 60, 6, 59 | 7, 58, 8, 57 |
|    | 9, 56, 10, 55 | 11, 54, 12, 53 | 13, 52, 14, 51 | 15, 50, 16, 49 |
| Y2 | 17, 48, 18, 47 | 19, 46, 20, 45 | 21, 44, 22, 43 | 23, 42, 24, 41 |
|    | 25, 40, 26, 39 | 27, 38, 28, 37 | 29, 36, 30, 35 | 31, 34, 32, 33 |

If a two-dimensional workload is monotonic then that information is given to MPfd with the following symbols. The symbol means that the work (represented as the work within a loop) changes monotonically and that this workload effect applies to vector "A".

Figure 37:
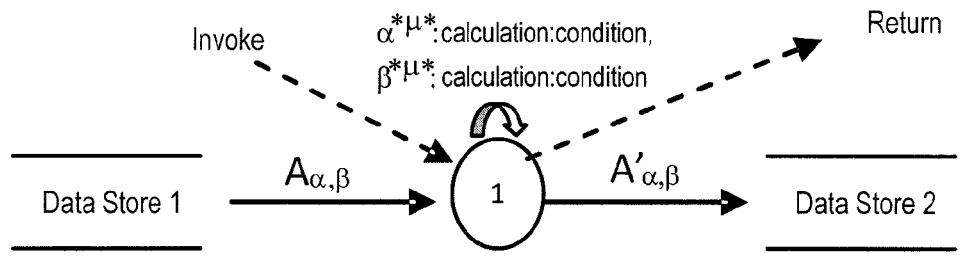
FIG. 37 shows an example of a 2-dimensional monotonic workload symbol, functional decomposition view.
Figure 38:
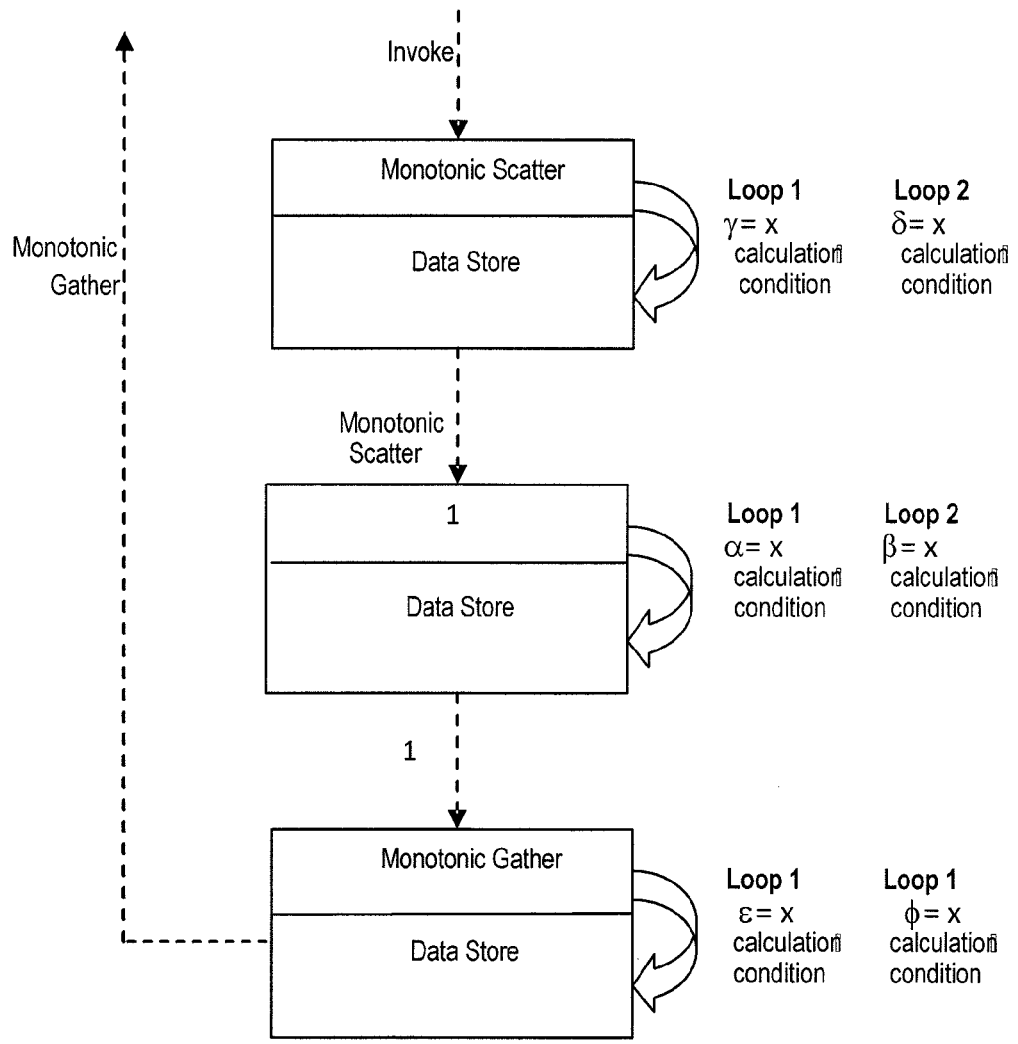
FIG. 38 shows an example of a 2-dimensional monotonic workload symbol, finite state machine view.

FIG. 37 shows a 2-dimensional monotonic workload symbol in functional decomposition view, and FIG. 38 shows a 2-dimensional monotonic workload symbol in finite state machine view.

Table 6, below, shows a three-dimensional version of the monotonic workload-changing mesh.

TABLE 6

NON-NAIVE WORK 2-DIMENSIONAL DISTRIBUTION OF A MONOTONIC WORKLOAD CHANGING PROBLEM

|    | X1 | | X2 | |
|----|----|----|----|----|
| Z1 | | | | |
| Y1 | 1, 256, 2, 255 | 3, 254, 4, 253 | 5, 252, 6, 251 | 7, 250, 8, 249 |
|    | 9, 248, 10, 247 | 11, 246, 12, 245 | 13, 244, 14, 243 | 15, 242, 16, 241 |
| Y2 | 17, 240, 18, 239 | 19, 238, 20, 237 | 21, 236, 22, 235 | 23, 234, 24, 233 |
|    | 25, 232, 26, 231 | 27, 230, 28, 229 | 29, 228, 30, 227 | 31, 226, 32, 225 |
| Z2 | | | | |
| Y1 | 33, 224, 34, 223 | 35, 222, 36, 221 | 37, 220, 38, 219 | 39, 218, 40, 217 |
|    | 41, 216, 42, 215 | 43, 214, 44, 213 | 45, 212, 46, 211 | 47, 210, 48, 209 |
| Y2 | 49, 208, 50, 207 | 51, 206, 52, 205 | 53, 204, 54, 203 | 55, 202, 56, 201 |
|    | 57, 200, 58, 199 | 59, 198, 60, 197 | 61, 196, 62, 195 | 63, 194, 64, 193 |
| Z3 | | | | |
| Y1 | 65, 192, 66, 191 | 67, 190, 68, 189 | 69, 188, 70, 187 | 71, 186, 72, 185 |

TABLE 6-continued

NON-NAIVE WORK 2-DIMENSIONAL DISTRIBUTION OF A MONOTONIC WORKLOAD CHANGING PROBLEM

|    | X1 | | X2 | |
|----|----|----|----|----|
|    | 73, 184, 74, 183 | 75, 182, 76, 181 | 77, 180, 78, 179 | 79, 178, 80, 177 |
| Y2 | 81, 176, 82, 175 | 83, 174, 84, 173 | 85, 172, 86, 171 | 87, 170, 88, 169 |
|    | 89, 168, 90, 167 | 91, 166, 92, 165 | 93, 164, 94, 163 | 95, 162, 96, 161 |
| Z4 | | | | |
| Y1 | 97, 160, 98, 159 | 99, 158, 100, 157 | 101, 156, 102, 155 | 103, 154, 104, 153 |
|    | 105, 152, 106, 151 | 107, 150, 108, 149 | 109, 148, 110, 147 | 111, 146, 112, 145 |
| Y2 | 113, 144, 114, 143 | 115, 142, 116, 141 | 117, 140, 118, 139 | 119, 138, 120, 137 |
|    | 121 136, 122, 135 | 123, 134, 124, 133 | 125, 132, 126, 131 | 127, 130, 128, 129 |

Figure 3:
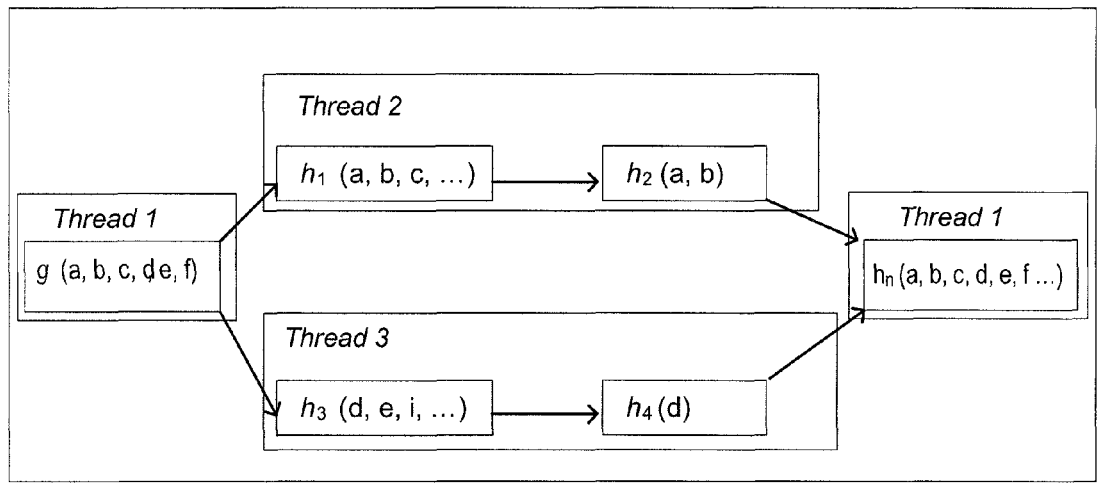
FIG. 3 shows an example of multiple threads from decomposition of function with dissimilar parameters.
Figure 39:
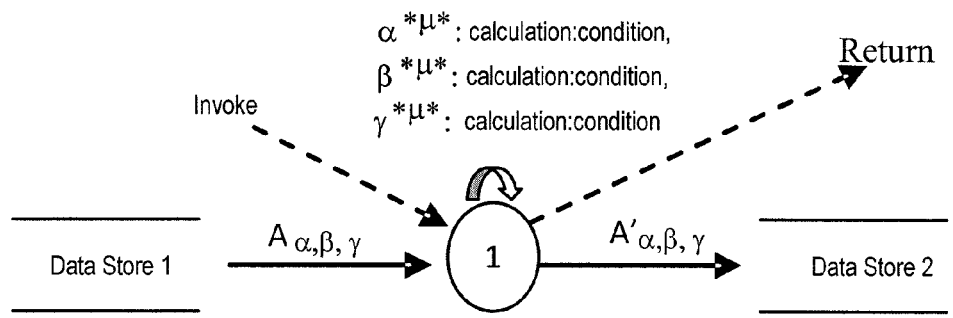
FIG. 39 shows an example of a 3-dimensional monotonic workload symbol, functional decomposition view.
Figure 40:
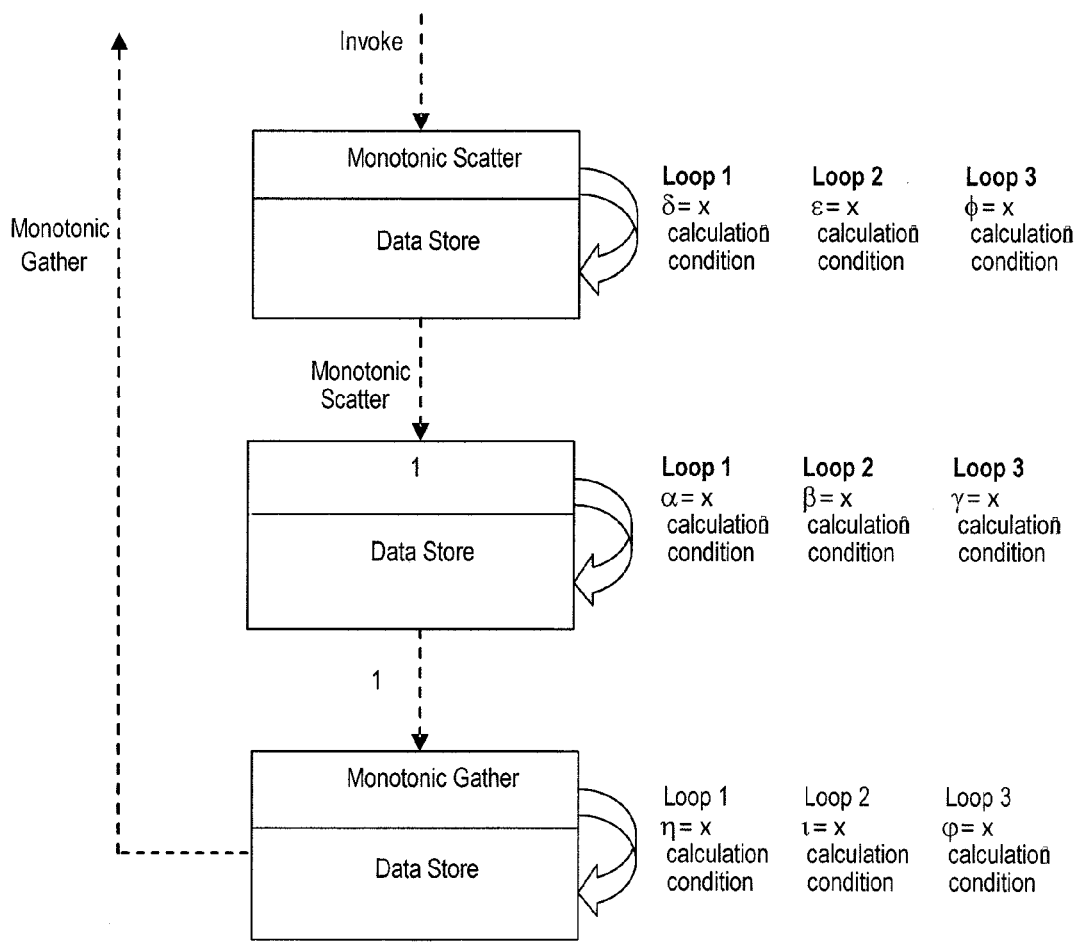
FIG. 40 shows an example of a 3-dimensional monotonic workload symbol, finite state machine view.

FIG. 39 3-dimensional monotonic workload symbol in functional decomposition view, and FIG. 40 shows a 3-dimensional monotonic workload symbol in finite state machine view. If a three-dimensional workload is monotonic then that information is given to MPfd with the symbol shown in FIG. 39. There are three symbols attached to the three loops  These symbols mean that the work (represented as the work within a loop) changes monotonically and that this workload effect applies to vector "A".

Particle Use Model
  Concept:
  Particles are used to define discrete objects that move about a vector or array.
  Use:
  Modeling physical phenomenon, atoms, ray-traces, fluids, etc.
  Example Use
  Computational fluid dynamics, changing image analysis.
  Parallel Issue:
  Information sharing.
  Action:
  Determine what to cross communicate.
  A one-dimensional particle exchange with Cartesian topology generates the following version (shown in Tables 7 and 8) of a left-right exchange.

TABLE 7

INITIAL 1-DIMENSIONAL CONDITION BEFORE LEFT-RIGHT EXCHANGE
(Cartesian Topology)

| Node # | $Node_1$ | $Node_2$ | $Node_3$ | $Node_4$ |
|---|---|---|---|---|
| Work Elements | 1, 2, 3, 4 | 5, 6, 7, 8 | 9, 10, 11, 12 | 13, 14, 15, 16 |

TABLE 8

1-DIMENSIONAL CONDITION AFTER ONE LEFT-RIGHT EXCHANGE

| Node # | $Node_1$ | $Node_2$ | $Node_3$ | $Node_4$ |
|---|---|---|---|---|
| Work Elements | 1, 2, 3, 5 | 4, 6, 7, 9 | 8, 10, 11, 13 | 12, 14, 15, 16 |

A one-dimensional particle exchange with a Ring topology generates the following version (shown in Table 9 and 10) of a left-right exchange.

TABLE 9

INITIAL 1-DIMENSIONAL CONDITION BEFORE LEFT-RIGHT EXCHANGE
(Ring Topology)

| Node # | Node$_1$ | Node$_2$ | Node$_3$ | Node$_4$ |
|---|---|---|---|---|
| Work Elements | 1, 2, 3, 4 | 5, 6, 7, 8 | 9, 10, 11, 12 | 13, 14, 15, 16 |

TABLE 10

1-DIMENSIONAL CONDITION AFTER ONE LEFT-RIGHT EXCHANGE
(Ring Topology)

| Node # | Node$_1$ | Node$_2$ | Node$_3$ | Node$_4$ |
|---|---|---|---|---|
| Work Elements | 16, 2, 3, 5 | 4, 6, 7, 9 | 8, 10, 11, 13 | 12, 14, 15, 1 |

Note: Node$_4$ edge information wraps around to node$_1$ and node$_1$ wraps around to node$_4$ in the Ring topology version of the left-right exchange.

Figure 41:
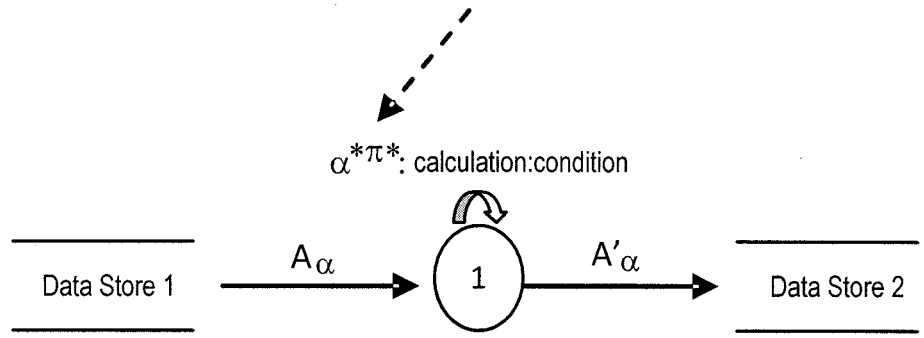
FIG. 41 shows an example of a left-right exchange symbol—no stride, functional decomposition view.
Figure 42:
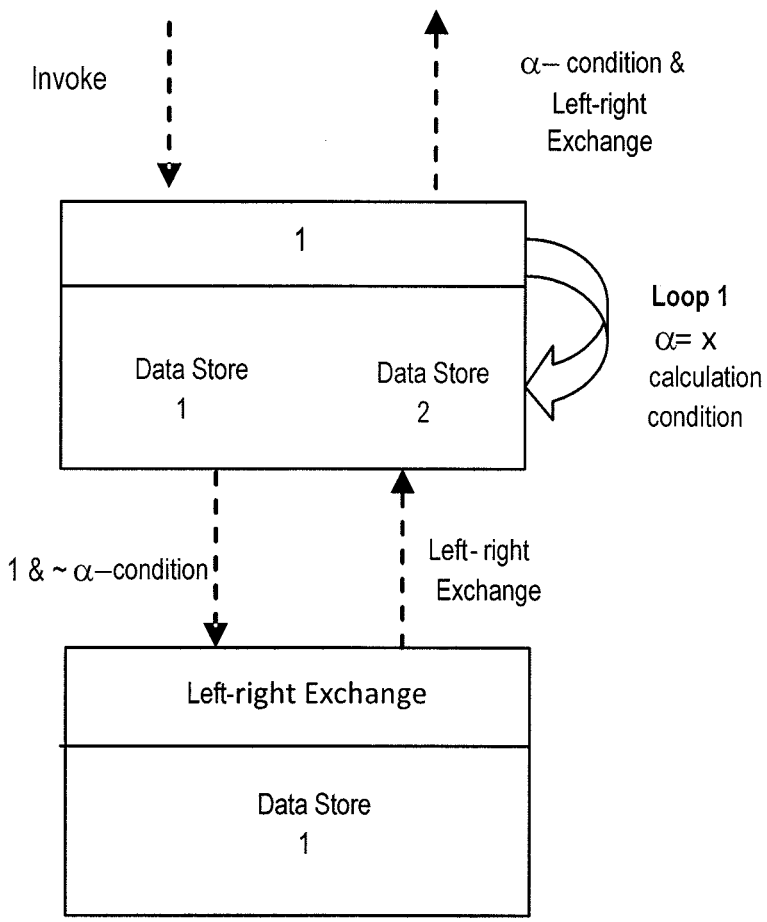
FIG. 42 shows an example of a left-right exchange symbol—no stride, finite state machine view.

FIG. 41 (functional decomposition view) depicts a left-right exchange symbol (*π*) indicating no stride, also shown in the finite state machine view of FIG. 42. If a one-dimensional vector is used to depict particles then the *π* symbol shown in FIG. 41 is used.

Figure 43:
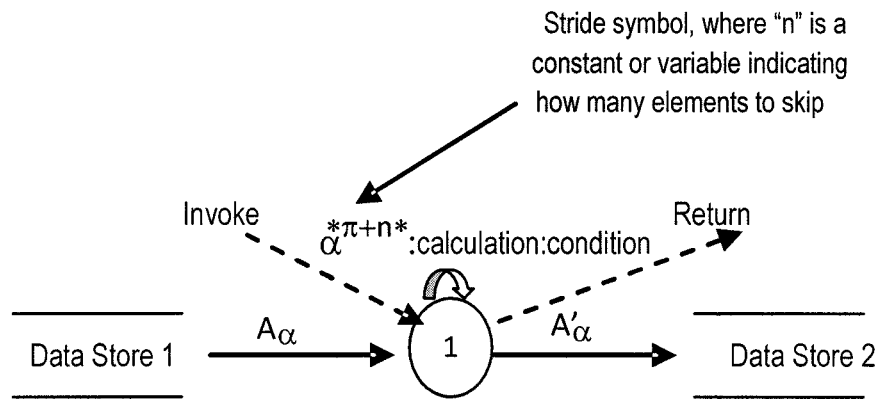
FIG. 43 shows an example of a left-right exchange—with stride, functional decomposition view.
Figure 44:
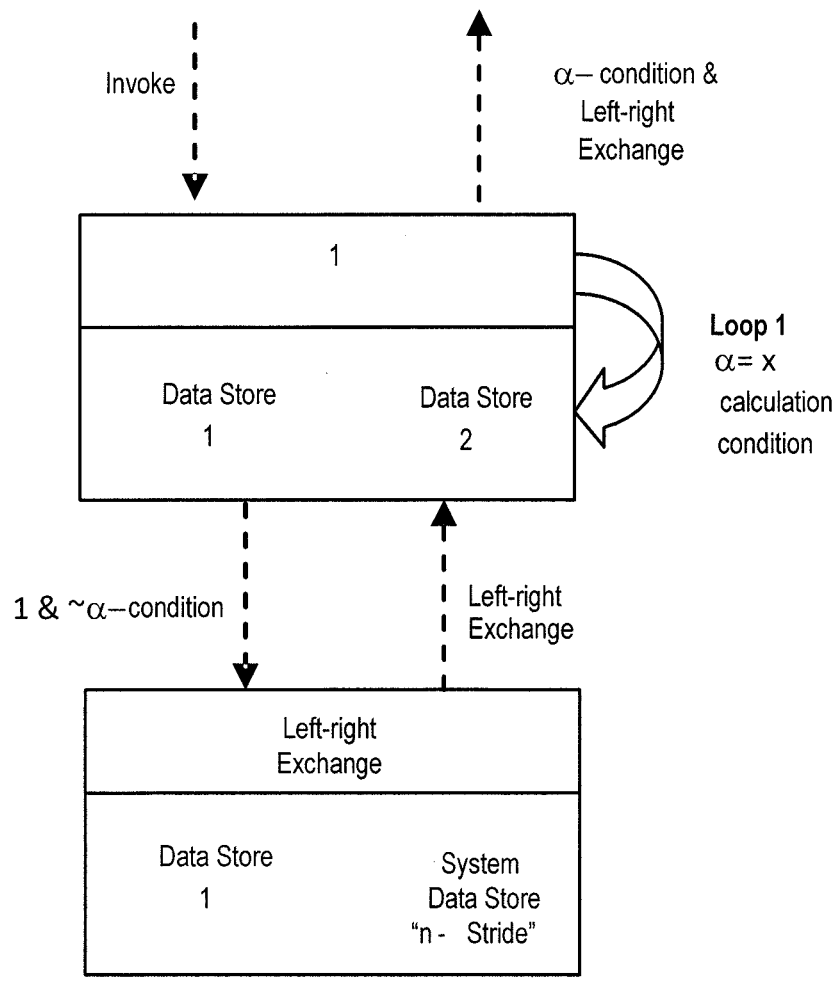
FIG. 44 shows an example of a left-right exchange—with stride, finite state machine view.

If the processing of the vector skips one or more elements (called striding) then less data needs to be exchanged. The index calculation on the loop indicator can be modified to *π+n* to indicate striding. FIG. 43 depicts a left-right exchange—with stride in a functional decomposition view, and FIG. 44 depicts a left-right exchange in finite state machine view.

A two-dimensional particle exchange with Cartesian topology, generates the following version (shown in Table 11 below) of a next-neighbor exchange (edge-number exchange only).

TABLE 11

INITIAL 2-DIMENSIONAL CONDITION BEFORE NEXT-NEIGHBOR EXCHANGE (CARTESIAN TOPOLOGY)

| | X1 | | X2 | |
|---|---|---|---|---|
| Y1 | 1, 2, 3, 4 | 5, 6, 7, 8 | 9, 10, 11, 12 | 13, 14, 15, 16 |
| | 17, 18, 19, 20 | 21, 22, 23, 24 | 25, 26, 27, 28 | 29, 30, 31, 32 |
| Y2 | 33, 34, 35, 36 | 37, 38, 39, 40 | 41, 42, 43, 44 | 45, 46, 47, 48 |
| | 49, 50, 51, 52 | 53, 54, 55, 56 | 57, 58, 59, 60 | 61, 62, 63, 64 |

TABLE 12

2-DIMENSIONAL CONDITION AFTER ONE NEXT-NEIGHBOR EXCHANGE (CARTESIAN TOPOLOGY)

| | X1 | | X2 | |
|---|---|---|---|---|
| Y1 | 1, 2, 3, 4 | 5, 6, 7, 9 | 8, 10, 11, 12 | 13, 14, 15, 16 |
| | 33, 34, 35, 36 | 37, 38, 39, (25, 41, 40) | (24, 41, 40), 42, 43, 44 | 45, 46, 47, 48 |
| Y2 | 17, 18, 19, 20 | 21, 22, 23, (24, 25, 41) | (40, 24, 25), 26, 27, 28 | 29, 30, 31, 32 |
| | 49, 50, 51, 52 | 53, 54, 55, 57 | 56, 58, 59, 60 | 61, 62, 63, 64 |

Note: Parenthesis indicates that the information here is overlaid such that the underlying code treats it as if it were adjacent memory.

A two-dimensional particle exchange with Cylindrical topology generates the following version (shown in Tables 13 and 14) of a next-neighbor exchange (edge-number exchange only).

TABLE 13

INITIAL 2-DIMENSIONAL CONDITION BEFORE NEXT-NEIGHBOR EXCHANGE (CYLINDRICAL TOPOLOGY)

| | X1 | | X2 | |
|---|---|---|---|---|
| Y1 | 1, 2, 3, 4 | 5, 6, 7, 8 | 9, 10, 11, 12 | 13, 14, 15, 16 |
| | 17, 18, 19, 20 | 21, 22, 23, 24 | 25, 26, 27, 28 | 29, 30, 31, 32 |
| Y2 | 33, 34, 35, 36 | 37, 38, 39, 40 | 41, 42, 43, 44 | 45, 46, 47, 48 |
| | 49, 50, 51, 52 | 53, 54, 55, 56 | 57, 58, 59, 60 | 61, 62, 63, 64 |

TABLE 14

2-DIMENSIONAL CONDITION AFTER ONE NEXT-NEIGHBOR EXCHANGE (CYLINDRICAL TOPOLOGY)

| | X1 | | X2 | |
|---|---|---|---|---|
| Y1 | 49, 50, 51, 52 | 53, 54, 55, (9, 56, 57) | (8, 57, 56), 58, 59, 60 | 61, 62, 63, 64 |
| | 33, 34, 35, 36 | 37, 38, 39, (25, 41, 40) | (24, 41, 40), 42, 43, 44 | 45, 46, 47, 48 |
| Y2 | 17, 18, 19, 20 | 21, 22, 23, (24, 25, 41) | (40, 24, 25), 26, 27, 28 | 29, 30, 31, 32 |
| | 1, 2, 3, 4 | 5, 6, 7, (8, 57, 9) | (56, 9, 8), 10, 11, 12 | 13, 14, 15, 16 |

A two-dimensional particle exchange with Toroid topology generates the version of a next-neighbor exchange (edge-number exchange only) shown in Tables 15 and 16 below.

TABLE 15

INITIAL 2-DIMENSIONAL CONDITION BEFORE NEXT-NEIGHBOR EXCHANGE (TOROID TOPOLOGY)

| | X1 | | X2 | |
|---|---|---|---|---|
| Y1 | 1, 2, 3, 4 | 5, 6, 7, 8 | 9, 10, 11, 12 | 13, 14, 15, 16 |
| | 17, 18, 19, 20 | 21, 22, 23, 24 | 25, 26, 27, 28 | 29, 30, 31, 32 |
| Y2 | 33, 34, 35, 36 | 37, 38, 39, 40 | 41, 42, 43, 44 | 45, 46, 47, 48 |
| | 49, 50, 51, 52 | 53, 54, 55, 56 | 57, 58, 59, 60 | 61, 62, 63, 64 |

TABLE 16

2-DIMENSIONAL CONDITION AFTER ONE NEXT-NEIGHBOR EXCHANGE
(Toroid Topology)

| | X1 | | X2 | |
|---|---|---|---|---|
| Y1 | (49, 16), 50, 51, 52 | 53, 54, 55, (9, 56, 57) | (8, 57, 56), 58, 59, 60 | 61, 62, 63, (64, 1) |
| | (33, 32), 34, 35, 36 | 37, 38, 39, (25, 41, 40) | (24, 41, 40), 42, 43, 44 | 45, 46, 47, (48, 17) |
| Y2 | (17, 48), 18, 19, 20 | 21, 22, 23, (24, 25, 41) | (40, 24, 25), 26, 27, 28 | 29, 30, 31, (32, 33) |
| | (1, 64), 2, 3, 4 | 5, 6, 7, (8, 57, 9) | (56, 9, 8), 10, 11, 12 | 13, 14, 15, (16, 49) |

Figure 45:
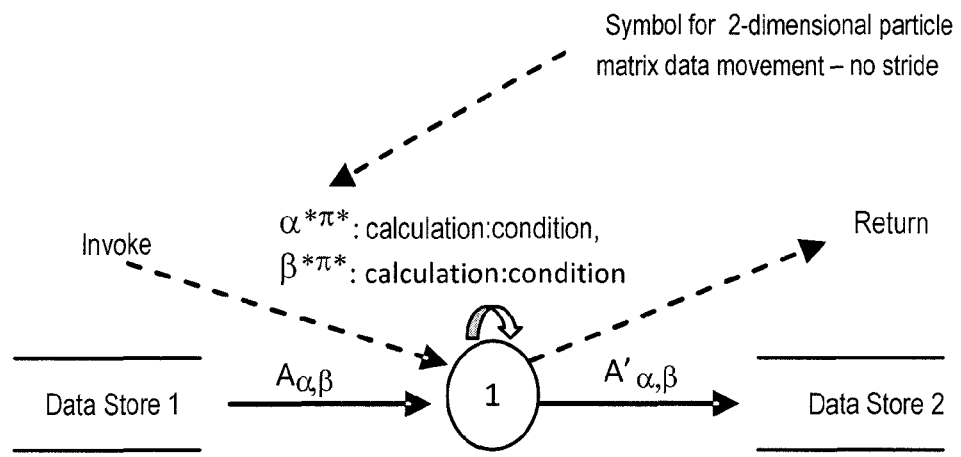
FIG. 45 shows an example of a next-neighbor exchange symbol—no stride, functional decomposition view.
Figure 46:
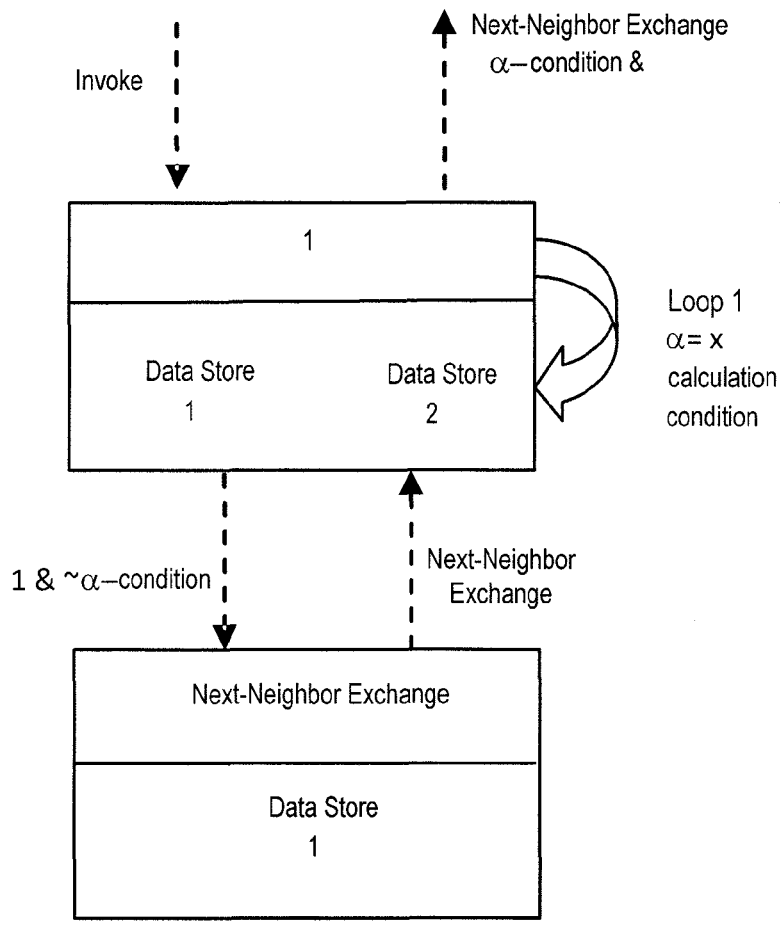
FIG. 46 shows an example of a next-neighbor exchange—no stride, finite state machine view.
Figure 47:
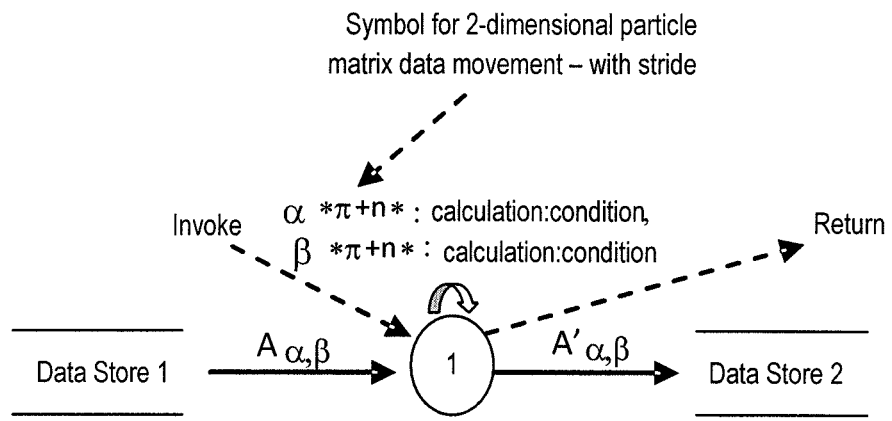
FIG. 47 shows an example of a next-neighbor exchange symbol—with stride, functional decomposition view.
Figure 48:
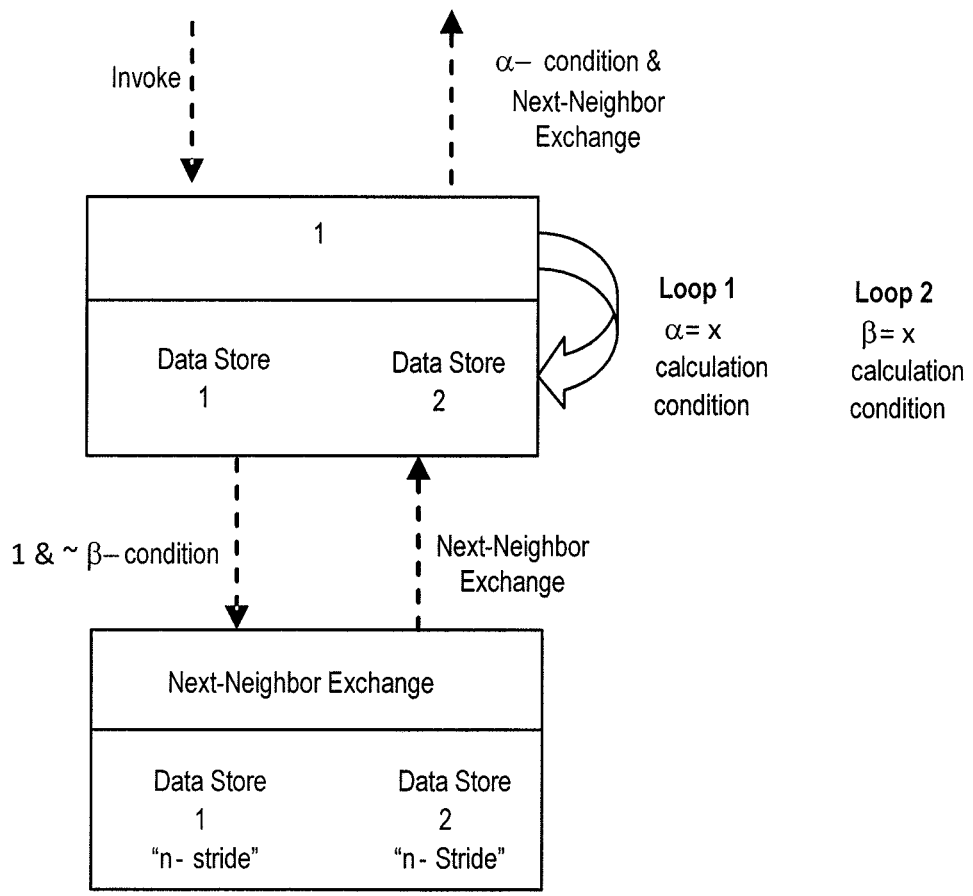
FIG. 48 shows an example of a next-neighbor exchange—with stride, finite state machine view.

FIG. 45 shows a next-neighbor exchange—no stride, in functional decomposition view; FIG. 46 shows a next-neighbor exchange—no stride, in finite state machine view; FIG. 47 shows a next-neighbor exchange symbol—with stride, in functional decomposition view; and FIG. 48 shows a next-neighbor exchange—with stride, in finite state machine view. If a two-dimensional matrix is used to depict particles then the symbol shown in FIGS. 45/47 is used. A new state is automatically added when the system recognizes that a next neighbor exchange is to be used. The data exchange is modified with the "stride" information indicating how much data to skip with each exchange A three-dimensional particle exchange with Cartesian topology generates the version of a next-neighbor exchange (edge-number exchange only) shown in Tables 17 and 18, below.

TABLE 17

INITIAL 3-DIMENSIONAL CONDITIONS BEFORE NEXT-NEIGHBOR EXCHANGE (CYLINDRICAL TOPOLOGY)

|  | | X1 | | X2 |
|---|---|---|---|---|
| Z1 | | | | |
| Y1 | 1, 2, 3, 4 | 5, 6, 7, 8 | 9, 10, 11, 12 | 13, 14, 15, 16 |
|  | 17, 18, 19, 20 | 21, 22, 23, 24 | 25, 26, 27, 28 | 29, 30, 31 32 |
| Y2 | 33, 34, 35, 36 | 37, 38, 39, 40 | 41, 42, 43, 44 | 45, 46, 47, 48 |
|  | 49, 50, 51, 52 | 53, 54, 55, 56 | 57, 58, 59, 60 | 61, 62, 63, 64 |
| Z2 | | | | |
| Y1 | 65, 66, 67, 68 | 69, 70, 71, 72 | 73, 74, 75, 76 | 77, 78, 79, 80 |
|  | 81, 82, 83, 84 | 85, 86, 87, 88 | 89, 90, 91, 92 | 93, 94, 95, 96 |

TABLE 17-continued

INITIAL 3-DIMENSIONAL CONDITIONS BEFORE NEXT-NEIGHBOR EXCHANGE (CYLINDRICAL TOPOLOGY)

|  | | X1 | | X2 |
|---|---|---|---|---|
| Y2 | 97, 98, 99, 100 | 101, 102, 103, 104 | 105, 106, 107, 108 | 109, 110, 111, 112 |
|  | 113, 114, 115, 116 | 117, 118, 119, 120 | 121, 122, 123, 124 | 125, 126, 127, 128 |
| Z3 | | | | |
| Y1 | 129, 130, 131, 132 | 133, 134, 135, 136 | 137, 138, 139, 140 | 141, 142, 143, 144 |
|  | 145, 146, 147, 148 | 149, 150, 151, 152 | 153, 154, 155, 156 | 157, 158, 159, 160 |
| Y2 | 161, 162, 163, 164 | 165, 166, 167, 168 | 169, 170, 171, 172 | 173, 174, 175, 176 |
|  | 177, 178, 179, 180 | 181, 182, 183, 184 | 185, 186, 187, 188 | 189, 190, 191, 192 |
| Z4 | | | | |
| Y1 | 193, 194, 195, 196 | 197, 198, 199, 200 | 201, 202, 203, 204 | 205, 206, 207, 208 |
|  | 209, 210, 211, 212 | 213, 214, 215, 216 | 217, 218, 219, 220 | 221, 222, 223, 224 |
| Y2 | 225, 226, 227, 228 | 229, 230, 231, 232 | 233, 234, 235, 236 | 237, 238, 239, 240 |
|  | 241, 242, 243, 244 | 245, 246, 247, 248 | 249, 250, 251, 252 | 253, 254, 255, 256 |

TABLE 18

DIMENSIONAL CONDITION AFTER ONE NEXT-NEIGHBOR EXCHANGE
(Cartesian Topology)

|  | | X1 | | X2 |
|---|---|---|---|---|
| Z1 | | | | |
| Y1 | 65, | 69, | (8, 73), | (13, 77), |
|  | 66, | 70, | (10, 74), | (14, 78), |
|  | 67, | 71, | (11, 75), | (15, 79), |
|  | 68 | (9, 72) | (12, 76) | (16, 80) |
|  | 81, | 85, | (24, 40, 41, 89), | (45, 93), |
|  | 82, | 86, | (42, 90), | (46, 94), |
|  | 83, | 87, | (43, 91), | 47, 95), |
|  | 84 | (25, 40, 41, 88) | (44, 92) | (48, 96) |
| Y2 | (17, 97), | (21, 101), | (24, 25, 40, 105), | (29, 109), |
|  | (18, 98), | (22, 102), | (26, 106), | (30, 110), |
|  | (19, 99), | (23, 103), | (27, 107), | (31, 111), |
|  | (20, 100) | (24, 25, 41, 104) | (28, 108) | (32, 112) |
|  | 113, | 117, | (56, 121), | 125, |
|  | 114, | 118, | 122, | 126, |
|  | 115, | 119, | 123, | 127, |
|  | 116 | (57, 120) | 124 | 128 |
| Z2 | | | | |
| Y1 | (65, 1, 129), | (69, 5, 133), | (72, 9, 137), | (77, 13, 141), |
|  | (66, 2, 130), | (70, 6, 134), | (10, 74, 138), | (78, 14, 142), |
|  | (67, 3, 131), | (71, 7, 135), | (75, 11, 139), | (79, 15, 143), |
|  | (68, 4, 132) | (73, 8, 136) | (76, 12, 140) | (80, 16, 144) |
|  | (97, 17, 129)(98, 18, 130), (99, 19, 131), (100, 20, 132) | (101, 21, 133), (102, 22, 134), (103, 23, 135), (104, 89, 105, 24, 136) | (104, 105, 88, 25, 153), 106, 26, 154) (107, 27, 155), (108, 28, 156) | (109, 29, 157), (110, 30, 158), (111, 31, 159), (112, 32, 160) |
| Y2 | (81, 33, 161), | (85, 37, 165), | (89, 104, 88, 41, 169), | (93, 45, 173), |
|  | (82, 34, 162), | (86, 38, 166), | (90, 42, 170), | (94, 46, 174), |
|  | (83, 35, 163), | (87, 39, 167), | (91, 43, 171), | (95, 47, 175), |
|  | (84, 36, 164) | (88, 40, 168, 89, 105) | (92, 44, 172) | (96, 48, 176) |
|  | (113, 49, 177), | (117, 53, 181), | (120, 57, 185), | (125, 61, 189), |
|  | (114, 50, 178), | (118, 54, 182), | (122, 58, 186), | (126, 62, 190), |
|  | (115, 51, 179), | (119, 55, 183), | (123, 59, 187), | (127, 191), |
|  | (116, 52, 180) | (121, 56, 184) | (124, 60, 188) | (128, 64, 192) |

TABLE 18-continued

DIMENSIONAL CONDITION AFTER ONE NEXT-NEIGHBOR EXCHANGE
(Cartesian Topology)

| | X1 | | X2 | |
|---|---|---|---|---|
| Z3 | | | | |
| Y1 | (129, 65, 193), | (133, 69, 197), | (136, 73, 201), | (141, 77, 205), |
| | (130, 66, 194), | (134, 70, 198), | (138, 74, 202), | (142, 78, 206), |
| | (131, 67, 195), | (135, 71, 199), | (139, 75, 203), | (143, 79, 207), |
| | (132, 68, 196) | (137, 72, 200) | (140, 76, 204) | (144, 80, 208) |
| | (161, 81, 209), | (165, 85, 213), | (169, 152, 168, 89, 217), (170, 90, 218), | (173, 93, 221), |
| | (162, 82, 210), | (166, 86, 214), | | (174, 94, 222), |
| | (163, 83, 211), | (167, 87, 215), | (171, 91, 219), | (175, 95, 223), |
| | (164, 84, 212) | (168, 153, 169, 88, 216) | (172, 92, 220) | (176, 96, 223) |
| Y2 | (145, 97, 225), | (149, 101, 229), | (153, 152, 168, 105, 233), (154, 106, 234), | (157, 109, 237), |
| | (146, 98, 226), | (150, 102, 230), | | (158, 110, 238), |
| | (147, 99, 227), | (151, 103, 231), | (155, 107, 235), | (159, 111, 239), |
| | (148, 100, 228) | (152, 104, 232, 153, 169) | (156, 108, 236) | (160, 112, 240) |
| | (177, 113, 241), | (181, 117, 245), | (184, 121, 249), | (189, 125, 252), |
| | (178, 114, 242), | (182, 118, 246), | (186, 122, 249), | (190, 126, 253), |
| | (179, 115, 243), | (183, 119, 247), | (187, 123, 250), | (191, 127, 254), |
| | (180, 116, 244) | (185, 120, 248) | (188, 124, 251) | (192, 128, 255) |
| Z4 | | | | |
| Y1 | (193, 129), | (197, 133), | (200, 137), | (205, 141), |
| | (194, 130), | (198, 134), | (202, 138), | (206, 142), |
| | (195, 131), | (199, 135), | (203, 139), | (207, 143), |
| | (196, 132) | (201, 136) | (204, 140) | (208, 144) |
| | (225, 145), | (229, 149), | (233, 232, 216, 153), | (237, 157), |
| | (226, 146), | (230, 150), | (234, 154), | (238, 158), |
| | (227, 147), | (231, 151), | (235, 155), | (239, 159), |
| | (228, 148) | (232, 217, 233, 152) | (236, 156) | (240, 160) |
| Y2 | (209161), | (213, 165), | (217, 232, 216, 169), | (221, 173), |
| | (210, 162), | (214, 166), | (218, 170), | (222, 174), |
| | (211, 163), | (215, 167), | (219, 171), | (223, 175), |
| | (212, 164) | (216, 168, 217, 233) | (220, 172) | (224, 176) |
| | (241, 177), | (245, 181), | (248, 185), | (253, 189), |
| | (242, 178), | (246, 182), | (250, 186), | (254, 190), |
| | (243, 179), | (247, 183), | (251, 187), | (255, 191), |
| | (244, 180) | (249, 184) | (252, 188) | (256, 192) |

Figure 49:
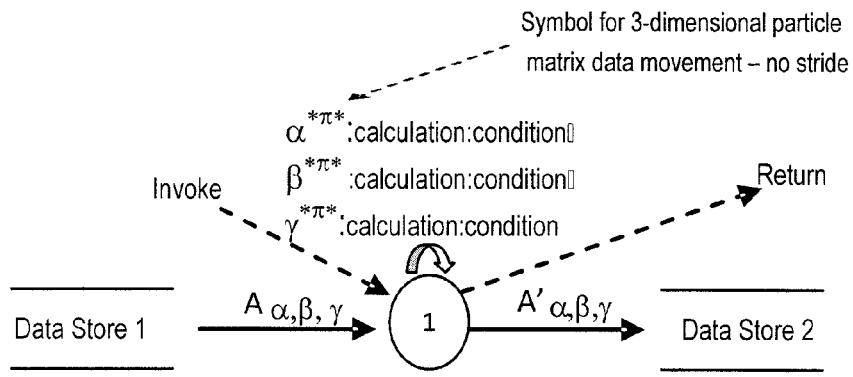
FIG. 49 shows an example of a 3-dimensional next-neighbor exchange symbol—no stride, functional decomposition view.
Figure 50:
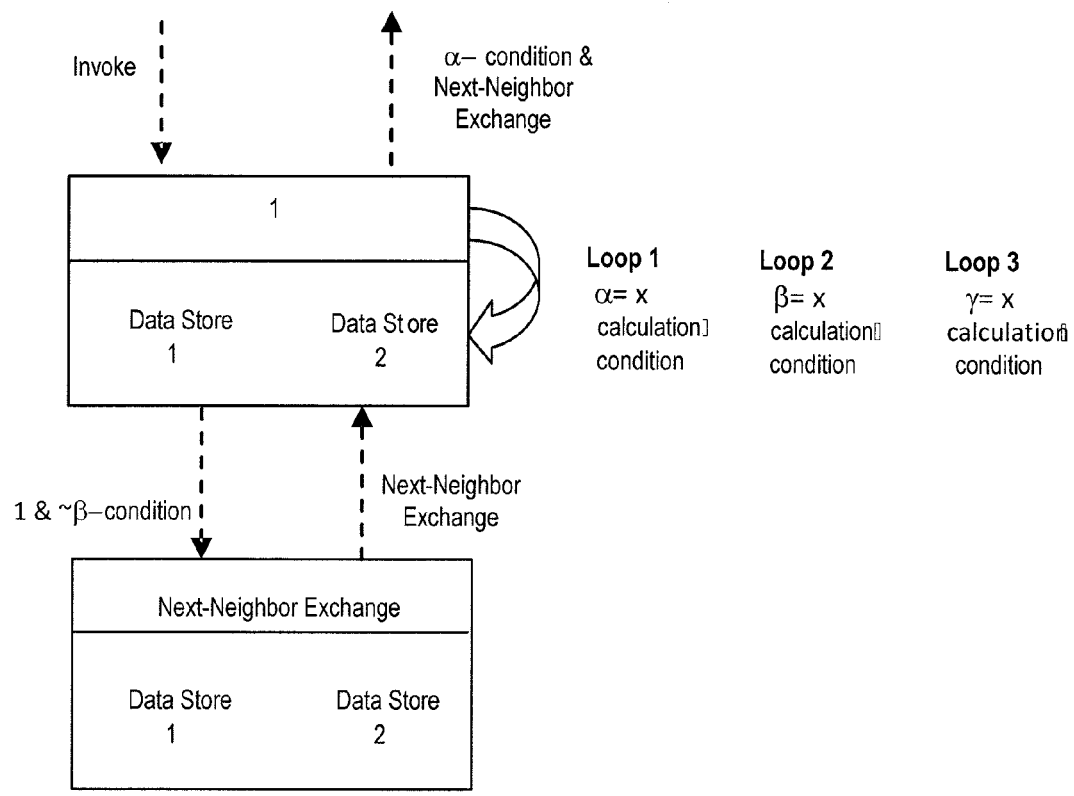
FIG. 50 shows an example of a 3-dimensional next-neighbor exchange—no stride, finite state machine view.
Figure 51:
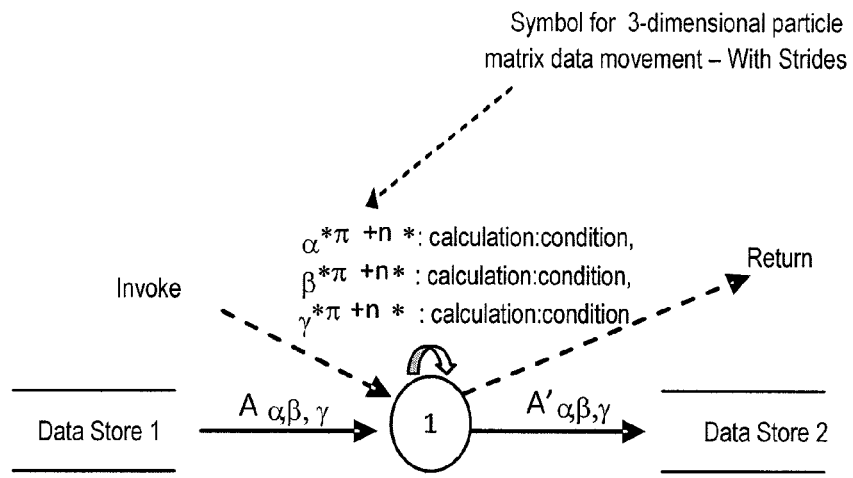
FIG. 51 shows an example of a 3-dimensional next-neighbor exchange symbol—with stride, functional decomposition view.
Figure 52:
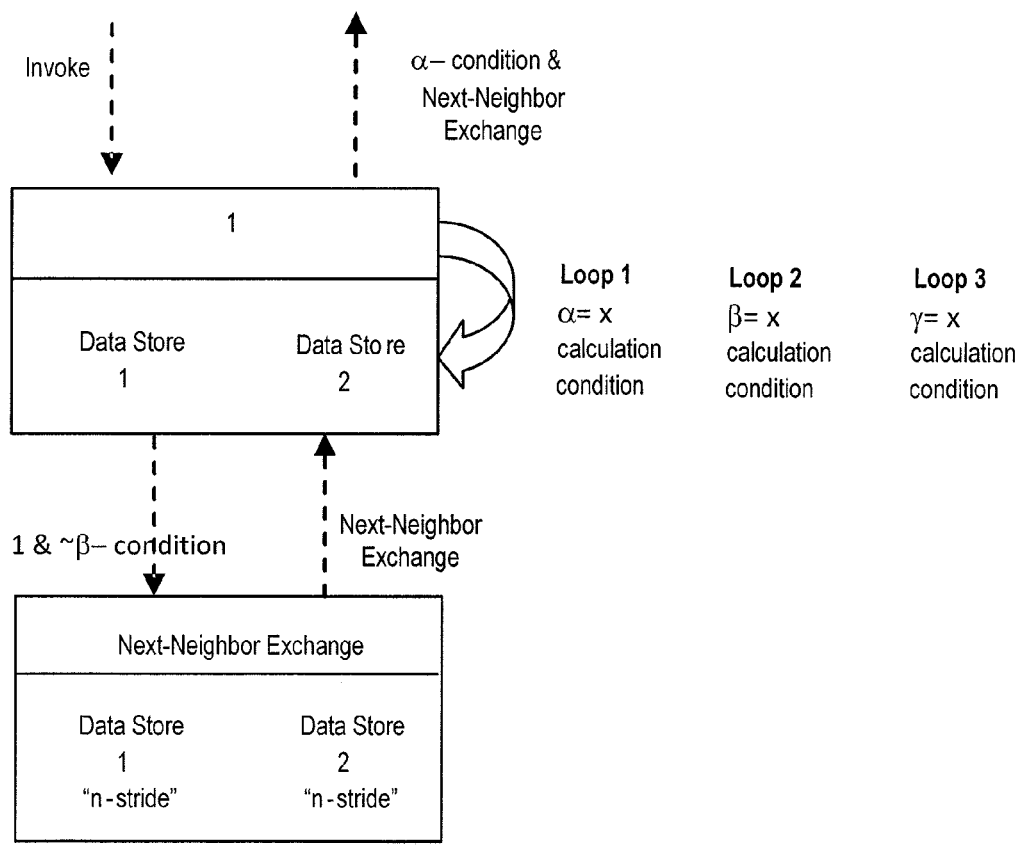
FIG. 52 shows an example of a 3-dimensional next-neighbor exchange—with stride, finite state machine view.

FIG. 49 shows a 3-dimensional next-neighbor exchange symbol [**] indicating no stride, in functional decomposition view; FIG. 50 shows a 3-dimensional next-neighbor exchange—no stride, in finite state machine view; FIG. 51 shows a 3-dimensional next-neighbor exchange—with stride, in functional decomposition view; and FIG. 52 shows a 3-dimensional next-neighbor exchange—with stride, in finite state machine view. If a three-dimensional matrix is used to depict particles, then the symbol shown in FIG. 49 is used.

Figure 53:
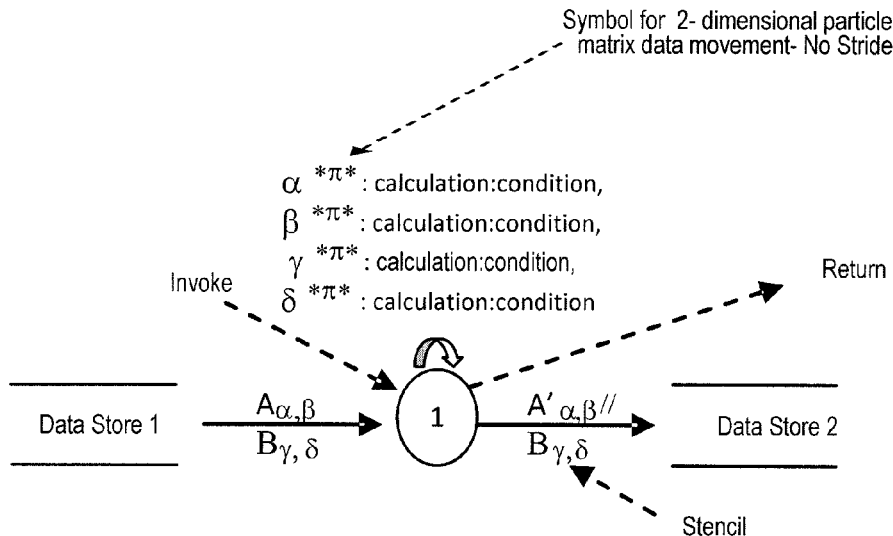
FIG. 53 shows an example of a 2-dimensional matrix with 2-dimensional stencil for 2-d next-n-neighbor exchange symbol—no stride, functional decomposition view.
Figure 54:
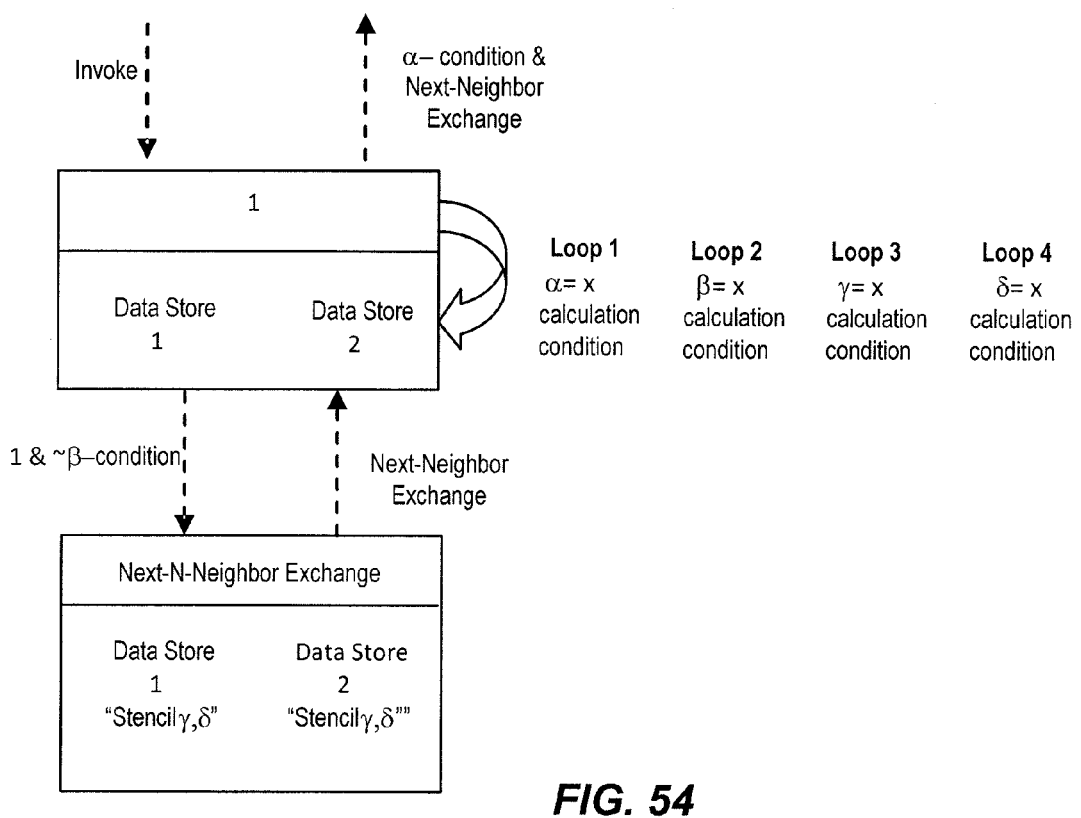
FIG. 54 shows an example of a 2-dimensional matrix with 2-dimensional stencil for 2-d next-n-neighbor exchange—no stride, finite state machine view.
Figure 55:
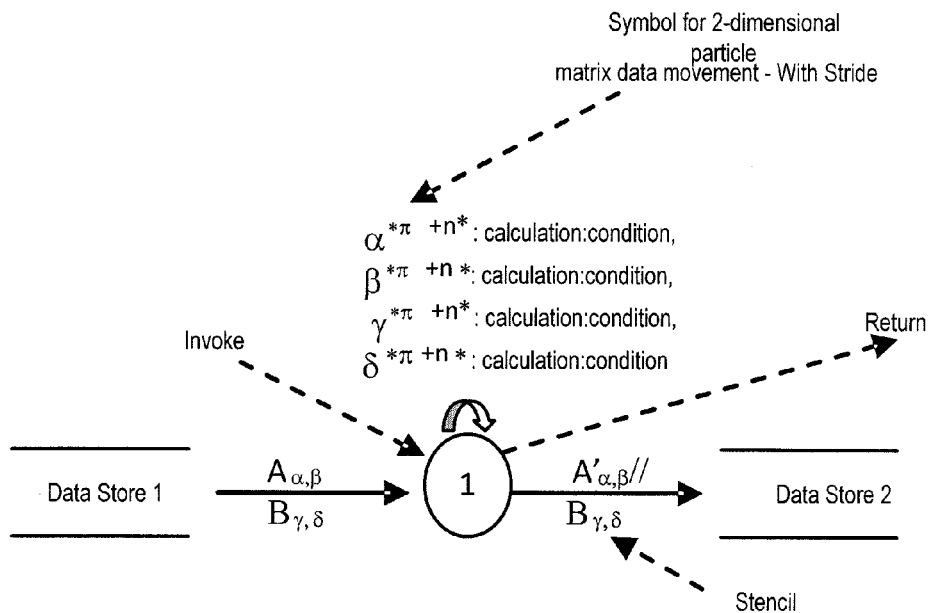
FIG. 55 shows an example of a 2-dimensional matrix with 2-dimensional stencil for 2-d next-n-neighbor exchange symbol—with stride, functional decomposition view.

FIG. 53 shows a 2-dimensional matrix with 2-dimensional stencil for 2-d next-n-neighbor exchange symbol—no stride, in functional decomposition view; FIG. 54 shows a 2-dimensional matrix with 2-dimensional stencil for 2-d next-n-neighbor exchange—no stride, in finite state machine view; and FIG. 55 shows a 2-dimensional matrix with 2-dimensional stencil for 2-d next-n-neighbor exchange symbol—with stride, in functional decomposition view. The next-neighbor exchange can be extended to a next-n-neighbor exchange. Frequently, the depth of the exchange is a function of some size of the stencil that is applied to it. The exchange will consist of using the number of elements along the dimension of the exchange found in the stencil. If the number of elements is greater than the discretization size then the data must be shared across multiple nodes. Since the stencil is itself a vector or matrix, the symbol for a two-dimensional matrix with a two-dimensional stencil (shown in FIG. 53) can be used to generate a next-n-neighbor exchange.

Figure 56:
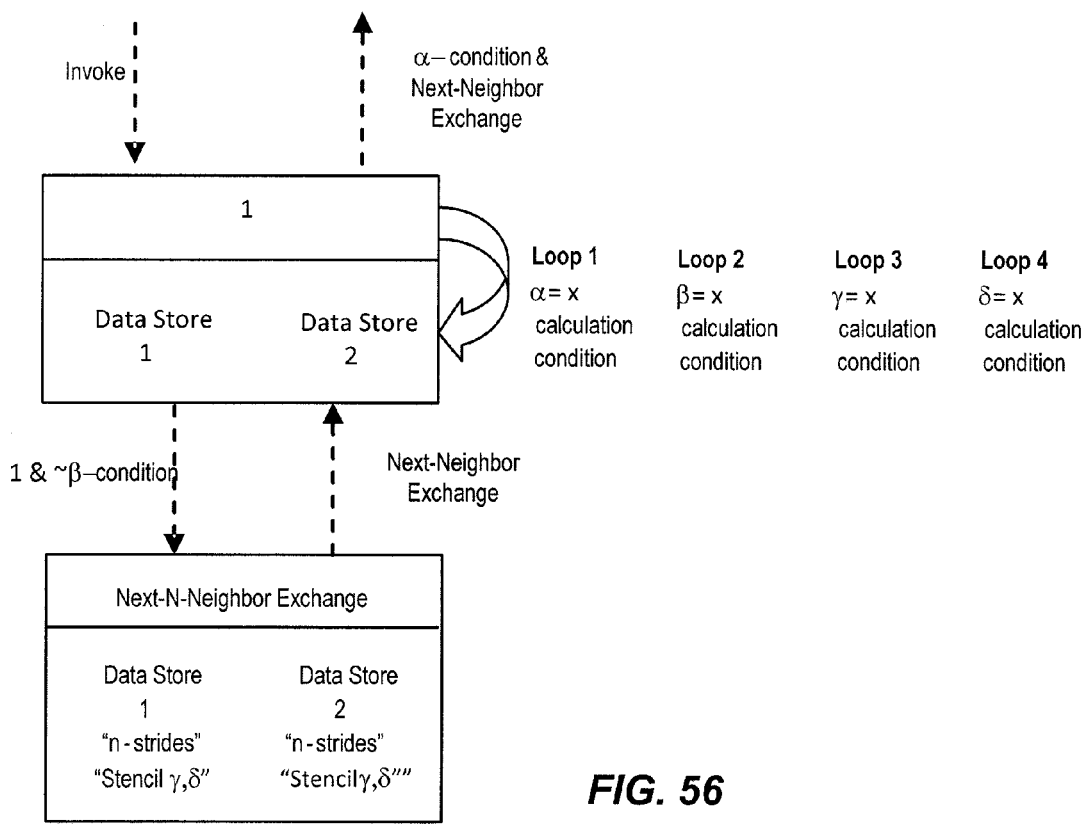
FIG. 56 shows an example of a 2-dimensional matrix with 2-dimensional stencil for 2-d next-n-neighbor exchange—with stride, finite state machine view.

FIG. 56 shows a 2-dimensional matrix with 2-dimensional stencil for 2-d next-n-neighbor exchange—with stride, in finite state machine view. Since B cannot change (depicted by the lack of an accent mark) and has the same number of dimensions as A', it is assumed to be a stencil. Note that the stencil must be smaller than the processed vector or matrix in every dimension; otherwise, it is considered a non-stenciled matrix operation, and the next-n-matrix does not apply.

Field Use Model
    Concept:
    A field affects everything at once so if the field is distributed over multiple nodes then everything must communicate with everything.
    Use:
    Modeling physical phenomenon.
    Example Use:
    Gravity modeling.
    Parallel Issue:
    Information exchange.
    Action:
    Determine what to cross communicate.
    Action Example:
    Perform an all-to-all exchange of data.

Figure 57:
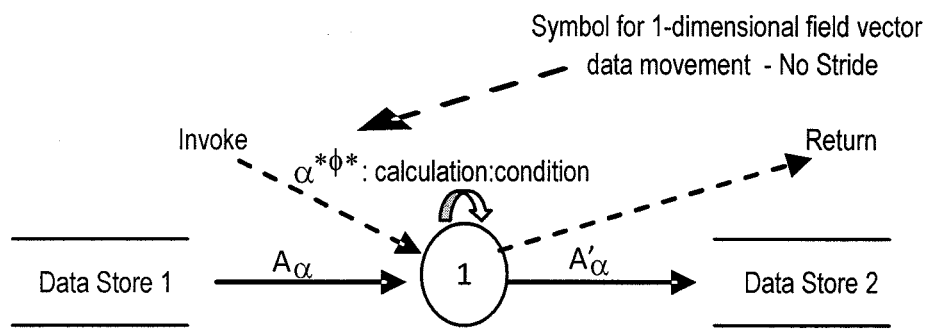
FIG. 57 shows an example of a 1-dimensional all-to-all exchange symbol—no stride, functional decomposition view.
Figure 58:
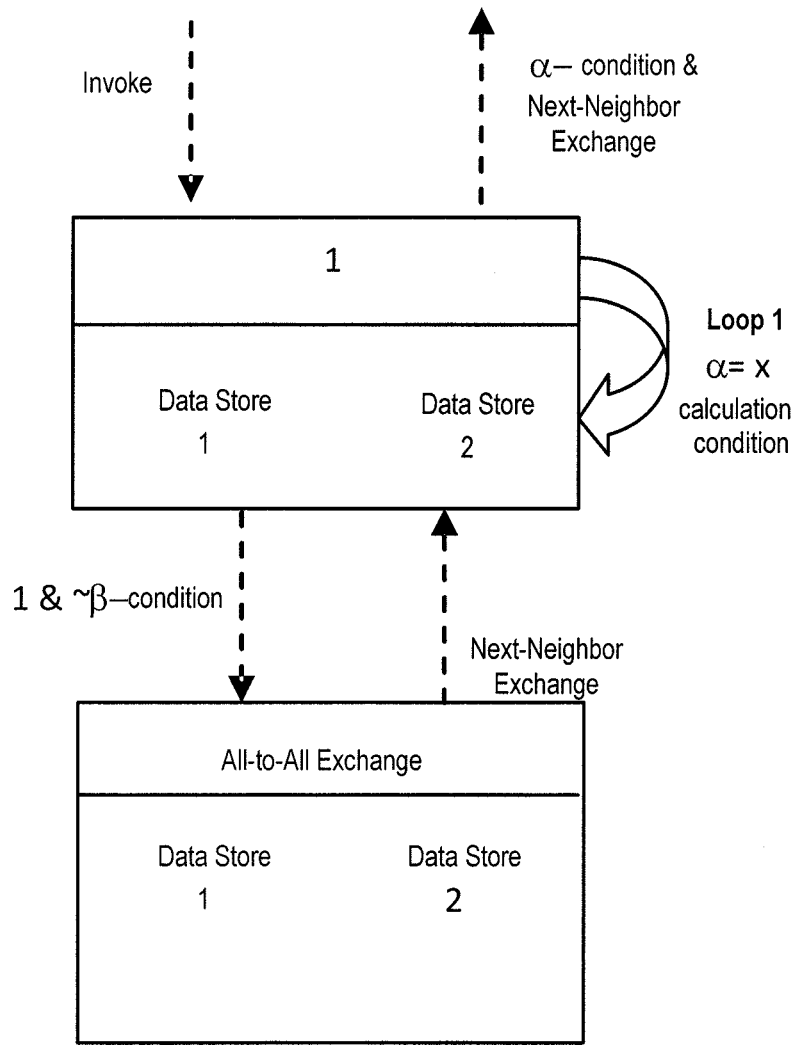
FIG. 58 shows an example of a 1-dimensional all-to-all exchange—no stride, finite state machine view.
Figure 59:
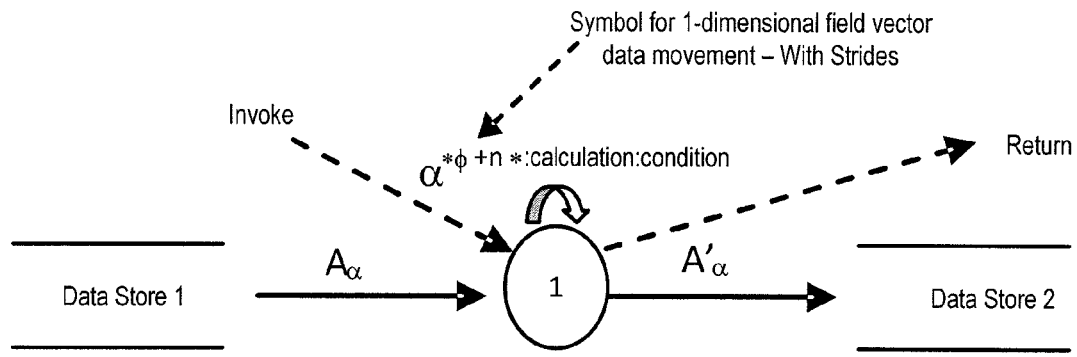
FIG. 59 shows an example of a 1-dimensional all-to-all exchange symbol—with stride, functional decomposition view.
Figure 60:
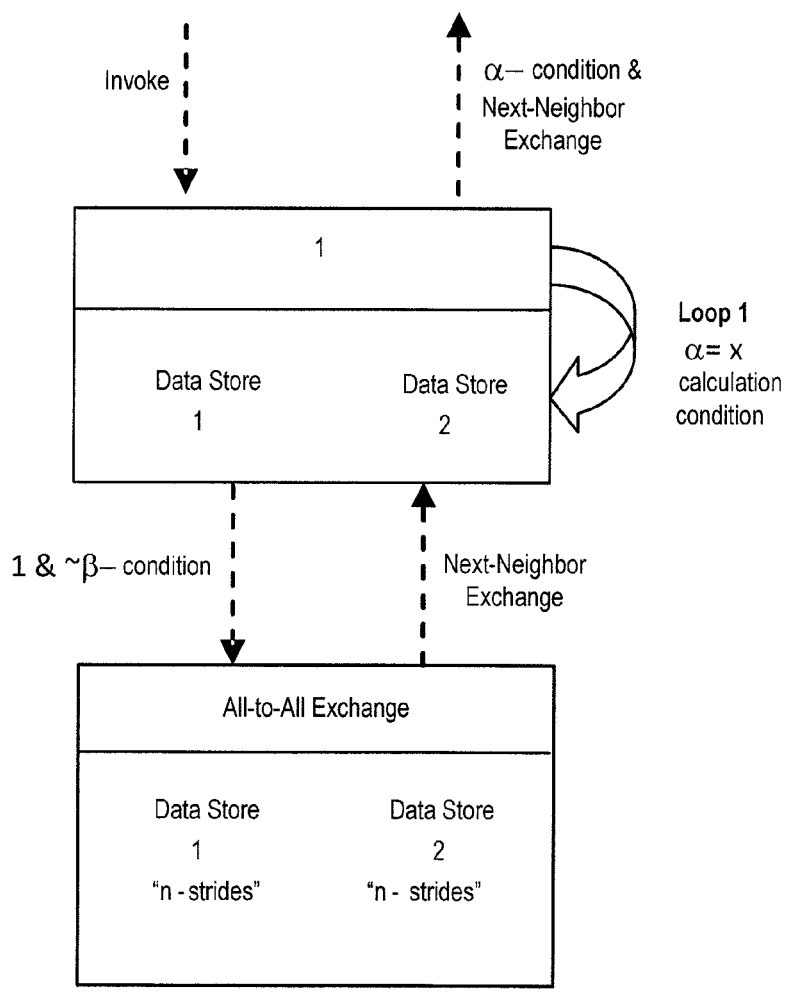
FIG. 60 shows an example of a 1-dimensional all-to-all exchange—with stride, finite state machine view.

FIG. 57 shows a 1-dimensional all-to-all exchange symbol—no stride, in functional decomposition view; FIG. 58 shows a 1-dimensional all-to-all exchange—no stride, in finite state machine view; FIG. 59 shows a 1-dimensional all-to-all exchange symbol—with stride, in functional decomposition view; FIG. 60 shows a 1-dimensional all-to-all exchange—with stride, in finite state machine view; and If a one-dimensional vector is used to depict a field then the symbol shown in FIG. 57 is used.

Figure 61:
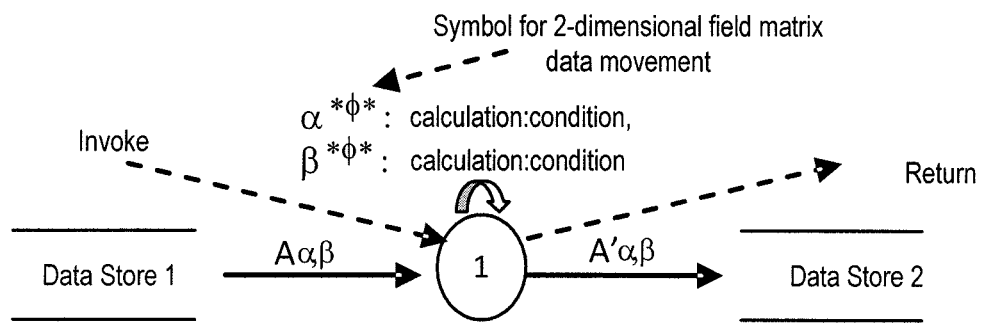
FIG. 61 shows an example of a 2-dimensional all-to-all exchange symbol—no stride, functional decomposition view.
Figure 62:
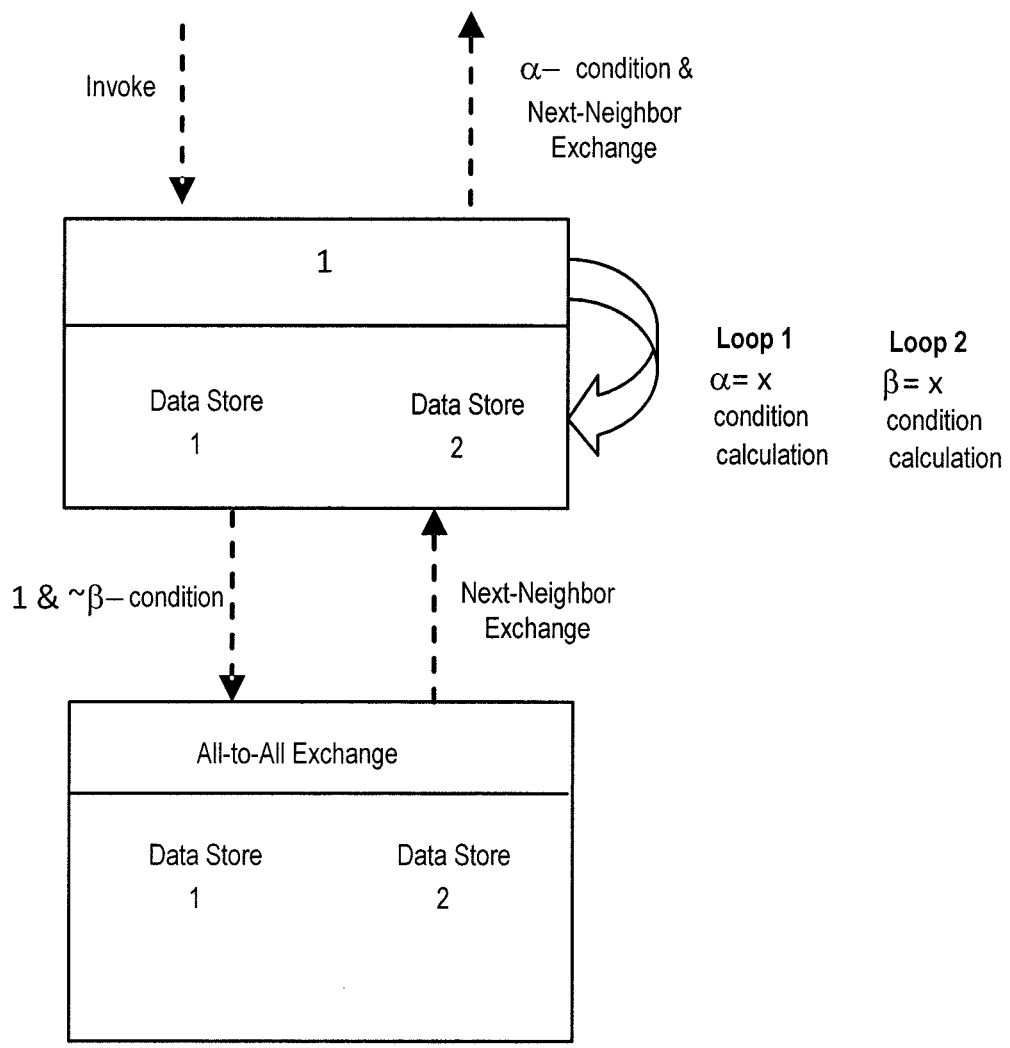
FIG. 62 shows an example of a 2-dimensional all-to-all exchange—no stride, finite state machine view.
Figure 63:
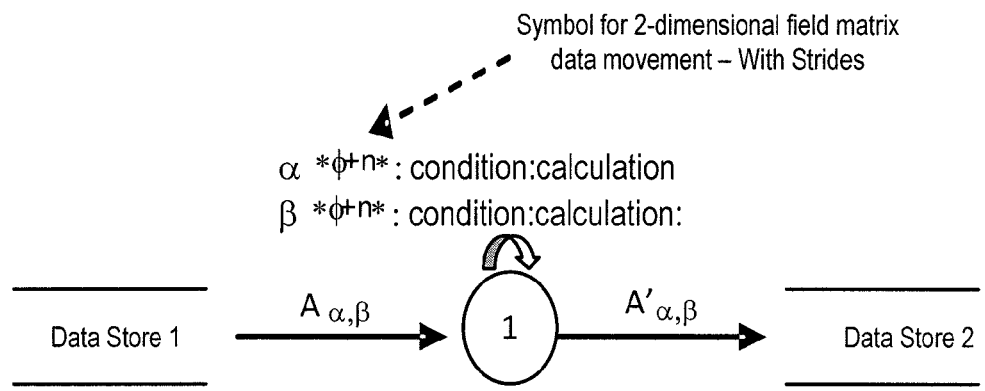
FIG. 63 shows an example of a 2-dimensional all-to-all exchange symbol—with stride, functional decomposition view.
Figure 64:
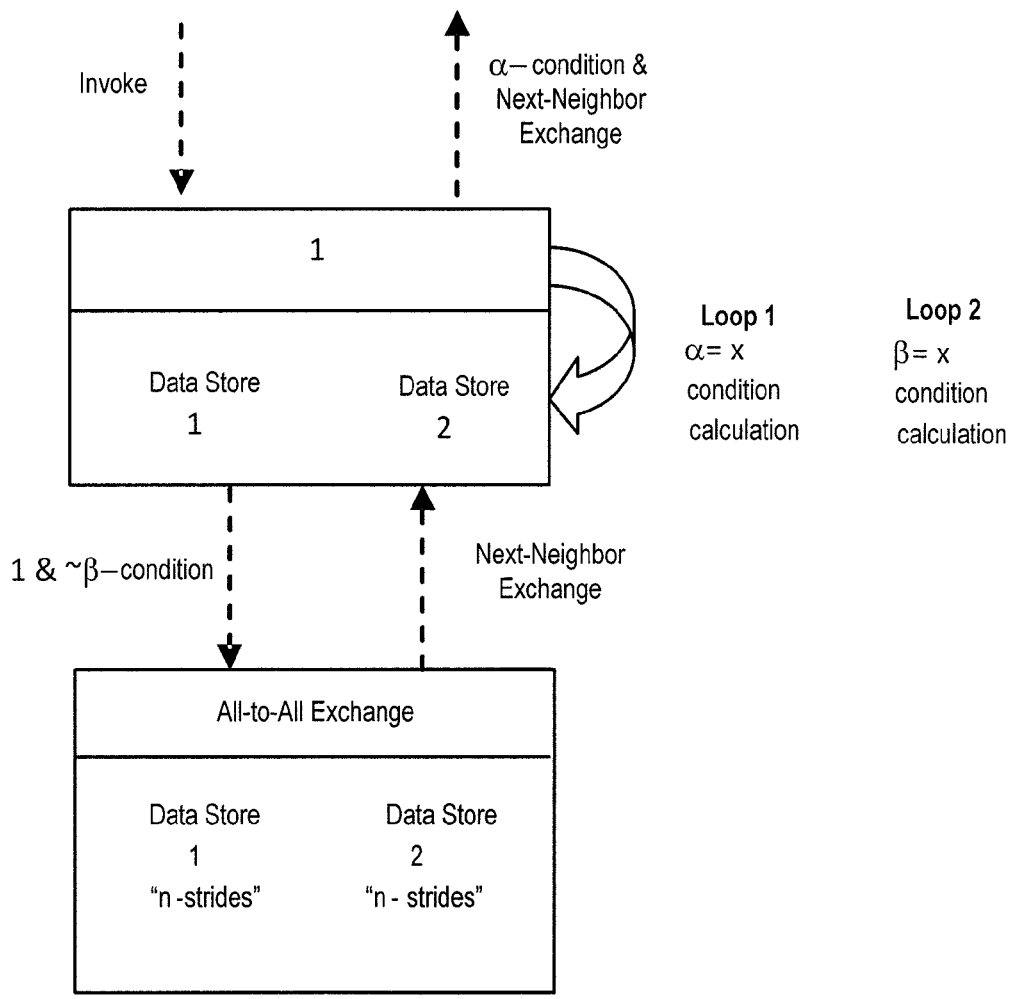
FIG. 64 shows an example of a 2-dimensional all-to-all—with stride, finite state machine view.

FIG. 61 shows a 2-dimensional all-to-all exchange symbol—no stride, in functional decomposition view; FIG. 62 shows a 2-dimensional all-to-all exchange—no stride, in finite state machine view; FIG. 63 shows a 2-dimensional all-to-all exchange symbol—with stride, in functional decomposition view figure; and FIG. 64 shows a 2-dimensional all-to-all—with stride, IN finite state machine view. If a two-dimensional matrix is used to depict fields then the symbol shown in FIG. 61 is used.

Figure 65:
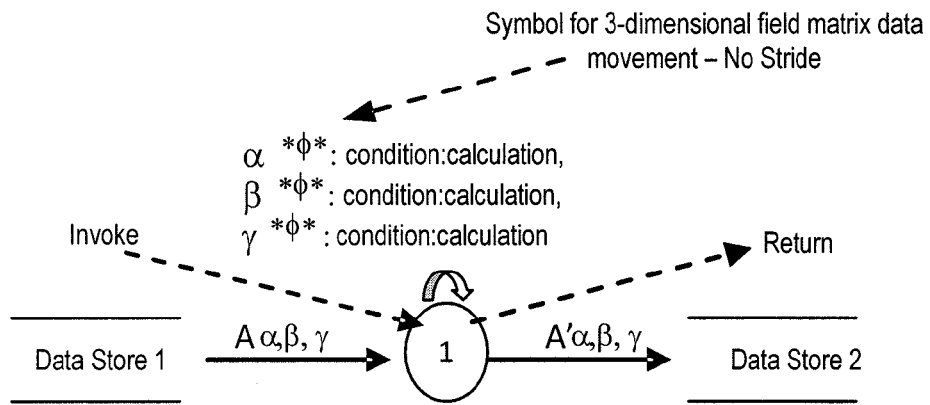
FIG. 65 shows an example of a 3-dimensional all-to-all exchange symbol—no stride, functional decomposition view.
Figure 66:
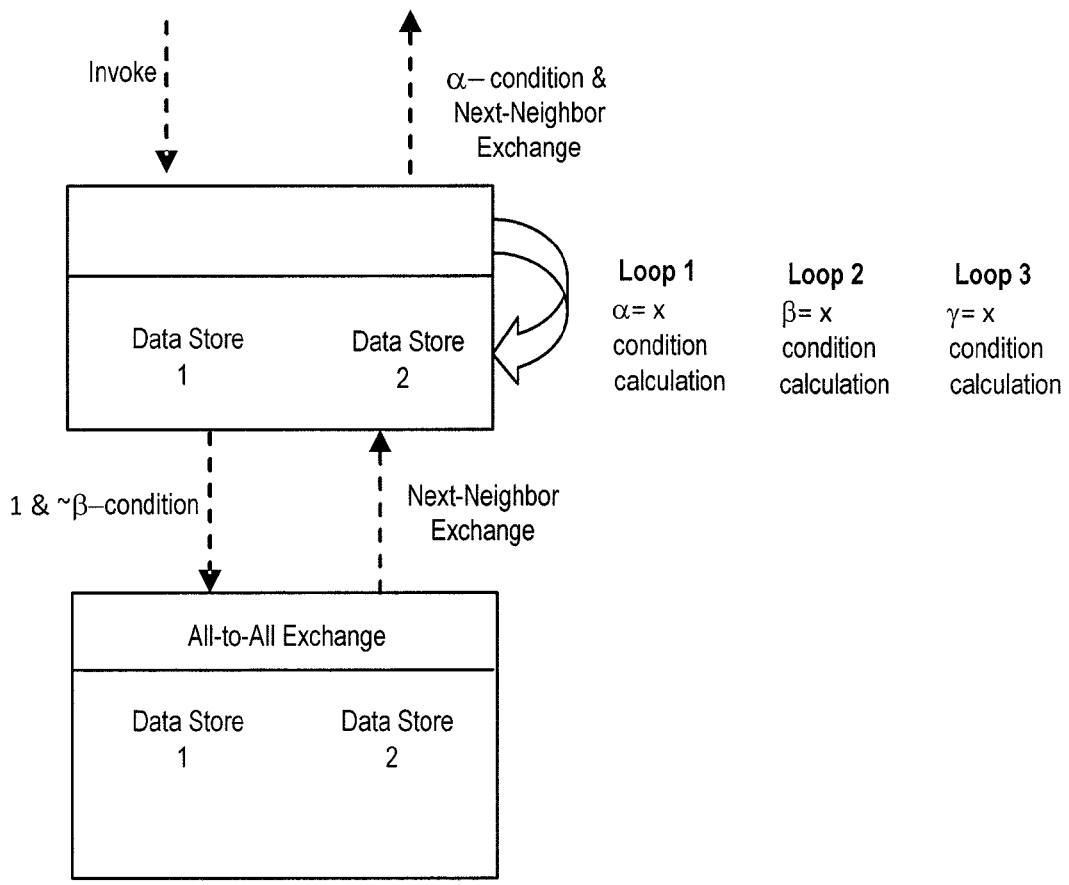
FIG. 66 shows an example of a 3-dimensional all-to-all exchange—no stride, finite state machine view.
Figure 67:
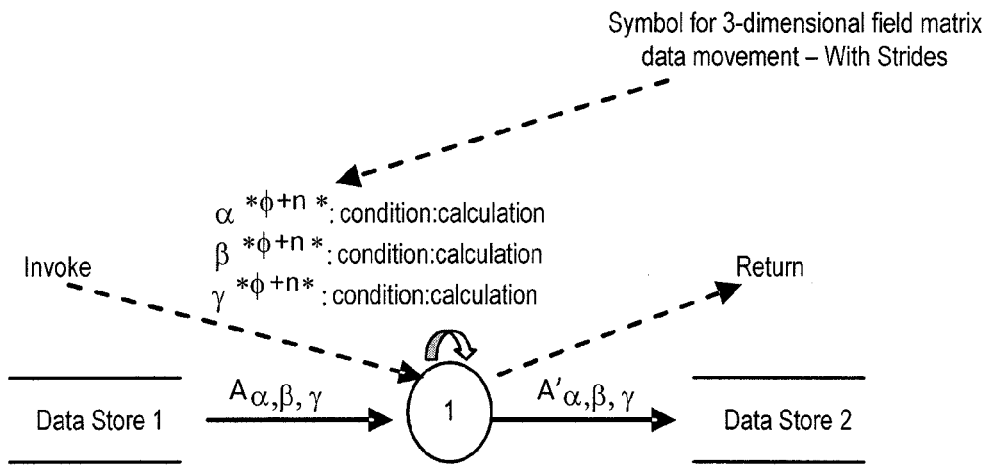
FIG. 67 shows an example of a 3-dimensional all-to-all exchange symbol—with stride, functional decomposition view.
Figure 68:
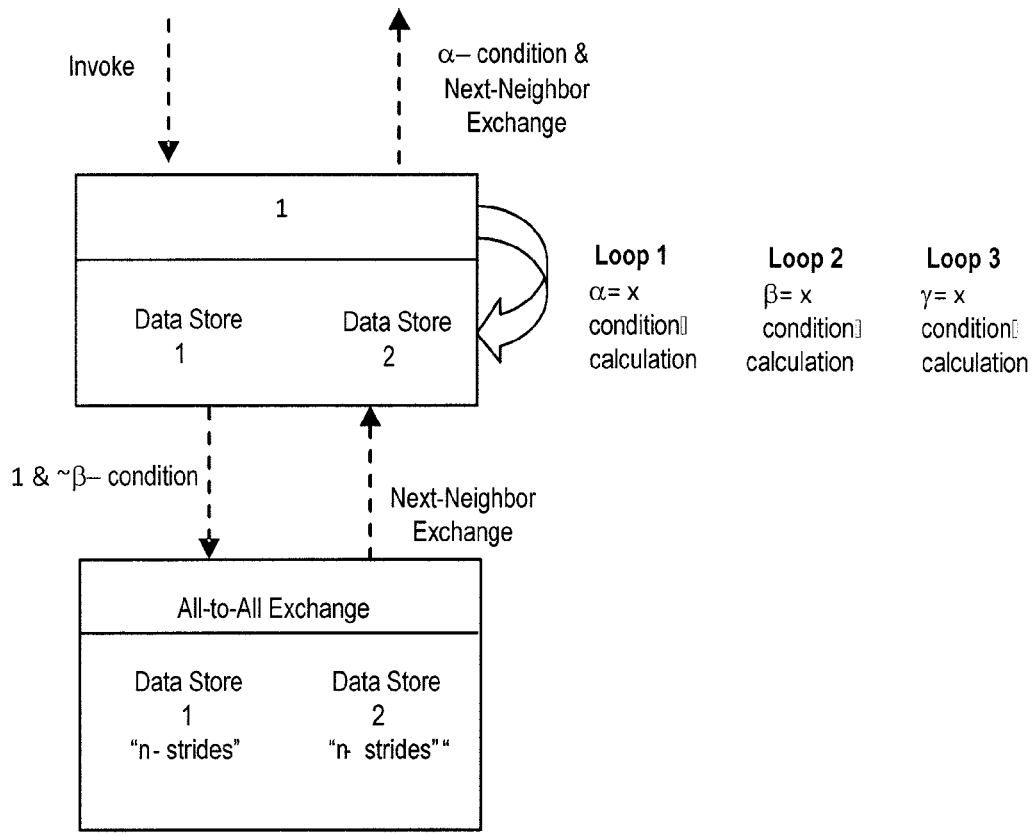
FIG. 68 shows an example of a 3-dimensional all-to-all exchange—with stride, finite state machine view.

FIG. 65 shows a 3-dimensional all-to-all exchange symbol—no stride, in functional decomposition view; FIG. 66 shows a 3-dimensional all-to-all exchange—no stride, in finite state machine view; FIG. 67 shows a 3-dimensional all-to-all exchange symbol—with stride, in functional decomposition view; and FIG. 68 shows a 3-dimensional all-to-all exchange—with stride, in finite state machine view. If a three-dimensional matrix is used to depict fields then the symbol shown in FIG. 65 is used.

Project Management and Debugging

Figure 70:
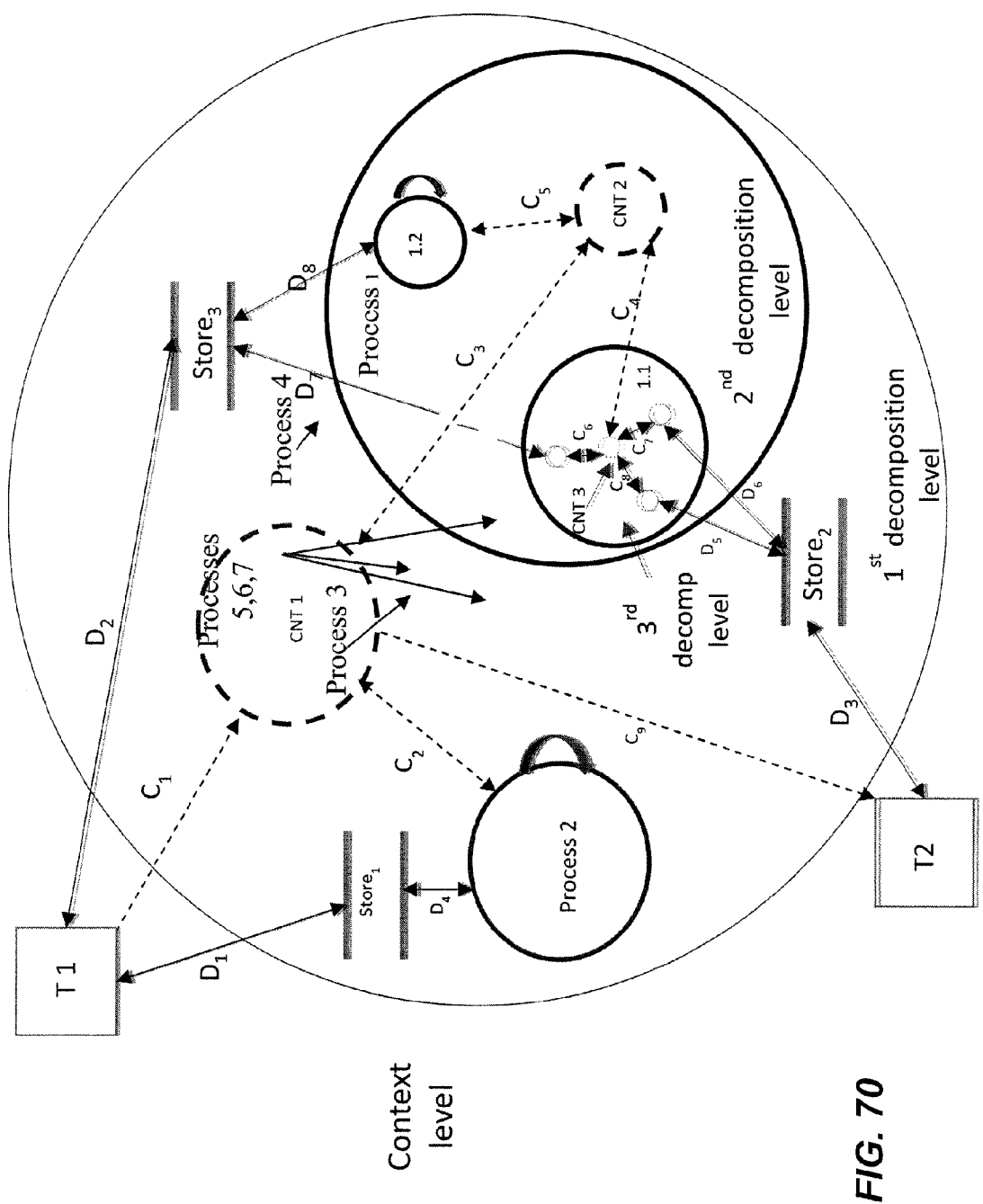
FIG. 70 illustrates a program subject to decomposition.

In FIG. 70, an example of a program decomposition prepared according to preceding portions of this document, dashed lines represent control flows, solid lines represent data flows, dashed circles represent control transforms, solid circles represent process transforms, parallel lines represent data stores, and squares represent terminators.

If a process is equated to a task to be performed then each decomposition level could represent a group of linked tasks. Within a decomposition level, processes are always linked together using control flows attached to the central control process. The purpose of a control flow is to specify when some process is to be called. The control flow contains conditional statements: "init", "if" and "call-after" or some combination of "if" and "call-after". The "init" conditional statement represents the beginning of a series of processes. Note that the "init" condition is contained within control flow "C1" of FIG. 70. The first of a series of processes should have a start-by date and duration, if not the current date is assumed.

Additional Data Fields for Project Management

In order to support project management functions, the program decomposition database has some data fields associated with each process or module that are particularly associated with project management functions of the system. These include:

Start By Date When a date that a particular process or module is to begin development, that date is entered into this field.

Duration When an estimated development duration is known for a process or module, that duration is entered in this field. If a process has a call-after in its conditional statement then the start-by date is forced to "n/a"

Developers with Write Privilege Process designs and their associated code can be assigned to one or more developers. This is accomplished in the MPT design model by the administrator granting design-level write privileges to developers. This field tracks developers granted write privileges to the process by a project administrator.

Task Completion Date When a programming for a task is completed, a current date is stored in this field.

The dates and duration are associated with the process by right-clicking on the process of interest and selecting the start-by or duration options. If a process has a call-after in its conditional statement then the start-by date is forced to "n/a" or none.

Process designs and their associated code can be assigned to one or more developers. This is accomplished in the MPT design model by the administrator granting design-level write privileges to developers The Gantt chart, as in Table 19, can now be generated.

TABLE 19

| # | Task Name | Assignee | Duration | Start Date | Completion Date | January |
|---|---|---|---|---|---|---|
| 1 | Process 1 | Developer 1 | 3 days | Jan. 01, 2012 | Jan. 03, 2012 |  |
| 2 | Process 2 | Developer 2 | 3 days | N/A | N/A | |

Determining Task Completion Date

The Hierarchical Design Model is implemented as a decomposition diagram. Unlike existing Gantt methods, this system does not require a separate data entry for the system to know that a task is complete. Instead, this system uses the decomposition diagram's capacity to find/test/associate code with all processes to determine task completion. This is accomplished by the user selecting the "Generate" button on a user interface which causes the four-step code-to-process association method to be invoked. Code-to-design association method steps are as follows:

1) A keyword search is performed. The keywords associated with the processes are used to search through a list of cloud-based software modules, creating a sub-list of software modules.
2) The input and output data found on the data flows associated with the processes are used to shrink the sub-list, removing those software modules whose input and output data does not match.
3) The test procedures associated with the processes combined with the input/output definitions are used to further shrink the sub-list, leaving only those software modules that perform correctly.
4) The desired software module which best meets the requirements is selected.

Any process that has an associated software module is considered complete. The date when an association is made becomes the task-completion date on the Gantt chart.

Displaying the Critical Path on the Decomposition Diagram

Figure 69:
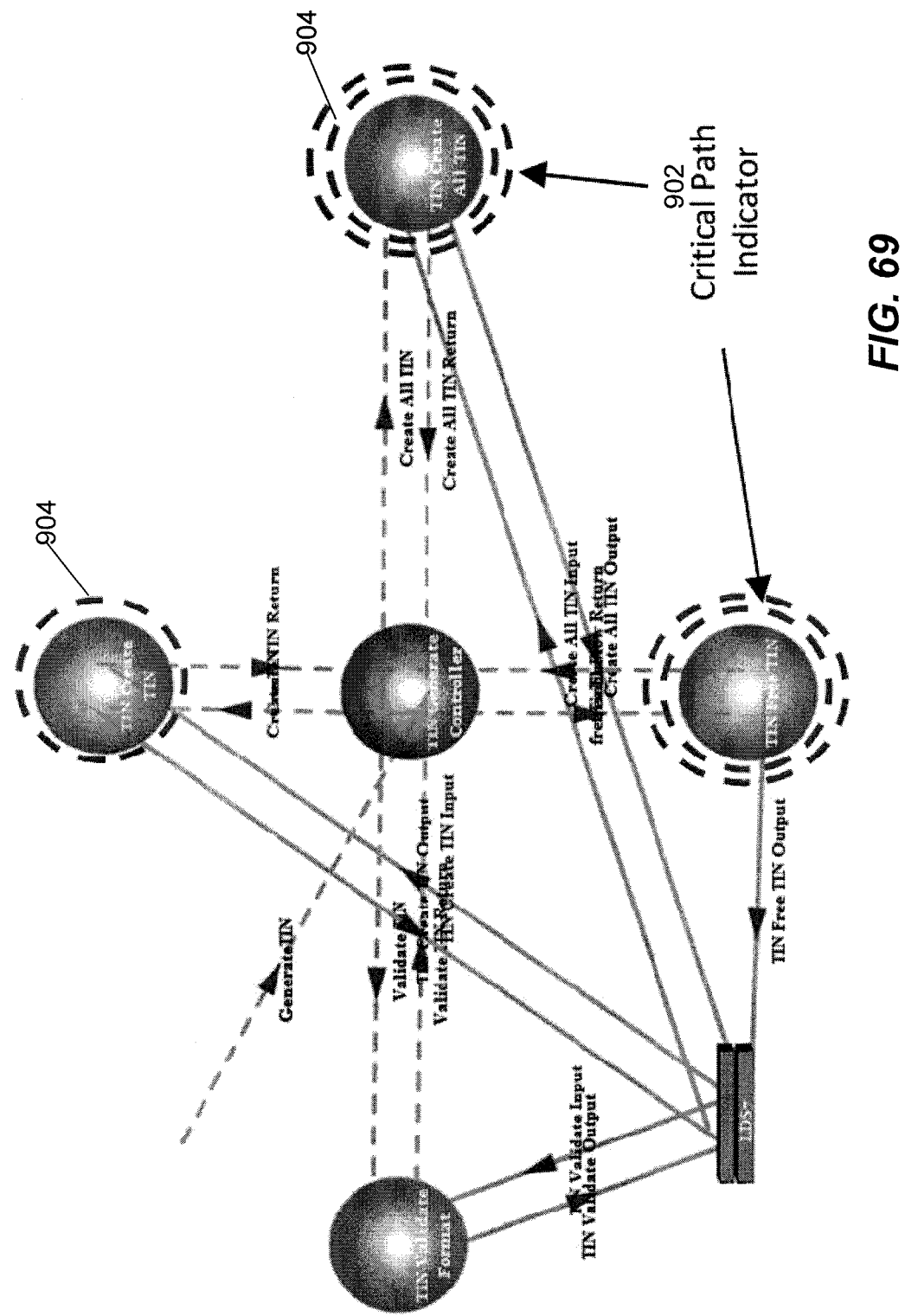
FIG. 69 shows a decomposition diagram with critical path and need work markers.

In addition to being displayed on a Gantt chart, a separate graph, the critical path may be displayed on the decomposition diagram, or portions thereof, at user command. When this occurs, the programming and management support computer system displays a requested portion of the decomposition diagram, then highlights those processes that require additional work 904 (FIG. 69). Only processes that have no associated software modules and drive the total project end date are designated with the critical path indicator 902, and then only if they lie on the critical path. In an embodiment, the need work marker 904 and critical path indicator 902 are color coded. The critical path is also illustrated on the GANTT chart as follows in Table 20. The critical path is indicated on the chart in color. The decomposition and project planning system automatically determines critical paths and the GANTT chart from the estimated durations, developer assignments, call-after dependencies, and start dates recorded in the program decomposition database.

TABLE 20

| Task Name | Assignee | Estimated Duration | Start Date | Completion Date | January |
|---|---|---|---|---|---|
| Process 1 | Developer 1 | 3 days | Jan. 01, 2012 | Jan. 03, 2012 | 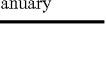 |
| Process 2 | Developer 2 | 3 days | N/A | N/A |  Critical Path |
| Process 3 | Developer 3 | 3 days | Jan. 04, 2012 | N/A | 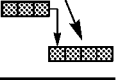 |
| Process 4 | Developer 3 | 4 days | N/A | N/A |  |

Calculating the Percent Complete

An MPT Hierarchical Design Model can have multiple decomposition levels. A process may decompose. If a process decomposes then it becomes multiple lower-level processes. If all of the multiple lower-level processes have software modules then the upper-level process is 100% complete. Otherwise, the percentage of lower-level processes with software modules becomes the percentage of completion of the upper-level processes. This is indicated by the work-breakdown column attached to the Gantt chart and the percent complete found in the completion-date column.

TABLE 21

| Work Brkdwn | Task Name | Assignee | Est. Duration | Start Date | Completion | January |
|---|---|---|---|---|---|---|
| 1 | Proc 1 | Developer 1 | 4 days | Jan. 01, 2012 | 40% |  |
| 1.1 | Proc 3 | Developer 1 | 4 days | Jan. 04, 2012 | 25% | 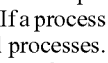 |
| 1.1.1 | Proc 4 | Developer 2 | 4 days | Jan. 04, 2012 | N/A | 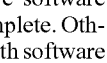 |
| 1.1.2 | Proc 5 | Developer 3 | 4 days | Jan. 04, 2012 | N/A | 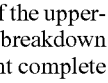 |
| 1.1.3 | Proc 6 | Developer 4 | 4 days | Jan. 04, 2012 | Jan. 03, 2012 | |
| 1.2 | Proc 7 | Developer 5 | 4 days | Jan. 04, 2012 | Jan. 03, 2012 | |
| 2 | Pros 2 | Developer 6 | 3 days | Jan. 01, 2012 | N/A |  |

Parallel start times within a common upper-level process are detected by different developers being associated with the different lower-level processes within a common upper-level process.

Automated Estimates

Each process on the Decomposition Diagram is associated with a requirement. Multiple processes can be associated with a single process, or a process can be associated with multiple requirements. As a design is created processes are added and associated with requirements. An estimate of the number of processes or modules that will eventually be created can be generated by:

estimated#processes=(average#processes per requirements with at least one associated process)×(#requirements)

An estimate of the percentage of the project that is completed can be generated by:

% project complete=(#completed processes)/(estimated#processes)

An estimate of the man-days it will take to complete a project can be calculated by:

Man Days=(average duration per completed process× average#developers per process)× (estimated#processes)−(elapsed# of days)

The estimated completion date is shown on every decomposition screen. The estimated completion date is shown in red if the date has slip since the last review. Reviewing the end date requires selecting the date reviewed button on any decomposition screen.

| Task Name | Assignee | Estimated Duration | Start Date | Completion Date | January |
|---|---|---|---|---|---|
| Process 1 | Developer 1 | 3 days | Jan. 01, 2012 | Jan. 03, 2012 | 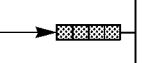 |
| Process 2 | Developer 2 | 3 days | N/A | N/A | 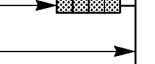 Critical Path |
| Process 3 | Developer 3 | 3 days | Jan. 04, 2012 | N/A |  |
| Process 4 | Developer 3 | 4 days | N/A | N/A | 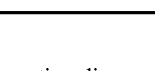 |

Automated Debug Support from Decomposition

The hierarchical design model is implemented as a decomposition diagram. The system implementing the decomposition diagram has the capacity to find, test, and associate code with all processes to determine task completion. The associated code includes debugging test procedures, where they exist.

A test procedure consists of a list of input variables as well as descriptions and a list of expected output variables. More than one test procedure may exist for each process. This model associates design, code, and test.

Conversion of Hierarchical Graph to Finite State Machine

A finite state machine (FSM) represents the execution model used to tie together multiple processes. The connecting lines of the FSM represent state transition vectors. The data stores are found as part of the states (processes). This means that the execution engine has full access to all data that is used by the processes, and, thus, all of the data can be saved at each state transition. Each thread is a separate state machine. Data is saved at each state transition, for each thread, so full map of the processing for some time period can be saved. This map allows the system to backtrack.

The data of each state transition is saved as a checkpoint. The MPT checkpoint takes only a single data transfer time, regardless of the number of threads that need to be saved.

Checkpoint Method for Saving State, State-Transition, and Transformed Data.

Figure 71:
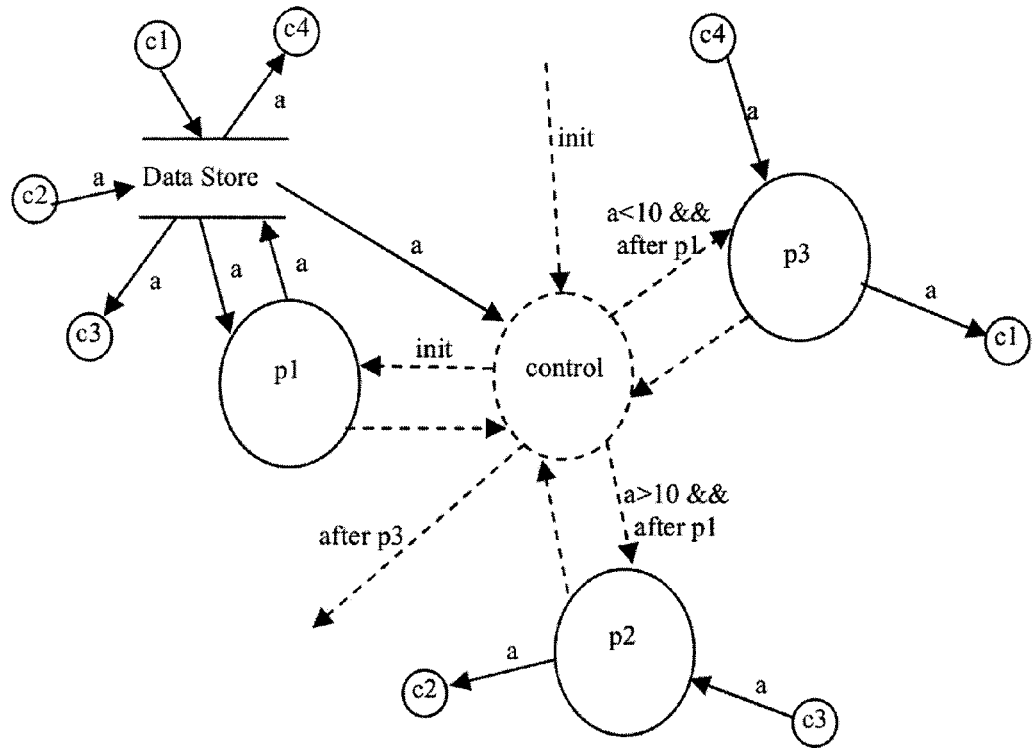
FIG. 71 illustrates sample decomposition for discussion of debugging.
Figure 72:
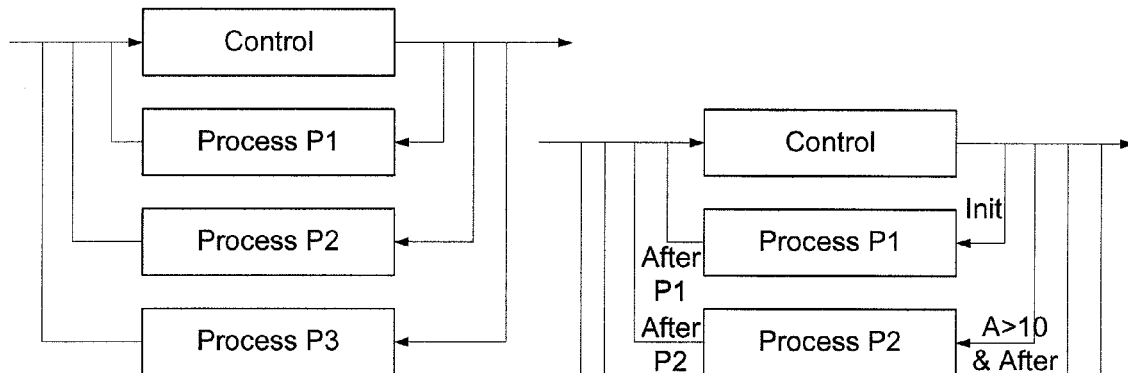
FIG. 72 illustrates a sample state diagram derived from the decomposition of FIG. 71.
Figure 73:
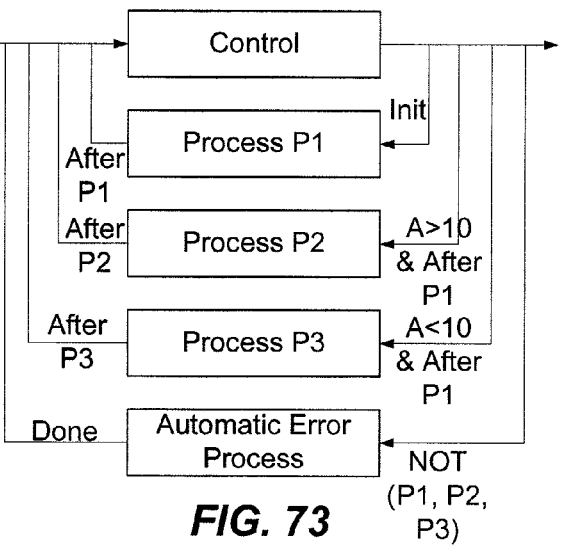
FIG. 73 illustrates the state diagram of FIG. 72 with an automatically-added automatic error detection process.

Cluster computer systems typically have a switching fabric connecting together all nodes. If each port in the switching fabric allows for the wire-speed storage of a node's checkpoint data into or through a random access memory (RAM) or a RAM disk storage system, and potentially into a disk storage system. If any port can access the data from any other port, then, as long as there is sufficient bandwidth within the switch to maintain parallel wire speed (modern switch fabrics are designed to maintain wire speed), all servers connected can transport their checkpoint data simultaneously from server to storage. The following is the minimum data that must be stored at each state transition in order to be able to backtrack:

- Process-associated data-store information
- Starting values
- Ending values
- State-transition conditions
- State variables
- State variable values
- Loop information
- Starting values
- Loop-condition variables
- Loop-condition variable values
- Thread Identification
- Processor identity
- Server identity Detecting a Code Error In order to debug, an error must first be found. FIG. 71 shows an example of an MPT Hierarchical Design Graph decomposition level. There is at least one input control flow and one output control flow to both the process transforms and the control transforms. Program execution is the same as traversing the finite state machine in this model. Because all of the control vectors are known by the state machine, it is possible to construct an error condition. An error condition consists of the negation of all other conditions, which is something that should never occur. Combining the negative of all other state transition vectors with a system-defined error process at every decomposition level allows for the automatic determination of an error condition. FIG. 72 above can now be transformed as illustrated in FIG. 73. An Automatic Error Process (AEP) is added to the state machine, the state machine for execution on the target parallel processing computer system. On entry, the AEP halts the execution of the current state machine as it has entered a failed state and exits with a debug flag set. When the debug flag is set, the system copies the saved checkpoint data to a checkpoint debug file. If there are separate debug servers on a separate debug system, then one or more such servers are allocated for debug purposes. The checkpoint data is restored to the debug system, including switches, NIC cards, and switch information. The development system has code configured to analyze the information captured.

Identifying Failed Processes

In order to determine which process failed and the input and output values of that process at the time of failure, the system first goes back one state from the AEP-detected failed state. This is the failed state which represents the failed process. Going back one checkpoint step in the checkpoint data gives the output data. Going back one additional checkpoint step gives the input data. Once the failed process and its input and output data are located, it is possible to determine if the failure was actually a function of the current thread or some combination of processing threads. A test procedure can be created for the current process using the negative values of the state transition conditions. To create negative values, the function Not( ) is placed in the value of the output parameters. Each state in a state machine can be accessed one state at a time by a processing element. If the actual output values of the state match what is expected (equal the logical negative of the output values found before) then the code attached to the state is correct for the single-threaded case.

Multi-Threaded Analysis

There are two classes of common multi-threaded problems: race-conditions and deadlocks. Race conditions occur when two or more threads are attempting to access the same memory.

Race Conditions

Race conditions take one of the following forms:

There is at least one thread attempting to read and at least one thread attempting to write simultaneously from the same memory location; the read thread may or may not receive data updated from the write, or, worse, may receive data partially updated by the write.

Figure 74:
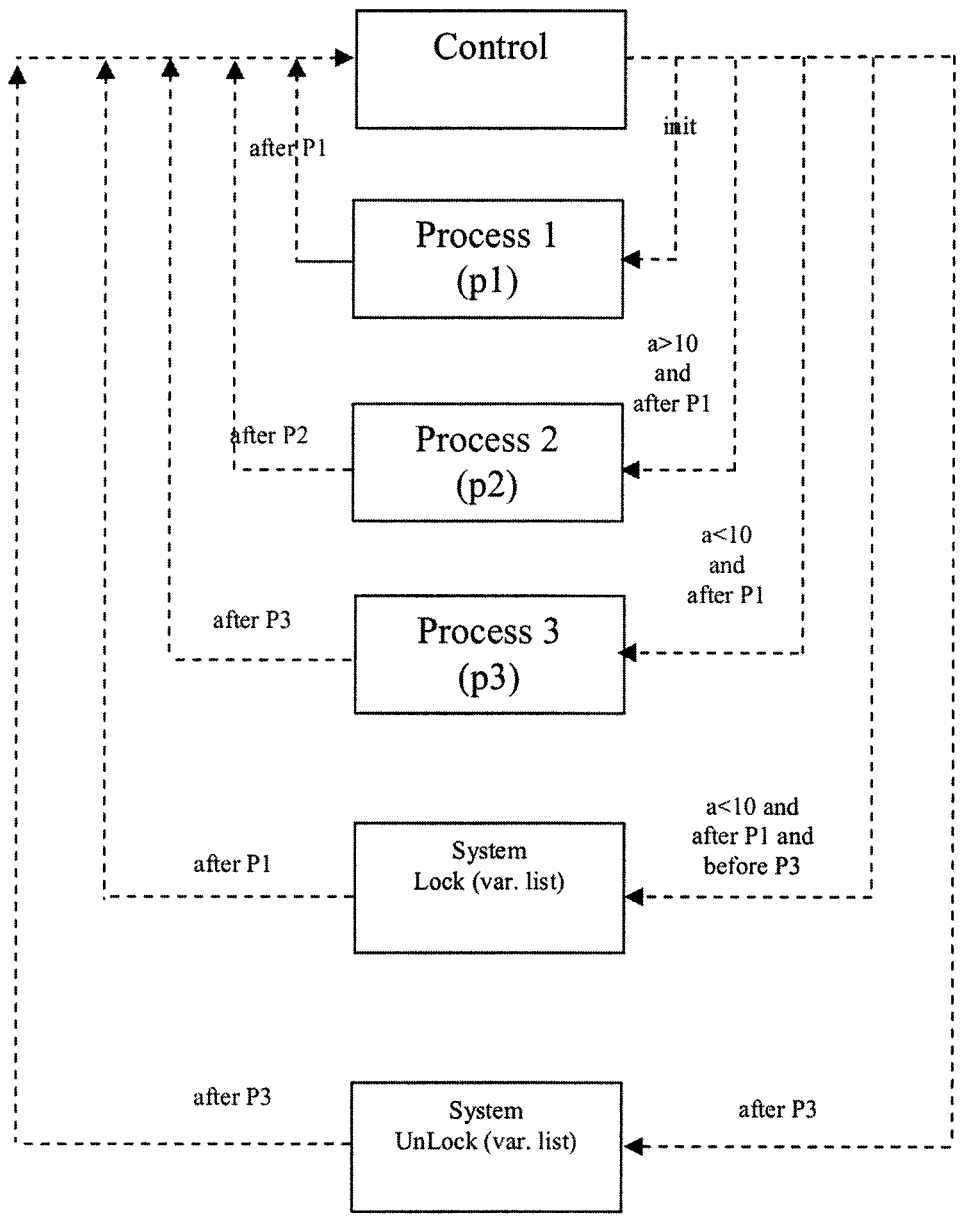
FIG. 74 illustrates a state diagram having automatically added deadlock-prevention states.
Figure 75:
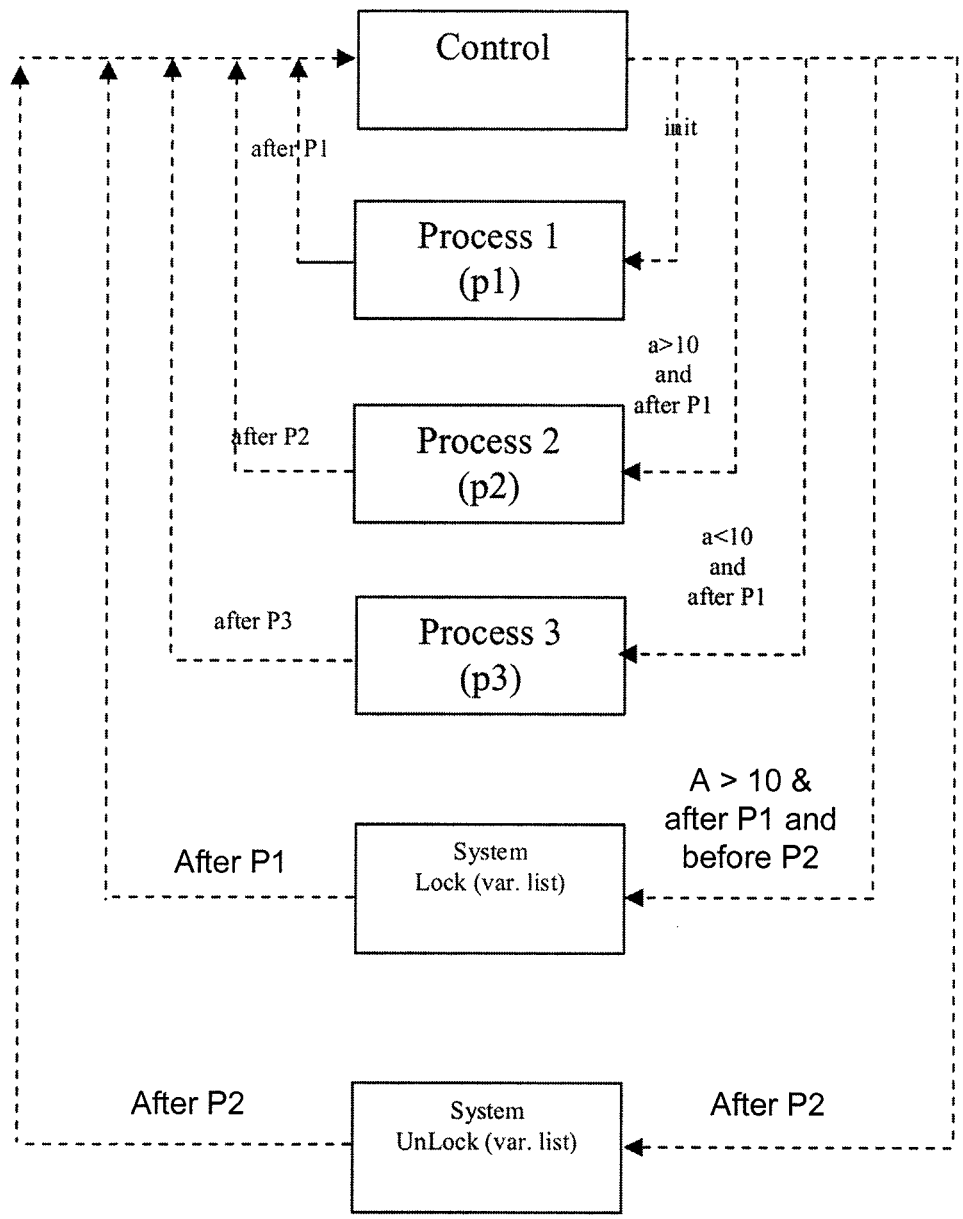
FIG. 75 illustrates a state diagram having automatically added deadlock-prevention states complimentary to those of FIG. 74 for execution in a different thread than that of FIG. 74.

When there are at least two threads attempting to write to the same memory location; the memory location may be left with data from either thread, or, worse, some combination of data with part of the data left in memory from each writing thread Since the parallel processing system uses a finite state machine, if a state fails to transition within some given amount of time, then a timeout condition has been detected. Upon the detection of a timeout condition on the parallel processing system, the development system checks all executing threads for those that access the same variables in the correct order for a race condition. When a race condition is detected, the system places a lock before each state attempting to access the variables, followed by an unlock state. For example, if "P3" of the following state machine is modifying the same variable(s) as "P2" on another thread's state machine then the state machine executing the P3 task is modified as illustrated in FIG. 74; and the state machine executing the P2 task is modified as illustrated in FIG. 75

Note that even though the Thread 2 FSM looks the same as the Thread 1 FSM, it is active on a different thread.

The output vectors from the system "Lock" and "Unlock" states are meant to ensure that the original process flows remain. Note that the "var. list" shown in the "System Lock" and "System Unlock" states is an array for the various locks as shown below:

| | | | | | | | Lock | |
|---|---|---|---|---|---|---|---|---|
| Lock 0 | Lock 1 | Lock 2 | Lock 3 | Lock 4 | Lock 5 | Lock 6 | Lock 7 | ... Lock N |
| (0 or 1) | (0 or 1) | (0 or 1) | (0 or 1) | (0 or 1) | (0 or 1) | (0 or 1) | (0 or 1) | ... (0 or 1) |

If the value of a lock is "0" then it is unlocked; if "1" then it is locked. This table can be used to access more than one lock at a time. This is important when mitigating deadlock condition.

Deadlocks

Deadlock conditions take the form:

The first thread has Lock 1 and the second thread has Lock 2. Thread 1 attempts to obtain Lock 2 (which is busy with the second thread) while Thread 2 attempts to obtain Lock 1 (which is busy with the first thread). Since each thread is waiting on the other, neither thread can continue.

Since the system uses a finite state machine, in a deadlock, the state fails to transition within some given amount of time, allowing a timeout condition to be detected.

Upon the detection of a timeout condition, the system checks all threads for deadlock conditions. When a deadlock condition is detected, the system changes the lock of all deadlocked threads so that each lock obtains all of the locks at once, not just one. In the case of the example deadlock form shown above, the first thread would attempt to obtain both Lock 1 and Lock 2, and the second thread would also attempt to obtain both Lock 1 and Lock 2. By obtaining all locks simultaneously, the deadlock condition cannot take place.

Debug Conclusion

This document shows the relationship between designing/coding/testing and debugging. This relationship forms the basis of a novel automated debugging system which greatly simplifies the debugging process by automatically:

Adding a new system state to all decomposition levels of a hierarchical design model which detects error conditions, Finding the correct state containing the code with an error in the single-threaded case, Finding the correct state and the correct thread containing the code with an error in the multi-thread case, Changing system locks to include additional locks which remove deadlock conditions, and Adding new system locks to remove race conditions.

Combinations

The system and methods herein described may operate with many different combinations of the features described.

In an embodiment of the method designated A, a method for performing functional decomposition of a software design to generate a computer-executable finite state machine (FSM), includes decomposing functions in the software design into data transformations and control transformations repetitively until each of the decomposed data transformations consists of a respective linear code block. In this method the data transformations accept and generate data, and the control transformations evaluate conditions and send and receive control indications to and from associated instances of the data transformations. The method includes converting the software design to a graphical diagram database, the graphical database including a machine readable representation of graphical symbols interconnected to hierarchically represent the data transformations and the control transformations in the software design. In the method, a first type of the graphical symbols include process symbols indicating functional decomposition elements within the software design, and a second type of the graphical symbols include control flow indicators between the functions, which indicators have transformation-selection conditions associated therewith.

In an embodiment designated AA of the method designated A, the process symbols include control bubbles or symbols and process bubble or symbols, and the control bubbles or symbols indicate the control transformations, and the process bubbles or symbols indicate the data transformations. In this method, further steps include translating the data transformations and the control transformations into states in the FSM; and translating the transformation-selection conditions associated with the control transformations into state transitions in the FSM; checkpointing state information in a storage system; inserting error-detection states into the FSM, and providing code for saving process state information when the error detection state is executed; and the translating steps are performed by a computer system.

In an embodiment designated AB including the method designated A or AA and further including searching for pre-existing software modules that have common keywords with a process of the functional decomposition of the software design; determining whether input and output lists of the pre-existing software modules match the process of the decomposition; and associating a selected pre-existing software module with the process.

In an embodiment designated AC including the method designated A, AA, or AB and further including, further comprising automatically detecting deadlocks and modifying lock requests when deadlocks are detected.

In an embodiment designated AD including the method designated A, AA, AB, or AC and further including, further comprising automatically detecting invalid state transitions.

In an embodiment of a method designated B a method for performing functional decomposition of a software design to generate a computer-executable finite state machine (FSM), the method includes: decomposing functions in the software design into data transformations and control transformations repetitively until each of the decomposed data transformations consists of a respective linear code block. In this method, the data transformations accept and generate data, and the control transformations evaluate conditions and send and receive control indications to and from associated instances of the data transformations.

In a method designated BA, including the method designated B, the method also includes converting the software design to a graphical diagram database, the graphical database including a machine readable representation of multiple graphical symbols interconnected to hierarchically represent the data transformations and the control transformations in the software design, wherein: a first type of the graphical symbols comprise process symbols indicating functional decomposition elements within the software design, and a second type of the graphical symbols comprise control flow indicators between the functions, which indicators have transformation-selection conditions associated therewith; and the process symbols include control symbols and process symbols, wherein the control symbols indicate the control transformations, and the process symbols indicate the data transformations translating the data transformations and the control transformations into states in the FSM; and translating the transformation-selection conditions associated with the control transformations into state transitions in the FSM, In a method designated BB, including the method designated B, or BA, the method further includes annotating the graphical database with program management information, the program management information comprising data selected from the group consisting of a duration, assigned programmer identification, and a start date; Automatically generating a graphical project management chart from the graphical database, the project management chart selected from a GANTT chart or a PERT chart; wherein the translating is performed by a computer system.

In a method designated BC including the method designated B, BA, or BB, the programmer identification is assigned by assigning write privileges to a programmer.

In a method designated BD including the method designated B, BA, BB, or BC, further includes searching for pre-existing software modules that have common keywords with a process of the functional decomposition of the software design; determining whether input and output lists of the pre-existing software modules match the process of the decomposition; and associating a selected pre-existing software module with the process.

In a method designated BE including the method designated B, BA, BB, BC, or BD further includes automatically marking a critical path on a graphical depiction of at least a portion of the functional decomposition of the design.

A development system designated C includes a processor, a display system, and a memory system, the system coupled to a parallel processing computer system for executing code developed on the development system, the memory of the development system comprising machine readable code for performing functional decomposition of a software design to generate a computer-executable finite state machine, the code for performing functional decomposition includes machine readable code for: decomposing functions in the software design into data transformations and control transformations repetitively until each of the decomposed data transformations consists of a respective linear code block; wherein the data transformations accept and generate data, and the control transformations evaluate conditions and send and receive control indications to and from associated instances of the data transformations; and code for converting the software design to a graphical diagram database, the graphical database including a machine readable representation of a plurality of graphical symbols interconnected to hierarchically represent the data transformations and the control transformations in the software design.

In an embodiment designated CA of the system designated C, a first type of the graphical symbols comprise process symbols indicating functional decomposition elements within the software design, and a second type of the graphical symbols comprise control flow indicators between the process symbols, which indicators have transformation-selection conditions associated therewith; and the process symbols include control symbols and process symbols, where the control symbols indicate the control transformations, and the process symbols indicate the data transformations.

In an embodiment designated CB of the system designated C or CA, the system includes machine readable code for translating the data transformations and the control transformations into states in the finite state machine; and code for translating the transformation-selection conditions associated with the control transformations into state transitions in the finite state machine; code for annotating the graphical database with program management information, the program management information comprising data selected from the group consisting of a duration, assigned programmer identification, and a start date; and code for automatically generating a graphical project management chart from the graphical database, the project management chart selected from the group consisting of a GANTT chart and a PERT chart.

In a system designated CC including the system designated C, CA, or CB, the code in the memory further comprising code for searching for pre-existing software modules that have common keywords with a process of the functional decomposition of the software design; determining whether input and output lists of the pre-existing software modules match the process of the decomposition; and associating a selected pre-existing software module with the process.

In a system designated CC including the system designated C, CA, CB, or CC the code in the memory further comprising code for marking a critical path on a graphical depiction of at least a portion of the functional decomposition of the design.

A development system designated D includes a processor, a display system, and a memory system, the system coupled to a parallel processing computer system for executing code developed on the development system, the memory of the development system comprising machine readable code for performing functional decomposition of a software design to generate a computer-executable finite state machine, the code for performing functional decomposition includes: code for decomposing functions in the software design into data transformations and control transformations repetitively until each of the decomposed data transformations consists of a respective linear code block; wherein the data transformations accept and generate data, and the control transformations evaluate conditions and send and receive control indications to and from associated instances of the data transformations; code for converting the software design to a graphical diagram database, the graphical database including a machine readable representation of multiple graphical symbols interconnected to hierarchically represent the data transformations and the control transformations in the software design, wherein a first type of the graphical symbols comprise process symbols indicating functional decomposition elements within the software design, and a second type of the graphical symbols represent control flow indicators between the process symbols, which indicators have transformation-selection conditions associated therewith.

In a development system designated DA including the system designated D, the process symbols include control symbols and process symbols, wherein the control symbols indicate the control transformations, and the process symbols indicate the data transformations. The system memory also includes code for translating the data transformations and the control transformations into states in the finite state machine; and code for translating the transformation-selection conditions associated with the control transformations into state transitions in the finite state machine; code for transferring code of the finite state machine to a parallel processing system comprising a plurality of processors interconnected by a network fabric to a storage system, and for initiating execution of the FSM; code for execution on the parallel processing system for checkpointing state information in the storage system; and code for the development system for inserting error-detection states into the FSM, and code for execution on the parallel processing system for saving process state information when the error detection state is executed.

In a development system designated DB including the development system designated D or DA, the system memory further includes code for execution on the development system for searching for pre-existing software modules that have common keywords with a process of the functional decomposition of the software design; determining whether input and output lists of the pre-existing software modules match the process of the decomposition; and associating a selected pre-existing software module with the process.

In a development system designated DC including the development system designated D, DA or DB, further including in memory code for execution on the parallel processing system for automatically detecting deadlocks and modifying lock requests when deadlocks are detected.

In a development system designated DD including the development system designated D, DA, DB or DC, further comprising code for execution on the parallel processing system for automatically detecting invalid state transitions.

Certain changes may be made in the above methods and systems without departing from the scope of that which is described herein. It is to be noted that all matter contained in the above description or shown in the accompanying drawings is to be interpreted as illustrative and not in a limiting sense. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall therebetween.

What is claimed is:

1. A method for performing functional decomposition of a software design to generate a computer-executable finite state machine (FSM), the method comprising:
    decomposing functions in the software design into data transformations and control transformations repetitively until each of the decomposed data transformations consists of a respective linear code block;
    wherein the data transformations accept and generate data, and the control transformations evaluate conditions and send and receive control indications to and from associated instances of the data transformations;
    converting the software design to a graphical diagram database, the graphical database including a machine readable representation of a plurality of graphical symbols interconnected to hierarchically represent the data transformations and the control transformations in the software design, wherein:
    a first type of the graphical symbols comprise process symbols indicating functional decomposition elements within the software design, and a second type of the graphical symbols comprise control flow indicators between the functions, which indicators have transformation-selection conditions associated therewith; and
    the process symbols including control symbols and process symbols, wherein the control symbols indicate the control transformations, and the process symbols indicate the data transformations;
    translating the data transformations and the control transformations into states in the FSM; and
    translating the transformation-selection conditions associated with the control transformations into state transitions in the FSM;
    annotating the graphical database with program management information, the program management information comprising data selected from the group consisting of a duration, assigned programmer identification, and a start date;
    automatically generating a graphical project management chart from the graphical database, the project management chart selected from the group consisting of a GANTT chart and a PERT chart; wherein the translating steps are performed by a computer system.

2. The method of claim 1 wherein the programmer identification is assigned by assigning write privileges to a programmer.

3. The method of claim 1 further comprising searching for pre-existing software modules that have common keywords with a process of the functional decomposition of the software design; determining whether input and output lists of the pre-existing software modules match the process of the decomposition; and associating a selected pre-existing software module with the process.

4. The method of claim 1 further comprising automatically marking a critical path on a graphical depiction of at least a portion of the functional decomposition of the design.

5. A development system comprising a processor, a display system, and a memory system, the system coupled to a parallel processing computer system for executing code developed on the development system, the memory of the development system comprising machine readable code for performing functional decomposition of a software design to generate a computer-executable finite state machine, the code for performing functional decomposition comprising:
    code for decomposing functions in the software design into data transformations and control transformations repetitively until each of the decomposed data transformations consists of a respective linear code block;
    wherein the data transformations accept and generate data, and the control transformations evaluate conditions and send and receive control indications to and from associated instances of the data transformations;
    code for converting the software design to a graphical diagram database, the graphical database including a machine readable representation of a plurality of graphical symbols interconnected to hierarchically represent the data transformations and the control transformations in the software design, wherein:
    a first type of the graphical symbols comprise process symbols indicating functional decomposition elements within the software design, and a second type of the graphical symbols comprise control flow indicators between the process symbols, which indicators have transformation-selection conditions associated therewith; and
    the process symbols including control symbols and process symbols, wherein the control symbols indicate the control transformations, and the process symbols indicate the data transformations;
    code for translating the data transformations and the control transformations into states in the finite state machine; and
    code for translating the transformation-selection conditions associated with the control transformations into state transitions in the finite state machine;
    code for annotating the graphical database with program management information, the program management information comprising data selected from the group consisting of a duration, assigned programmer identification, and a start date;
    code for automatically generating a graphical project management chart from the graphical database, the project management chart selected from the group consisting of a GANTT chart and a PERT chart.

6. The system of claim 5 the code in the memory further comprising code for searching for pre-existing software modules that have common keywords with a process of the functional decomposition of the software design; determining whether input and output lists of the pre-existing software modules match the process of the decomposition; and associating a selected pre-existing software module with the process.

7. The system of claim 5 the code in the memory further comprising code for marking a critical path on a graphical depiction of at least a portion of the functional decomposition of the design.

* * * * *